(12) United States Patent
Hall et al.

(10) Patent No.: US 7,062,500 B1
(45) Date of Patent: Jun. 13, 2006

(54) TECHNIQUES FOR DEFINING, USING AND MANIPULATING RIGHTS MANAGEMENT DATA STRUCTURES

(75) Inventors: Edwin J. Hall, San Jose, CA (US); Victor H. Shear, Bethesda, MD (US); Luke S. Tomasello, San Jose, CA (US); David M. Van Wie, Sunnyvale, CA (US); Robert P. Weber, Menlo Park, CA (US); Kim Worsencroft, Los Gatos, CA (US); Xuejun Xu, Fremont, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 835 days.

(21) Appl. No.: 09/819,063

(22) Filed: Sep. 28, 2000

Related U.S. Application Data

(63) Continuation of application No. 09/300,778, filed on Mar. 27, 1999, now Pat. No. 6,138,119, which is a continuation of application No. 08/805,805, filed on Feb. 25, 1997, now Pat. No. 5,920,861.

(51) Int. Cl.
*G06F 17/30* (2006.01)

(52) U.S. Cl. ...................................................... 707/102
(58) Field of Classification Search ................. 707/102
See application file for complete search history.

(56) References Cited

U.S. PATENT DOCUMENTS

| | | | |
|---|---|---|---|
| 3,573,747 A | 4/1971 | Adams et al. | |
| 3,609,697 A | 9/1971 | Blevins | |
| 3,790,700 A | 2/1974 | Callais et al. | |
| 3,796,830 A | 3/1974 | Smith | |
| 3,798,359 A | 3/1974 | Feistel | |
| 3,798,360 A | 3/1974 | Feistel | |
| 3,798,605 A | 3/1974 | Feistel | |
| 3,806,874 A | 4/1974 | Ehrat | |
| 3,806,882 A | 4/1974 | Clarke | |
| 3,829,833 A | 8/1974 | Freeny | |
| 3,845,391 A | 10/1974 | Crosby | |
| 3,906,448 A | 9/1975 | Henriques | |
| 3,911,397 A | 10/1975 | Freeny | |
| 3,924,065 A | 12/1975 | Freeny | |

(Continued)

FOREIGN PATENT DOCUMENTS

| | | |
|---|---|---|
| AU | 711 733 | 9/1996 |
| AU | A-36815/97 | 2/1998 |
| AU | A-36816/97 | 2/1998 |

(Continued)

OTHER PUBLICATIONS

David Arneke and Donna Cunningham, Document from the Internet: *AT&T encryption system protects information services*, (News Release), Jan. 9, 1995, 1 page.

(Continued)

*Primary Examiner*—Wayne Amsbury
(74) *Attorney, Agent, or Firm*—Finnegan, Henderson, Farabow, Garrett, & Dunner LLP

(57) ABSTRACT

A descriptive data structure provides an abstract representation of a rights management data structure such as a secure container. The abstract representation may describe, for example, the layout of the rights management data structure. It can also provide metadata describing or defining other characteristics of rights management data structure use and/or processing. For example, the descriptive data structure can provide integrity constraints that provide a way to state rules about associated information. The abstract representation can be used to create rights management data structures that are interoperable and compatible with one another. This arrangement preserves flexibility and ease of use without compromising security.

37 Claims, 14 Drawing Sheets

U.S. PATENT DOCUMENTS

| | | |
|---|---|---|
| 3,931,504 A | 1/1976 | Jacoby |
| 3,946,200 A | 3/1976 | Juodikis |
| 3,946,220 A | 3/1976 | Brobeck et al. |
| 3,956,615 A | 5/1976 | Anderson et al. |
| 3,958,081 A | 5/1976 | Ehrsam et al. |
| 3,970,992 A | 7/1976 | Boothroyd et al. |
| 3,996,449 A | 12/1976 | Attanasio et al. |
| 4,020,326 A | 4/1977 | Coulthurst |
| 4,048,619 A | 9/1977 | Forman et al. |
| 4,071,911 A | 1/1978 | Mazur |
| 4,104,721 A | 8/1978 | Markstein et al. |
| 4,112,421 A | 9/1978 | Freeny |
| 4,120,030 A | 10/1978 | Johnstone |
| 4,141,005 A * | 2/1979 | Bonner et al. ................ 341/60 |
| 4,162,483 A | 7/1979 | Entenman |
| 4,163,280 A | 7/1979 | Mori et al. |
| 4,168,396 A | 9/1979 | Best |
| 4,183,085 A | 1/1980 | Roberts et al. |
| 4,196,310 A | 4/1980 | Forman et al. |
| 4,200,913 A | 4/1980 | Kuhar et al. |
| 4,209,787 A | 6/1980 | Freeny |
| 4,217,588 A | 8/1980 | Freeny |
| 4,220,991 A | 9/1980 | Hamano et al. |
| 4,232,193 A | 11/1980 | Gerard |
| 4,232,317 A | 11/1980 | Freeny |
| 4,236,217 A | 11/1980 | Kennedy |
| 4,246,638 A | 1/1981 | Thomas |
| 4,253,157 A | 2/1981 | Kirschner et al. |
| 4,259,720 A | 3/1981 | Campbell |
| 4,262,329 A | 4/1981 | Bright et al. |
| 4,265,371 A | 5/1981 | Desai et al. |
| 4,270,182 A | 5/1981 | Asija |
| 4,278,837 A | 7/1981 | Best |
| 4,305,131 A | 12/1981 | Best |
| 4,306,289 A | 12/1981 | Lumley |
| 4,309,569 A | 1/1982 | Merkle |
| 4,319,079 A | 3/1982 | Best |
| 4,321,672 A | 3/1982 | Braun et al. |
| 4,323,921 A | 4/1982 | Guillou |
| 4,328,544 A | 5/1982 | Baldwin et al. |
| 4,337,483 A | 6/1982 | Guillou |
| 4,361,877 A | 11/1982 | Dyer et al. |
| 4,375,579 A | 3/1983 | Davida et al. |
| 4,405,829 A | 9/1983 | Rivest et al. |
| 4,433,207 A | 2/1984 | Best |
| 4,434,464 A | 2/1984 | Suzuki et al. |
| 4,442,484 A | 4/1984 | Childs, Jr. et al. |
| 4,442,486 A | 4/1984 | Mayer |
| 4,446,519 A | 5/1984 | Thomas |
| 4,454,594 A | 6/1984 | Heffron et al. |
| 4,458,315 A | 7/1984 | Uchenick |
| 4,462,076 A | 7/1984 | Smith |
| 4,462,078 A | 7/1984 | Ross |
| 4,465,901 A | 8/1984 | Best |
| 4,471,163 A | 9/1984 | Donald et al. |
| 4,471,216 A | 9/1984 | Herve |
| 4,484,217 A | 11/1984 | Block et al. |
| 4,494,156 A | 1/1985 | Kadison et al. |
| 4,513,174 A | 4/1985 | Herman |
| 4,523,271 A | 6/1985 | Levien |
| 4,525,599 A | 6/1985 | Curran et al. |
| 4,528,588 A | 7/1985 | Lofberg |
| 4,528,643 A | 7/1985 | Freeny |
| 4,529,870 A | 7/1985 | Chaum |
| 4,553,252 A | 11/1985 | Egendorf |
| 4,558,176 A | 12/1985 | Arnold et al. |
| 4,558,413 A | 12/1985 | Schmidt et al. |
| 4,562,305 A | 12/1985 | Gaffney, Jr. |
| 4,562,306 A | 12/1985 | Chou et al. |
| 4,562,495 A | 12/1985 | Bond et al. |
| 4,573,119 A | 2/1986 | Westheimer et al. |
| 4,577,289 A | 3/1986 | Comerford et al. |
| 4,578,530 A | 3/1986 | Zeidler |
| 4,584,639 A | 4/1986 | Hardy |
| 4,584,641 A | 4/1986 | Guglielmino |
| 4,588,991 A | 5/1986 | Atalla |
| 4,589,064 A | 5/1986 | Chiba et al. |
| 4,590,552 A | 5/1986 | Guttag et al. |
| 4,593,183 A | 6/1986 | Fukatsu |
| 4,593,353 A | 6/1986 | Pickholtz |
| 4,593,376 A | 6/1986 | Volk |
| 4,595,950 A | 6/1986 | Lofberg |
| 4,597,058 A | 6/1986 | Izumi et al. |
| 4,598,288 A | 7/1986 | Yarbrough et al. |
| 4,599,489 A | 7/1986 | Cargile |
| 4,609,777 A | 9/1986 | Cargile |
| 4,609,985 A | 9/1986 | Dozier |
| 4,621,321 A | 11/1986 | Boebert et al. |
| 4,621,334 A | 11/1986 | Garcia |
| 4,622,222 A | 11/1986 | Horvath et al. |
| 4,634,807 A | 1/1987 | Chorley et al. |
| 4,644,493 A | 2/1987 | Chandra et al. |
| 4,646,234 A | 2/1987 | Tolman et al. |
| 4,652,990 A | 3/1987 | Pailen et al. |
| 4,658,093 A | 4/1987 | Hellman |
| 4,670,857 A | 6/1987 | Rackman |
| 4,672,572 A | 6/1987 | Alsberg |
| 4,672,605 A | 6/1987 | Hustig et al. |
| 4,677,434 A | 6/1987 | Fascenda |
| 4,677,552 A | 6/1987 | Sibley, Jr. |
| 4,680,731 A | 7/1987 | Izumi et al. |
| 4,683,553 A | 7/1987 | Mollier |
| 4,683,968 A | 8/1987 | Appelbaum et al. |
| 4,685,056 A | 8/1987 | Barnsdale et al. |
| 4,688,169 A | 8/1987 | Joshi |
| 4,691,350 A | 9/1987 | Kleijne et al. |
| 4,696,034 A | 9/1987 | Wiedemer |
| 4,700,296 A | 10/1987 | Palmer, Jr. et al. |
| 4,701,846 A | 10/1987 | Ikeda et al. |
| 4,712,238 A | 12/1987 | Gilhousen et al. |
| 4,713,753 A | 12/1987 | Boebert et al. |
| 4,727,550 A | 2/1988 | Chang et al. |
| 4,740,890 A | 4/1988 | William |
| 4,747,139 A | 5/1988 | Taaffe |
| 4,748,561 A | 5/1988 | Brown |
| 4,757,533 A | 7/1988 | Allen et al. |
| 4,757,534 A | 7/1988 | Matyas et al. |
| 4,757,914 A | 7/1988 | Roth et al. |
| 4,768,087 A | 8/1988 | Taub et al. |
| 4,780,821 A | 10/1988 | Crossley |
| 4,791,565 A | 12/1988 | Dunham et al. |
| 4,796,181 A | 1/1989 | Wiedemer |
| 4,796,220 A | 1/1989 | Wolfe |
| 4,798,209 A | 1/1989 | Klingenbeck et al. |
| 4,799,156 A | 1/1989 | Shavit |
| 4,807,288 A | 2/1989 | Ugon et al. |
| 4,816,655 A | 3/1989 | Musyck et al. |
| 4,817,140 A | 3/1989 | Chandra et al. |
| 4,823,264 A | 4/1989 | Deming |
| 4,827,508 A | 5/1989 | Shear |
| 4,858,121 A | 8/1989 | Barber et al. |
| 4,864,494 A | 9/1989 | Kobus |
| 4,864,616 A | 9/1989 | Pond et al. |
| 4,866,769 A | 9/1989 | Karp |
| 4,868,736 A | 9/1989 | Walker |
| 4,868,877 A | 9/1989 | Fischer |
| 4,881,197 A * | 11/1989 | Fischer ....................... 715/530 |
| 4,888,798 A | 12/1989 | Earnest |
| 4,893,248 A | 1/1990 | Pitts et al. |
| 4,893,332 A | 1/1990 | Brown |
| 4,903,296 A | 2/1990 | Chandra et al. |

| Patent No. | Date | Inventor |
|---|---|---|
| 4,919,545 A | 4/1990 | Yu |
| 4,924,378 A | 5/1990 | Hershey et al. |
| 4,926,480 A | 5/1990 | Chaum |
| 4,930,073 A | 5/1990 | Cina |
| 4,937,863 A | 6/1990 | Robert et al. |
| 4,941,175 A | 7/1990 | Enescu et al. |
| 4,949,187 A | 8/1990 | Cohen |
| 4,952,082 A * | 8/1990 | Sakakibara .................. 400/76 |
| 4,953,209 A | 8/1990 | Ryder, Sr. et al. |
| 4,962,533 A | 10/1990 | Krueger et al. |
| 4,975,647 A | 12/1990 | Downer et al. |
| 4,975,878 A | 12/1990 | Boddu et al. |
| 4,977,594 A | 12/1990 | Shear |
| 4,995,082 A | 2/1991 | Schnorr |
| 4,999,806 A | 3/1991 | Chernow et al. |
| 5,001,752 A | 3/1991 | Fischer |
| 5,005,122 A | 4/1991 | Griffin et al. |
| 5,005,200 A | 4/1991 | Fischer |
| 5,010,571 A | 4/1991 | Katznelson |
| 5,014,234 A | 5/1991 | Edwards, Jr. |
| 5,022,080 A | 6/1991 | Durst et al. |
| 5,023,907 A | 6/1991 | Johnson et al. |
| 5,027,397 A | 6/1991 | Double et al. |
| 5,032,979 A | 7/1991 | Hecht et al. |
| 5,047,928 A | 9/1991 | Wiedemer |
| 5,048,085 A | 9/1991 | Abraham et al. |
| 5,050,213 A | 9/1991 | Shear |
| 5,058,162 A | 10/1991 | Santon et al. |
| 5,065,429 A | 11/1991 | Lang |
| 5,079,648 A | 1/1992 | Maufe |
| 5,091,966 A | 2/1992 | Bloomberg et al. |
| 5,103,392 A | 4/1992 | Mori |
| 5,103,459 A | 4/1992 | Gilhousen et al. |
| 5,103,476 A | 4/1992 | Waite et al. |
| 5,109,413 A | 4/1992 | Comerford et al. |
| 5,111,390 A | 5/1992 | Ketcham |
| 5,113,518 A | 5/1992 | Durst, Jr. et al. |
| 5,119,493 A | 6/1992 | Janis et al. |
| 5,126,936 A | 6/1992 | Champion et al. |
| 5,128,525 A | 7/1992 | Stearns et al. |
| 5,129,084 A | 7/1992 | Kelly, Jr. et al. |
| 5,136,643 A | 8/1992 | Fischer |
| 5,136,646 A | 8/1992 | Haber et al. |
| 5,136,647 A | 8/1992 | Haber et al. |
| 5,136,716 A | 8/1992 | Harvey et al. |
| 5,138,712 A | 8/1992 | Corbin |
| 5,146,575 A | 9/1992 | Nolan |
| 5,148,481 A | 9/1992 | Abraham et al. |
| 5,150,407 A | 9/1992 | Chan |
| 5,155,680 A | 10/1992 | Wiedemer |
| 5,163,091 A | 11/1992 | Graziano et al. |
| 5,164,988 A | 11/1992 | Matyas et al. |
| 5,168,147 A | 12/1992 | Bloomberg |
| 5,185,717 A | 2/1993 | Mori |
| 5,187,787 A | 2/1993 | Skeen et al. |
| 5,191,573 A | 3/1993 | Hair |
| 5,199,066 A | 3/1993 | Logan |
| 5,199,074 A | 3/1993 | Thor |
| 5,201,046 A * | 4/1993 | Goldberg et al. ........... 707/100 |
| 5,201,047 A | 4/1993 | Maki et al. |
| 5,204,897 A | 4/1993 | Wyman |
| 5,206,951 A | 4/1993 | Khoyi et al. |
| 5,208,748 A | 5/1993 | Flores et al. |
| 5,214,702 A | 5/1993 | Fischer |
| 5,216,603 A | 6/1993 | Flores et al. |
| 5,218,605 A | 6/1993 | Low et al. |
| 5,221,833 A | 6/1993 | Hecht |
| 5,222,134 A | 6/1993 | Waite et al. |
| 5,224,160 A | 6/1993 | Paulini et al. |
| 5,224,163 A | 6/1993 | Gasser et al. |
| 5,227,797 A | 7/1993 | Murphy |
| 5,235,642 A | 8/1993 | Wobber et al. |
| 5,241,671 A | 8/1993 | Reed et al. |
| 5,245,165 A | 9/1993 | Zhang |
| 5,247,575 A | 9/1993 | Sprague et al. |
| 5,251,294 A | 10/1993 | Abelow |
| 5,257,369 A | 10/1993 | Skeen et al. |
| 5,260,999 A | 11/1993 | Wyman |
| 5,263,157 A | 11/1993 | Janis |
| 5,263,158 A | 11/1993 | Janis |
| 5,263,165 A | 11/1993 | Janis |
| 5,265,164 A | 11/1993 | Matyas et al. |
| 5,276,735 A | 1/1994 | Boebert et al. |
| 5,276,901 A | 1/1994 | Howell et al. |
| 5,280,479 A | 1/1994 | Mary |
| 5,283,830 A | 2/1994 | Hinsley et al. |
| 5,285,494 A | 2/1994 | Sprecher et al. |
| 5,287,407 A | 2/1994 | Holmes |
| 5,291,598 A | 3/1994 | Grundy |
| 5,301,231 A | 4/1994 | Abraham et al. |
| 5,301,326 A | 4/1994 | Linnett et al. |
| 5,311,591 A | 5/1994 | Fischer |
| 5,319,705 A | 6/1994 | Halter et al. |
| 5,319,735 A | 6/1994 | Preuss et al. |
| 5,319,785 A | 6/1994 | Thaller |
| 5,325,524 A | 6/1994 | Black et al. |
| 5,335,169 A | 8/1994 | Chong |
| 5,335,346 A | 8/1994 | Fabbio |
| 5,337,357 A | 8/1994 | Chou et al. |
| 5,337,360 A | 8/1994 | Fischer |
| 5,341,429 A | 8/1994 | Stringer et al. |
| 5,343,526 A | 8/1994 | Lassers |
| 5,343,527 A | 8/1994 | Moore et al. |
| 5,347,579 A | 9/1994 | Blandford |
| 5,349,642 A | 9/1994 | Kingdon |
| 5,351,293 A | 9/1994 | Michener et al. |
| 5,355,474 A | 10/1994 | Thuraisngham et al. |
| 5,359,721 A | 10/1994 | Kempf et al. |
| 5,361,359 A | 11/1994 | Tajalli et al. |
| 5,365,587 A | 11/1994 | Campbell et al. |
| 5,367,621 A | 11/1994 | Cohen et al. |
| 5,369,702 A | 11/1994 | Shanton |
| 5,369,707 A | 11/1994 | Follendore, III |
| 5,371,792 A | 12/1994 | Asai et al. |
| 5,373,440 A | 12/1994 | Cohen et al. |
| 5,373,561 A | 12/1994 | Haber et al. |
| 5,383,113 A | 1/1995 | Kight et al. |
| 5,388,211 A | 2/1995 | Hornbuckle |
| 5,390,247 A | 2/1995 | Fischer |
| 5,390,297 A | 2/1995 | Barber et al. |
| 5,390,330 A | 2/1995 | Talati |
| 5,392,220 A | 2/1995 | van den Hamer et al. |
| 5,392,390 A | 2/1995 | Crozier |
| 5,394,469 A | 2/1995 | Nagel et al. |
| 5,410,598 A | 4/1995 | Shear |
| 5,412,717 A | 5/1995 | Fischer |
| 5,418,713 A | 5/1995 | Allen |
| 5,420,927 A | 5/1995 | Michali |
| 5,421,006 A | 5/1995 | Jablon |
| 5,422,953 A | 6/1995 | Fischer |
| 5,428,606 A | 6/1995 | Moskowitz |
| 5,432,851 A | 7/1995 | Scheidt et al. |
| 5,432,928 A | 7/1995 | Sherman |
| 5,432,950 A | 7/1995 | Sibigtroth |
| 5,438,508 A | 8/1995 | Wyman |
| 5,440,634 A | 8/1995 | Jones et al. |
| 5,442,645 A | 8/1995 | Ugon |
| 5,444,779 A | 8/1995 | Daniele |
| 5,449,895 A | 9/1995 | Hecht et al. |
| 5,449,896 A | 9/1995 | Hecht et al. |
| 5,450,490 A | 9/1995 | Jensen et al. |
| 5,450,493 A | 9/1995 | Maher |

| Patent No. | Date | Inventor | Class |
|---|---|---|---|
| 5,453,601 A | 9/1995 | Rosen | |
| 5,453,605 A | 9/1995 | Hecht et al. | |
| 5,455,407 A | 10/1995 | Rosen | |
| 5,455,861 A | 10/1995 | Faucher et al. | |
| 5,455,953 A | 10/1995 | Russell | |
| 5,457,746 A | 10/1995 | Dolphin | |
| 5,457,747 A | 10/1995 | Drexler et al. | |
| 5,458,494 A | 10/1995 | Krohn et al. | |
| 5,463,565 A | 10/1995 | Cookson et al. | |
| 5,463,772 A * | 10/1995 | Thompson et al. | 707/101 |
| 5,473,687 A | 12/1995 | Lipscomb et al. | |
| 5,473,692 A | 12/1995 | Davis | |
| 5,479,509 A | 12/1995 | Ugon | |
| 5,485,622 A | 1/1996 | Yamaki | |
| 5,490,216 A | 2/1996 | Ricahrdson, III | |
| 5,491,800 A | 2/1996 | Goldsmith et al. | |
| 5,497,479 A | 3/1996 | Hornbuckle | |
| 5,497,491 A | 3/1996 | Mitchell et al. | |
| 5,499,298 A | 3/1996 | Narasimhalu et al. | |
| 5,504,757 A | 4/1996 | Cook et al. | |
| 5,504,818 A | 4/1996 | Okano | |
| 5,504,837 A | 4/1996 | Griffeth et al. | |
| 5,508,913 A | 4/1996 | Yamamoto et al. | |
| 5,509,070 A | 4/1996 | Schull | |
| 5,513,261 A | 4/1996 | Maher | |
| 5,517,518 A | 5/1996 | Morson et al. | |
| 5,524,933 A | 6/1996 | Kunt et al. | |
| 5,530,235 A | 6/1996 | Stefik et al. | |
| 5,530,752 A | 6/1996 | Rubin | |
| 5,533,123 A | 7/1996 | Force et al. | |
| 5,534,855 A | 7/1996 | Shockley et al. | |
| 5,534,975 A | 7/1996 | Stefik et al. | |
| 5,535,322 A | 7/1996 | Hecht | |
| 5,537,526 A | 7/1996 | Anderson et al. | |
| 5,539,735 A | 7/1996 | Moskowitz | |
| 5,539,828 A | 7/1996 | Davis | |
| 5,550,971 A | 8/1996 | Brunner et al. | |
| 5,553,282 A | 9/1996 | Parrish et al. | |
| 5,557,518 A | 9/1996 | Rosen | |
| 5,557,798 A | 9/1996 | Skeen et al. | |
| 5,563,946 A | 10/1996 | Cooper et al. | |
| 5,568,552 A | 10/1996 | Davis | |
| 5,572,673 A | 11/1996 | Shurts | |
| 5,574,962 A | 11/1996 | Fardeau et al. | |
| 5,577,209 A | 11/1996 | Boyle et al. | |
| 5,581,686 A * | 12/1996 | Koppolu et al. | 345/784 |
| 5,581,800 A | 12/1996 | Fardeau et al. | |
| 5,592,549 A | 1/1997 | Nagel et al. | |
| 5,603,031 A | 2/1997 | White et al. | |
| 5,606,609 A | 2/1997 | Houser et al. | |
| 5,613,004 A | 3/1997 | Cooperman et al. | |
| 5,621,797 A | 4/1997 | Rosen | |
| 5,625,693 A | 4/1997 | Rohatgi et al. | |
| 5,629,770 A | 5/1997 | Brassil et al. | |
| 5,629,980 A * | 5/1997 | Stefik et al. | 705/54 |
| 5,633,932 A | 5/1997 | Davis et al. | |
| 5,634,012 A | 5/1997 | Stefik et al. | |
| 5,636,276 A | 6/1997 | Brugger | |
| 5,636,292 A | 6/1997 | Rhoads | |
| 5,638,443 A | 6/1997 | Stefik | |
| 5,638,504 A | 6/1997 | Scott et al. | |
| 5,640,546 A | 6/1997 | Gopinath et al. | |
| 5,649,099 A | 7/1997 | Theimer et al. | |
| 5,655,077 A | 8/1997 | Jones et al. | |
| 5,671,279 A | 9/1997 | Elgamal | |
| 5,678,170 A | 10/1997 | Grube et al. | |
| 5,687,236 A | 11/1997 | Moskowitz et al. | |
| 5,689,565 A | 11/1997 | Spies et al. | |
| 5,689,566 A | 11/1997 | Nguyen | |
| 5,689,587 A | 11/1997 | Bender et al. | |
| 5,692,047 A | 11/1997 | McManis | |
| 5,692,180 A | 11/1997 | Lee | |
| 5,699,427 A | 12/1997 | Chow et al. | |
| 5,710,834 A | 1/1998 | Rhoads | |
| 5,715,314 A | 2/1998 | Payne et al. | |
| 5,715,403 A | 2/1998 | Stefik | |
| 5,717,923 A | 2/1998 | Dedrick | |
| 5,721,788 A | 2/1998 | Powell et al. | |
| 5,724,424 A | 3/1998 | Gifford | |
| 5,724,425 A | 3/1998 | Chang et al. | |
| 5,732,398 A | 3/1998 | Tagawa | |
| 5,740,549 A | 4/1998 | Reilly et al. | |
| 5,745,569 A | 4/1998 | Moskowitz et al. | |
| 5,745,604 A | 4/1998 | Rhoads | |
| 5,745,678 A | 4/1998 | Herzberg et al. | |
| 5,748,763 A | 5/1998 | Rhoads | |
| 5,748,783 A | 5/1998 | Rhoads | |
| 5,748,960 A | 5/1998 | Fischer | |
| 5,754,849 A | 5/1998 | Dyer et al. | |
| 5,757,914 A | 5/1998 | McManis | |
| 5,758,152 A | 5/1998 | LeTourneau | |
| 5,765,152 A | 6/1998 | Erickson | |
| 5,768,426 A | 6/1998 | Rhoads | |
| 5,774,872 A | 6/1998 | Golden et al. | |
| 5,778,385 A * | 7/1998 | Pratt | 707/200 |
| 5,787,334 A | 7/1998 | Fardeau et al. | |
| 5,802,590 A | 9/1998 | Draves | |
| 5,819,263 A | 10/1998 | Bromley et al. | |
| 5,842,173 A | 11/1998 | Strum et al. | |
| 5,845,281 A | 12/1998 | Benson et al. | |
| 5,878,421 A * | 3/1999 | Ferrel et al. | 707/100 |
| 5,892,899 A | 4/1999 | Aucsmith et al. | |
| 5,892,900 A | 4/1999 | Ginter et al. | |
| 5,896,454 A | 4/1999 | Cookson et al. | |
| 5,910,987 A | 6/1999 | Ginter et al. | |
| 5,913,037 A * | 6/1999 | Spofford et al. | 709/226 |
| 5,915,019 A | 6/1999 | Ginter et al. | |
| 5,917,912 A | 6/1999 | Ginter et al. | |
| 5,920,861 A * | 7/1999 | Hall et al. | 707/9 |
| 5,940,504 A | 8/1999 | Griswold | |
| 5,940,505 A | 8/1999 | Kanamaru | |
| 5,943,422 A * | 8/1999 | Van Wie et al. | 705/58 |
| 5,949,876 A | 9/1999 | Ginter et al. | |
| 5,956,408 A | 9/1999 | Arnold | |
| 5,966,440 A | 10/1999 | Hair | |
| 5,978,484 A | 11/1999 | Apperson et al. | |
| 5,982,891 A | 11/1999 | Ginter et al. | |
| 5,991,876 A * | 11/1999 | Johnson et al. | 713/200 |
| 5,995,756 A * | 11/1999 | Herrmann | 717/178 |
| 5,999,949 A | 12/1999 | Crandall | |
| 6,009,170 A | 12/1999 | Sako et al. | |
| 6,016,393 A | 1/2000 | White et al. | |
| 6,044,205 A * | 3/2000 | Reed et al. | 709/201 |
| 6,102,965 A | 8/2000 | Dye et al. | |
| 6,112,181 A | 8/2000 | Shear et al. | |
| 6,122,403 A * | 9/2000 | Rhoads | 382/233 |
| 6,135,646 A | 10/2000 | Kahn et al. | |
| 6,138,119 A | 10/2000 | Hall et al. | |
| 6,157,721 A * | 12/2000 | Shear et al. | 380/255 |
| 6,185,683 B1 | 2/2001 | Ginter et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,363,488 B1 | 3/2002 | Ginter et al. | |
| 6,389,402 B1 | 5/2002 | Ginter et al. | |
| 6,427,140 B1 | 7/2002 | Ginter et al. | |
| 6,449,367 B1 | 9/2002 | Van Wie et al. | |
| 6,618,484 B1 | 9/2003 | Weber et al. | |
| 6,640,304 B1 | 10/2003 | Ginter et al. | |
| 6,658,568 B1 | 12/2003 | Ginter et al. | |
| 6,668,325 B1 | 12/2003 | Collberg et al. | |

FOREIGN PATENT DOCUMENTS

| | | |
|---|---|---|
| AU | A-36840/97 | 2/1998 |
| BE | 9 004 79 | 12/1984 |
| BE | 62-241061 | 12/1984 |
| DE | 29 43 436 A1 | 10/1979 |
| DE | 3 803 982 | 1/1990 |
| DE | 3803982 A1 | 1/1990 |
| EP | 0 084 441 A1 | 7/1983 |
| EP | 0 128 672 A1 | 12/1984 |
| EP | 0 135 422 A1 | 3/1985 |
| EP | 0 180 460 A1 | 5/1986 |
| EP | 0 370 146 A1 | 11/1988 |
| EP | 0 367 700 A2 | 5/1990 |
| EP | 0 398 645 B1 | 11/1990 |
| EP | 0 399 822 A2 HP | 11/1990 |
| EP | 0 421 409 A2 | 4/1991 |
| EP | 0 456 386 A2 | 11/1991 |
| EP | 0 469 864 A2 | 2/1992 |
| EP | 0 469 864 A3 | 2/1992 |
| EP | 0 565 314 A2 | 10/1993 |
| EP | 0 567 800 A1 | 11/1993 |
| EP | 0 570 123 B1 | 11/1993 |
| EP | 0 593 305 A2 | 4/1994 |
| EP | 0 651 554 A1 | 5/1995 |
| EP | 0 653 695 A2 | 5/1995 |
| EP | 0 668 695 A2 | 8/1995 |
| EP | 0 668 695 A3 | 8/1995 |
| EP | 0 695 985 A1 | 2/1996 |
| EP | 0 696 798 A1 | 2/1996 |
| EP | 0 714 204 A2 | 5/1996 |
| EP | 0 715 243 A1 | 6/1996 |
| EP | 0 715 244 A1 | 6/1996 |
| EP | 0 715 245 A1 | 6/1996 |
| EP | 0 715 246 A1 | 6/1996 |
| EP | 0 715 247 A1 | 6/1996 |
| EP | 0 725 376 A2 | 8/1996 |
| EP | 0 763 936 A2 | 9/1996 |
| EP | 0 749 081 A1 | 12/1996 |
| EP | 0 778 513 A2 | 6/1997 |
| EP | 0 795 873 A2 | 9/1997 |
| EP | 0 800 312 A1 | 10/1997 |
| EP | 0 913 757 A2 | 5/1999 |
| GB | A2136175 | 9/1984 |
| GB | 2264796A (I BM | 9/1993 |
| GB | 2294348 | 4/1996 |
| GB | 2295947 | 6/1996 |
| JP | 57-726 | 5/1982 |
| JP | 61 121145 A | 6/1986 |
| JP | 62-225059 | 8/1987 |
| JP | 62-241061 | 10/1987 |
| JP | 63 129564 A | 6/1988 |
| JP | 63 289646 A | 11/1988 |
| JP | 01-068835 | 3/1989 |
| JP | 64-68835 | 3/1989 |
| JP | 01 248891 A | 10/1989 |
| JP | 01 296363 A | 11/1989 |
| JP | 02-242352 | 9/1990 |
| JP | 02-247763 | 10/1990 |
| JP | 02-294855 | 12/1990 |
| JP | 04 117548 A | 4/1992 |
| JP | 04 504794 | 8/1992 |
| JP | 04-369068 | 12/1992 |
| JP | 05 173892 A | 7/1993 |
| JP | 05-181734 | 7/1993 |
| JP | 05-257783 | 10/1993 |
| JP | 05 258463 A | 10/1993 |
| JP | 05-268415 | 10/1993 |
| JP | 06 501120 | 1/1994 |
| JP | 06 152585 A | 5/1994 |
| JP | 06 161719 A | 6/1994 |
| JP | 06-175794 | 6/1994 |
| JP | 06-215010 | 8/1994 |
| JP | 06-225059 | 8/1994 |
| JP | 06 250924 | 9/1994 |
| JP | 07-056794 | 3/1995 |
| JP | 07-084852 | 3/1995 |
| JP | 07-141138 | 6/1995 |
| JP | 07-200317 | 8/1995 |
| JP | 07-200492 | 8/1995 |
| JP | 07-244639 | 9/1995 |
| JP | 07 319681 A | 12/1995 |
| JP | 08-137795 | 5/1996 |
| JP | 08-152990 | 6/1996 |
| JP | 08-185292 | 7/1996 |
| JP | 08-185298 | 7/1996 |
| JP | 01 68853 A | 3/1999 |
| WO | WO 85/02310 | 5/1985 |
| WO | WO 85/03584 | 8/1985 |
| WO | WO 90/02382 | 3/1990 |
| WO | WO 92/06438 | 4/1992 |
| WO | WO 92/22870 | 12/1992 |
| WO | WO 93/01550 | 1/1993 |
| WO | WO 94/01821 | 1/1994 |
| WO | WO 94/03859 | 2/1994 |
| WO | WO 94/06103 | 3/1994 |
| WO | WO 94/16395 | 7/1994 |
| WO | WO 94/18620 | 8/1994 |
| WO | WO 94/22266 | 9/1994 |
| WO | WO 94/27406 | 11/1994 |
| WO | WO 95/14289 | 5/1995 |
| WO | WO 96/00963 | 1/1996 |
| WO | WO 96/03835 | 2/1996 |
| WO | WO 96/05698 | 2/1996 |
| WO | WO 96/06503 | 2/1996 |
| WO | WO 96/13013 | 5/1996 |
| WO | WO 96/21192 | 7/1996 |
| WO | WO 96/24092 | 8/1996 |
| WO | WO 96/27155 | 9/1996 |
| WO | WO 97/03423 | 1/1997 |
| WO | WO 97/07656 | 3/1997 |
| WO | WO 97/25816 | 7/1997 |
| WO | WO 97/32251 | 9/1997 |
| WO | WO 97/43761 | 11/1997 |
| WO | WO 97/48203 | 12/1997 |
| WO | WO 98/09209 | 3/1998 |
| WO | WO 98/10381 | 3/1998 |
| WO | WO 98/37481 | 8/1998 |
| WO | WO 98/45768 | 10/1998 |
| WO | WO 99/01815 | 1/1999 |
| WO | WO 99/24928 | 5/1999 |
| WO | WO 99/48296 | 9/1999 |

OTHER PUBLICATIONS

Claude Baggett, *Cable's Emerging Role in the Information Superhighway*, Cable Labs, (undated), 13 slides.

Theodore Sedgwick Barassi, Document from Internet: *The Cybernotary: Public Key Registration and Certification and Authentication of International Legal Transactions*, (undated), 4 pages.

Hugh Barnes, memo to Henry LaMuth, subject: George Gilder articles, May 31, 1994, 2 pages.

*Comments in the Matter of Public Hearing and Request for Comments on the International Aspects of the National Information Infrastructure*, Before the Department of Commerce, Aug. 12, 1994, pp. 1–15 (comments of Dan Bart).

Michael Baum, "*Worldwide Electronic Commerce: Law, Policy and Controls Conference*," Nov. 11, 1993, 18 pages.

Robert M. Best, *Preventing Software Piracy With Crypto–Microprocessors*, Digest of Papers, VLSI: New Architectural Horizons, Feb. 1980, pp. 466–469.

Richard L. Bisbey, II and Gerald J. Popek, *Encapsulation: An Approach to Operating System Security*, (USC/Information Science Institute, Marina Del Rey, CA), Oct. 1973, pp. 666–675.

Rolf Blom, Robert Forchheimer, et al., *Encryption Methods in Data Networks*, Ericsson Technics, No. 2, Stockholm, Sweden, 1978.

Rick E. Bruner, Document from the Internet: *PowerAgent, NetBot help advertisers reach Internet shoppers*, Aug. 1997, 3 pages.

Denise Caruso, *Technology, Digital Commerce: 2 plans for watermarks, which can bind proof of authorship to electronic works*, N.Y. Times, Aug. 7, 1995, p. D5.

A.K. Choudhury, N. F. Maxemchuck, et al., *Copyright Protection for Electronic Publishing Over Computer Networks*, (AT&T Bell Laboratories, Murray Hill, N. J.) Jun. 1994, 17 pages.

Tim Clark, *Ad service gives cash back*, Document from the Internet: <www.news.com,/News/Item/0,4,13050,00.html> (visited Aug. 4, 1997), 2 pages.

Donna Cunningham, David Arneke, et al., Document from the Internet: *AT&T, VLSI Technology join to improve info highway security*, ( News Release) Jan. 31, 1995, 3 pages.

Lorcan Dempsey and Stuart Weibel, *The Warwick Metadata Workshop: A Framework for the Deployment of Resource Description*, D–Lib Magazine, Jul. 15, 1996.

Dorothy E. Denning and Peter J. Denning, *Data Security*, 11 Computing Surveys No. 3, Sep. 1979, pp. 227–249.

Whitfield Diffie and Martin E. Hellman, *New Directions in Cryptography*, IEEE Transactions on Information Theory, vol. 22, No. 6, Nov. 1976, pp. 644–651.

Whitfield Diffie and Martin E. Hellman, *Privacy and Authentication: An Introduction to Cryptography*, Proceedings of the IEEE, vol. 67, No. 3, Mar. 1979, pp. 397–427.

Stephen R. Dusse and Burton S. Kaliski, *A Cryptographic Library for the Motorola 56000*, Advances in Cryptology–Proceedings of Eurocrypt 90, (I.M. Damgard, ed., Springer–Verlag) 1991, pp. 230–244.

Esther Dyson, *Intellectual Value*, WIRED Magazine, Jul. 1995, pp. 136–141 and 182–183.

*Science, space and technology, Hearing before Subcomm. on Technology, Environment, and Aviation*, May 26, 1994 (testimony of D. Linda Garcia).

James Gleick, *Dead as a Dollar*, The New York Times Magazine, Jun. 16, 1996, Sect. 6, pp. 26–30, 35, 42, 50, 54.

Fred Greguras, Document from Internet: *Softic Symposium '95, Copyright Clearances and Moral Rights*, Dec. 11, 1995, 3 pages.

Louis C. Guillou, *Smart Cards and Conditional Access*, Advances in Cryptography—Proceedings of EuroCrypt 84 (T. Beth et al, Ed., Springer–Verlag, 1985) pp. 480–490.

Harry H. Harman, *Modern Factor Analysis*, Third Edition Revised, University of Chicago Press, Chicago and London, 1976.

Amir Herzberg and Shlomit S. Pinter, *Public Protection of Software*, ACM Transactions on Computer Systems, vol. 5, No. 4, Nov. 1987, pp. 371–393.

Jud Hofmann, *Interfacing the NII to User Homes*, (Consumer Electronic Bus. Committee) NIST, Jul. 1994, 12 slides.

Jud Hofmann, *Interfacing the NII to User Homes, Electronic Industries Association*, (Consumer Electronic Bus Committee) (undated), 14 slides.

Stannie Holt, Document from the Internet: *Start–up promises user confidentiality in Web marketing service*, InfoWorld Electric News (updated Aug. 13, 1997).

Jay J. Jiang and David W. Conrath, *A Concept–based Approach to Retrieval from an Electronic Industrial Directory*, International Journal of Electronic Commerce, vol. 1, No. 1 (Fall 1996) pp. 51–72.

Debra Jones, Document from the Internet: *Top Tech Stories, PowerAgent Introduces First Internet 'Informediary' to Empower and Protect Consumers*, (updated Aug. 13, 1997) 3 pages.

Kevin Kelly, *E–Money*, Whole Earth Review, Summer 1993, pp. 40–59.

Stephen Thomas Kent, *Protecting Externally Supplied Software in Small Computers*, (MIT/LCS/TR–255) Sep. 1980 254 pages.

David M. Kristol, Steven H. Low and Nicholas F. Maxemchuk, *Anonymous Internet Mercantile Protocol*, (AT&T Bell Laboratories, Murray Hill, NJ) Draft: Mar. 17, 1994.

Carl Lagoze, *The Warwick Framework, A Container Architecture for Diverse Sets of Metadata*, D–Lib Magazine, Jul./Aug. 1996.

Mike Lanza, e–mail, *George Gilder's Fifth Article—Digital Darkhorse—Newspapers*, Feb. 21, 1994.

Steven Levy, *E–Money, That's What I want*, WIRED, Dec. 1994, 10 pages.

Steven H. Low and Nicholas F. Maxemchuk, *Anonymous Credit Cards*, AT&T Bell Laboratories, Proceedings of the $2^{nd}$ ACM Conference on Computer and Communication Security, Fairfax, VA, Nov. 2–4, 1994, 10 pages.

Steven H. Low, Nicholas F. Maxemchuk, and Sanjoy Paul, *Anonymous Credit Cards and its Collusion Analysis* (AT&T Bell Laboratories, Murray Hill, N.J.) Oct. 10, 1994, 18 pages.

S. H. Low, N.F. Maxemchuk, et al., *Document Marking and Identification using both Line and word Shifting* (AT&T Bell Laboratories, Murray Hill, N.J.) Jul. 29, 1994, 22 pages.

Malcolm Maclachlan, Document from the Internet: *PowerAgent Debuts Spam–Free Marketing*, TechWire, Aug. 13, 1997, 3 pages.

N.F. Maxemchuk, *Electronic Document Distribution*, (AT&T Bell Laboratories, Murray Hill, N.J.) (undated).

Eric Milbrandt, Document from the Internet: *Steganography Info and Archive*, 1996, 2 pages.

Ryoichi Mori and Masaji Kawahara, *Superdistribution: The Concept and the Architecture*, The Transactions of the EIEICE, V, E73, No. 7, Tokyo, Japan, Jul. 1990.

Walter S. Mossberg, *Personal Technology, Threats to Privacy On–Line Become More Worrisome*, The Wall Street Journal, Oct. 24, 1996.

Nicholas Negroponte, *Some Thoughts on Likely and Expected Communications Scenarios: A Rebuttal*, Telecommunications, Jan. 1993, pp. 41–42.

Nicholas Negroponte, *Electronic Word of Mouth*, WIRED, Oct. 1996, p. 218.

Peter G. Neumann, Robert S. Boyer, et al., *A Provably Secure Operating System: The System, Its Applications, and Proofs*, Computer Science Laboratory Report CSL–116, Second Edition, SRI International, Jun. 1980.

Joseph N. Pelton (Dr.), *Why Nicholas Negroponte is Wrong About the Future of Telecommunication*, Telecommunications, Jan. 1993, pp. 35–40.

Gordon Rankine (Dr.), *Thomas—A Complete Single–Chip RSA Device*, Advances in Cryptography, Proceedings of CRYPTO 86, (A.M. Odiyzko Ed., Springer–Verlag) 1987, pp. 480–487.

Arthur K. Reilly, *Input to the International Telecommunications Hearings, Panel 1: Component Technologies of the NII/GII*, Standards Committee T1–Telecommunications (undated).

Paul Resnick and Hal R. Varion, *Recommender Systems*, Communications of the ACM, vol. 40, No. 3, Mar. 1997 pp. 56–89.

Lance Rose, *Cyberspace and the Legal Matrix: Laws or Confusion?*, 1991.

Steve Rosenthal, *Interactive Network: Viewers Get Involved*, New Media, Dec. 1992, pp. 30–31.

Steve Rosenthal, *Interactive TV: The Gold Rush is on*, New Media, Dec. 1992, pp. 27–29.

Steve Rosenthal, *Mega Channels*, New Media, Sep. 1993, pp. 36–46.

Edward Rothstein, *Technology, Connections, Making the Internet come to you through 'push' technology*, N.Y. Times, Jan. 20, 1997, p. D5.

Ken Rutkowski, Document from Internet: *PowerAgent Introduces First Internet 'Informediary' to Empower and Protect Consumers*, Tech Talk News Story, Aug. 4, 1997, 1 page.

Ira Sager (Edited by), *Bits & Bytes*, Business Week, Sep. 23, 1996, p. 142E.

Schlosstein, Steven, *America: The G7's Comeback Kid*, International Economy, Jun./Jul. 1993, 5 pages.

Ingrid Scnaumueller–Bichl and Ernst Piller, *A Method of Software Protection Based on the Use of Smart Cards and Cryptographic Techniques*, (undated), 9 pages.

Jurgen Schurmann, *Pattern Classification, A Unified View of Statistical and Neural Approaches*, John Wiley & Sons, Inc., 1996.

Victor Shear, *Solutions for CD–ROM Pricing and Data Security Problems*, CD ROM Yearbook 1988–1989 (Microsoft Press 1988 or 1989) pp. 530–533.

Karl Siuda, *Security Services in Telecommunications Networks*, Seminar: Mapping New Applications Onto New Technologies, edited by B. Plattner and P Gunzburger; Zurich, Mar. 8–10, 1988, pp. 45–52, XP000215989.

Sean Smith and J.D. Tygar, *Signed Vector Timestamps: A Secure Protocol for Partial Order Time*, CMU–93–116, School of Computer Science Carnegie Mellon University, Pittsburgh, Pennsylvania, Oct. 1991; version of Feb. 1993, 15 pages.

Mark Stefik, *Letting Loose the Light: Igniting Commerce in Electronic Publication*, (Xerox PARC, Palo Alto, CA) 1994–1995, 35 pages.

Mark Stefik, *Letting Loose the Light: Igniting Commerce In Electronic Publication*, Internet Dreams: Archetypes, Myths, and Metaphors. Massachusetts Institute of Technology, 1996, pp. 219–253.

Mark Stefik, *Chapter 7, Classification*, Introduction to Knowledge Systems (Morgan Kaufmann Publishers, Inc., 1995) pp. 543–607.

Tom Stephenson, *The Info Infrastructure Initiative: Data Super Highways and You*, Advanced Imaging, May 1993, pp. 73–74.

Bruce Sterling, *Literary freeware: Not for Commercial Use*, remarks at Computers, Freedom and Private Conference IV, Chicago, IL, Mar. 26, 1994.

Bruno Struif, *The Use of Chipcards for Electronic Signatures and Encryption*, Proceedings for the 1989 Conference on VSLI and Computer Peripherals, IEEE Computer Society Press, 1989, pp. (4)155–(4)158.

J.D. Tygar and Bennet Yee, *Cryptography: It's Not Just For Electronic Mail Anymore*, CMU–CS–93–107, School of Computer Science Carnegie Mellon University, Pittsburgh, PA, Mar. 1, 1993, 21 pages.

J.D. Tygar and Bennet Yee, *Dyad: A System for Using Physically Secure Coprocessors*, School of Computer Science, Carnegie Mellon University, Pittsburgh, PA (undated), 41 pages.

J.D. Tygar and Bennet Yee, *Dyad: A System for Using Physically Secure Coprocessors*, School of Computer Science, Carnegie Mellon University, Pittsburgh, PA, May 1991, 36 pages.

T. Valovic, *The Role of Computer Networking in the Emerging Virtual Marketplace*, Telecommunications, (undated), pp. 40–44.

Joan Voight, *Beyond the Banner*, Wired, Dec. 1996, pp. 196, 200, 204.

Steven Vonder Haar, Document from the Internet: *PowerAgent Launches Commerical Service*, Interactive Week, Aug. 4, 1997, 1 page.

Robert Weber, *Metering Technologies for Digital Intellectual Property*, A Report to the International Federation of Reproduction Rights Organisations (Boston, MA), Oct. 1994, pp. 1–29.

Robert Weber, Document from the Internet: *Digital Rights Management Technologies*, Oct. 1995, 21 pages.

Robert Weber, *Digital Rights Management Technologies*, A Report to the International Federation of Reproduction Rights Organisations, Northeast Consulting Resources, Inc., Oct. 1995, 49 pages.

Adele Weder, *Life on the Infohighway*, INSITE, (undated), pp. 23–25.

Steve H. Weingart, *Physical Security for the ABYSS System*, (IBM Thomas J. Watson Research Center, Yorktown Heights, NY), 1987, pp. 52–58.

Daniel J Weitzner, *A Statement on EFF's Open Platform Campaign as of Nov., 1993*, 3 pages.

Steve R. White, *ABYSS: A Trusted Architecture for Software Protection*, (IBM Thomas J. Watson Research Center, Yorktown Heights, NY), 1987, pp. 38–50.

Bennet Yee, *Using Secure Coprocessors*, CMU–CS–94–149, School of Computer Science, Carnegie Mellon University, Pittsburgh, PA, 1994, 94 pages.

Frank Yellin, Document from the Internet: *Low Level Security in Java*, Sun Microsystems, 1996, 8 pages.

Symposium: *Applications Requirements for Innovative Video Programming; How to Foster (or Cripple) Program Development Opportunities for Interactive Video Programs Delivered on Optical Media: A Challenge for the Introduction of DVD (Digital Video Disc)* (Oct. 19–20, 1995, Sheraton Universal Hotel, Universal City CA).

*Argent Information, Q&A Sheet*, Document from the Internet: <http://www.digital–watermark.com/>, Copyright 1995, The DICE Company, (last modified Jun. 16, 1996), 7 pages.

*New Products, Systems and Services*, AT&T Technology, vol. 9, No. 4, (undated), pp. 16–19.

*Cable Televison and America's Telecommunications Infrastructure*, (National Cable Television Association, Washington, D.C.), Apr. 1993, 19 pages.

CD ROM: *Introducing . . . The Workflow CD–ROM Sampler* (Creative Networks, MCIMail: Creative Networks, Inc.), (undated).

*Codercard, Basic Coder Subsystem* (Interstate Electronics Corp., Anaheim, CA), (undated) 4 pages.

Collection of documents including: *Protecting Electronically Published Properties, Increasing Publishing Profits*, (Electronic Publishing Resources Inc.,) Jan. 1993, 25 pages.

*Communications of the ACM*, vol. 39, No. 6, Jun. 1996, 130 pages.

*Communications of the ACM*, "Intelligent Agents," vol. 37, No. 7, Jul. 1994, 170 pages.

*Computer Systems Policy Project (CSSP), Perspectives on the National Information Infrastructure: Ensuring Interoperability*, Feb. 1994, 5 slides.

*DiscStore* (Electronic Publishing Resources, Chevy Chase, MD), 1991.

*DSP56000/DSP56001 Digital Signal Processor User's Manual*, (Motorola), 1990, p. 2–2.

*A Supplement to Midrange Systems, Premenos Corp. White Paper: The Future of Electronic Commerce*, Document from Internet: <webmaster@premenos.com>, Aug. 1995, 4 pages.

*CGI Common Gateway Interface*, Document from the Internet: <cgi@ncsa.uiuc.edu>, 1996, 1 page.

*HotJava™: The Security Story*, Document from the Internet: (undated) 4 pages.

*About the Digital Notary Service*, Document from the Internet: <info@surety.com>, (Surety Technologies), May 1994, 6 pages.

*Templar Overview: Premenos*, Document from the Internet: <info@templar.net>, (undated), 4 pages.

*Templar Software and Services, Secure, Reliable, Standards–Based EDI Over the* Internet: Document from the Internet: <info@templar.net,> (Premenos) (undated), 1 page.

*JAVASOFT, Frequently Asked Questions—Applet Security*, Document from Internet: <java@java.sun.com>, Jun. 7, 1996, 8 pages.

*News from The Document Company XEROX, Xerox Announces Software Kit for Creating 'Working Documents' with Dataglyphs* Document from Internet: Nov. 6, 1995, 13 pages.

*Premenos Announces Templar 2.0—Next Generation Software for Secure Internet EDI*, Document from Internet: <webmaster@templar.net>, Jan. 17, 1996, 1 page.

*WEPIN Store, Stenography (Hidden Writing)*, Document from Internet: (Common Law), 1995, 1 page.

*Sag's durch die Blume*, Document from Internet: <marit@schulung.netuse.de,> (German), (undated), 5 pages.

*A Publication of the Electronic Frontier Foundation*, EFFector Online vol. 6 No. 6., Dec. 6, 1993, 8 pages.

*EIA and TIA White Paper on National Information Infrastructure*, The Electronic Industries Association and the Telecommunications Industry Association, Washington, D.C., (undated).

*Electronic Currency Requirements, XIWT* (Cross Industry Working Group), (undated).

*Electronic Publishing Resources Inc. Protecting Electronically Published Properties Increasing Publishing Profits* (Electronic Publishing Resources, Chevy Chase, MD) 1991, 19 pages.

*What is Firefly?*, Document from the Internet: <www.ffly.com>, (Firefly Network, Inc.) Firefly revision: 41.4, (Copyright 1995, 1996), 1 page.

*First CII Honeywell Bull International Symposium on Computer Security and Confidentiality*, Conference Text, Jan. 26–28, 1981, pp. 1–21.

*Framework for National Information Infrastructure Services*, Draft, U.S. Department of Commerce, Jul. 1994.

*Framework for National Information Infrastructure Services*, NIST, Jul. 1994, 12 Slides.

*Intellectual Property and the National Information Infrastructure, a Preliminary Draft of the Report of the Working Group on Intellectual Property Rights*, Green paper, Jul. 1994, 141 pages.

*Multimedia Mixed Object Envelopes Supporting a Graduated Fee Scheme Via Encryption*, IBM Technical Disclosure Bulletin, vol. 37, No. 3, Mar. 1, 1994, pp. 413–417, XP000441522.

*Transformer Rules Strategy for Software Distribution Mechanism–Support Products*, IBM Technical Disclosure Bulletin, vol. 37, No. 48, Apr. 1994, pp. 523–525, XP000451335.

*IISP Break Out Session Report for Group No. 3, Standards Development and Tracking System*, (undated).

*Information Infrastructure Standards Panel: NII "The Information Superhighway"*, NationsBank—HGDeal—ASC X9, (undated), 15 pages.

*Invoice? What's an Invoice?*, Business Week, Jun. 10, 1996, pp. 110–112.

*Micro Card* (Micro Card Technologies, Inc., Dallas, TX), (undated), 4 pages.

*Background on the Administration's Telecommunications Policy Reform Initiative*, News Release, The White House, Office of the President, Jan. 11, 1994, 7 pages.

*NII, Architecture Requirements, XIWT*, (undated).

Symposium: *Open System Environment Architectural Framework for National Information Infrastructure Services and Standards, in Support of National Class Distributed Systems*, Distributed System Engineering Program Sponsor Group, Draft 1.0, Aug. 5, 1994, 34 pages.

*Proper Use of Consumer Information on the Internet*, Document from the Internet, White Paper, (PowerAgent Inc., Menlo Park, CA) Jun. 1997, 9 pages.

*What the Experts are Reporting on PowerAgent*, Document from the Internet, PowerAgent Press Releases, Aug. 13, 1997, 6 pages.

*What the Experts are Reporting on PowerAgent*, Document from the Internet, PowerAgent Press Releases, Aug. 4, 1997, 5 pages.

*Portland Software's Ziplock*, Internet Information, Copyright Portland Software 1996–1997, 12 pages.

Press Release, National Semiconductor and EPR Partner for Information Metering/Data Security Cards (Mar. 4, 1994).

R01 (Personal Library Software, 1987 or 1988).

R01—Solving Critical Electronics Publishing Problems (Personal Library Software, 1987 or 1988).

*Serving the Community: A Public Interest Vision of the National Information Infrastructure*, Computer Professionals for Social Responsibility, Executive Summary (undated).

Special Report, *The Internet: Fulfilling the Promise*; Lynch, Clifford, *The Internet Bringing Order From Chaos*; Resnick, Paul, *Search the Internet*, Hearst, Marti A., *Filtering Information on the Internet*; Stefik, Mark, *Interfaces for Searching the Web*; Scientific American, Mar. 1997, pp. 49–56, 62–67, 68–72, 78–81.

*The 1:1 Future of the Electronic Marketplace: Return to a Hunting and Gathering Society*, (undated), 2 pages.

*The Benefits of RDI for Database Protection and usage Based Billing* (Personal Library Software, 1987 or 1988).

*The New Alexandria No. 1*, Alexandria Institute, Jul.–Aug. 1986, pp. 1–12.

*Is Advertising Really Dead?*, Wired 1.02, Part 2, 1994.

*How Can I Put an Access Counter on My Home Page?*, World Wide Web FAQ, 1996, 1 page.

XIWT Cross Industry Working Team, Jul. 1994, 5 pages.

Frederick B. Cohen, *Operating System Protection Through Program Evolution*, 8246 Computers & Security, No. 6, (Oxford, Great Britain) Oct. 1993, pp. 565–584.

Olin Sibert et al., *DigiBox: A Self–Protecting Container for Information Commerce*, Proceedings of the First USENIX Workshop on Electronic Commerce, New York, NY, Jul. 1995, 9 pages.

Olin Sibert et al., *Securing the Content, Not the Wire, for Information Commerce*, InterTrust Technologies Corporation, 1996, 12 pages.

Garrett et al., "Toward an electronic Copyright Management System," *J. of the Amer. Soc. for Info.*, 44(8):468–473, 1993.

Kozuka et al., "Electronic Magazine Editing Software for 3DO," *National Technical Report, Matsushita Electric Industrial Co., Ltd.*, 40(6):88–97, 1994.

Rozenblit, Moshe, "Secure Software Distribution," *IEEE Network Operations and Management Symposium*, 2:486–496, 1994.

Seki et al., "A Proposal for New Software Distribution System Using a Secret Code," *Research Report of Information Processing Societies*, 93(64):19–28, 1993.

Torii et al., "System Architecture for Super Distribution," *Technical Research Report of Institute of Electronics, Information and Communication Engineers*, 94(240):59–66, 1994.

Ueki et al., "Accounting Processing in Right Management Mechanism for Super Distribution," *Study Report of Information Processing Societies*, 90(1):1–10, 1990.

Abadi, M., et al., "A Calculus for Access Control in Distributed Systems", Digital Equipment Corporation, Feb. 28, 1991, revised Aug. 28, 1991.

Abadi, M. et al., "Authentication and Delegation with Smart–cards," Technical Report 67, DEC Systems Research Center, Oct. 1990, available at <http://citeseer.nj.nec.com/article/abadi92authentication.hmtl>, 22 pages.

Abrams, Marshall D, "Renewed Understanding of Access Control Policies", Proceedings of the 16th Computing Natioal Security Conference, 1993.

Aharonian, G., "Software Patents—Relative Comparison of EPO/PTO/JPO Software Searching Capacities," Source Translation & Optimization.

Antonelli et al, "Access Control in a Workstation–Based Distributed Computing Environment," CITI Technical Report 90–2 (Jul. 17, 1990).

Arms, W.Y., "Key Concepts in the Architecture of the Digital Library," D–Lib Magazine, (Jul. 1995).

Atkinson, R., "Security Architecture for the Internet Protocol," Network Working Group RFC 1825 (Aug. 1995).

Aucsmith, David, "Tamper Resistant Software: An Implementation", IAL.

Avery, et al., "Recommender Systems for Evaluating Computer Messages," Communications of the ACM, pp. 88–89 (Mar. 1997).

Bender et al. "Techniques for Data Hiding," IBM Systems Journal, vol. 35, Nos. 3&4 (1996).

Berghal et al., "Protecting Ownership Rights Through Digital Watermaking," IEEE Computing, vol. 29, No. 7 (Jul. 1996).

Bernstein et al., "Copyrights, Distribution Chains, Integrity, and Privacy: The Need for a Standards–Based Solution," Electronic Publishing Resources.

Bishop, M., "Privacy–Enhanced Electronic Mail," Privacy and Security research Group, IAB.

Blaze, Matt, "A Cryptographic File System for Unix," pre–print of paper for First ACM Conference on Computer and Communications Security, Fairfax, Virginia, Nov. 3–5, 1993, 8 pages.

Blaza, Matt, et al., "Decentralized Trust Management" Proc. IEEE Conference on Security and Privacy, May 1996.

Blaze, M., "Key Management in an Encrypting File Systems," Proc. Summer 1994 USENIX Technical Conference (Jun. 1994).

Blaze, Matt, et al., "The Architecture and Implementaiton of Network Layer Security Under Unix", Columbia University and AT&T Bell Laboratories, 1994.

Boisson, Jean–Francois, "How to CITEDise Application: Guidelines and Examples," CITED 5469.

Boisson, Jean–Francois, "1–Business Perspective and Requirements, 2–The CITED Project: Keys and Knowledge," CITED 5469.

Boisson, Jean–Francois, "Management of Intellectual Property Rights in the Electronic Commerce: Textile Design Sales and Other Similar Initatives," EURITIS.

Boisson, Jean–Francois, "Software Components; Deliverable Trial Offer," CITED 5469.

Bos et al., "SmartCash: a Practical electronic payment System," Center for Mathematics and Computer Science, Report CS–R9035.

Brassil et al., "Electronic Marking and Identification Techniques to Discourage Document Copying," AT&T Bell Laboratories, Proc. Infocom 94, 1994.

Brin, Sergey, et al., "Copy Detection Mechanism for Digital Documents", Stanford University.

Brunnstein et al., "Intellectual Property Rights and new Technologies," Proceedings of the KnowRight '95 Conference (Aug. 1995).

Burns, Christopher, "AAP Draft: Local Access and Usage Controls", Association of American Publishers Report, Apr. 13, 1995.

Case, J., "A Simple Network Management Protocol (SNMP)," Network Working Group, May 1990, pp. 1–21.

Castano, S. et al., *Database Security*, Addison–Wesley & Acm Press, 1995.

Chaum, David, "Achieving Electronic Privacy," Scientific American, Aug. 1992, pp. 96–101.

Chaum, D., "Privacy and Social Protection in Electronic Payment Systems," Chapter 12, The Future of Money in the Information Age.

Chaum, David, "Security Without Identification: Card Computers to Make Big Brother Obsolete," viewed on Aug. 23, 2002 at <http://www.chaum.com/articles/Security_Wthout_Identification.html> pp. 1–24.

Chaum, D., "Security Without Identification: Card Computers to Make Big Brother Obsolete," viewed on Aug. 23, 2002 at <http://www.chaum.com/articles/Security_Wthout_Identification.html> pp. 1–24.

Chaum, David, "Smart Card 2000," Selected Papers from the Second International Smart Card 2000 Conference, Oct. 4–6, 1989.

Chaum, David, *SmartCard 2000*, Elsevier Science Publishers, 1991.

Chaum, D., "Untraceable Electronic Cash," Extended Abstract, Center for Mathematics and Computer Science, 1988, pp. 319–327.

Chaum, et al., "Wallet Databases with Observers," CWI, Aarhus University, Advances in Cryptography, Proceedings of Crypto '92, pp. 89–105 (1992).

Chor et al., "Tracing Traitors," Crypto 94, p. 257 (1994).

Choudhury, A.K. et al., "Copyright Protection for Electronic Publishing Over Computer Networks," AT&T Bell Laboratories, Murray Hill, NJ, Jun. 1994, 18 pages.

Choy, D.M., et al., "A Digital Library System for Periodicals Distribution", May 1996.

Cina Jr. et al., "ABYSS: A Basic Yorktown Security System PC Software Asset Protection Concepts," IBM Research Report No. RC 12401, IBM Thomas J. Watson Research Center (Dec. 18, 1986).

Clarke et al., "Cryptography Issues in Plain Text," Privacy Law and Policy Reporter (1996).

Cousins, Steve B. et al., "InterPay: Managing Multiple Payment Mechanisms in Digital Libraries."

Coutrot, Francois, et al., "A Single FConditional Access System for Satellite–Cable and Terrestrial TV", IEEE Transactions on Consumer Electronics, vol. 35, No. 3, Aug. 1989.

Cox, Benjamin et al., "NetBill Security and Transaction Protocol," Carnegie Mellon University.

Cox, B., "Superdistribution," Wired, Sep. 1994, 2 pages.

Cox, Brad, "What If There is Silver Bullet and the Competition Gets it First?," Journal of Object–Oriented Programming, Jun. 1992.

Crocker et al., "MIME Object Security Services," Network Working Group RFC 1848 (Oct. 1995).

Curry, D.A., UNIX System Security: *A Guide for Users and System Administrators*, Addison–Wesley Publishing Company, Inc., 1992.

Custer, H. *Inside Windows NT*, Microsoft Press, Redmond WA, 1993.

Davies, D.W.; Price, W.L.; *Security for Computer Networks*, John Wiley & Sons, 1984.

Davin, J., et al., "SNMP Administrative Model," Network Working Group, Jul. 1992, pp. 1–22.

Deering, S.E., "Host Extensions for IP Multicasing," Network Working Group, RFC 1112 (Aug. 1989).

Dempsey, Lorcan, et al., "The Warwick Metadata Workshop: A Framework for the Deployment of Resource Description," Jul./Aug. 96.

Denning, Dorothy E.R., *Cryptography and Data Security*, Addison–Wesley Publishing Company, 1982, Reprinted with corrections, Jan. 1983.

Denning, D. E., "Secure Personal Computing in an Insecure Network," Communications of the ACM, Aug. 1979, vol. 22, No. 8, pp. 476–482.

Diffie, Whitfield, "Authentication and Authenticated Key Exchanges", Sun Microsystems and Bell–Northern Research, Mar. 6, 1992.

Diffie, Whitfield, et al., "New Directions in Cryptography", Stanford University, 1976.

Diffie, Whitfield, "The First Ten Years of Public–Key Cryptography", Proceedings of the IEEE, vol. 76, No. 5, May 1988.

Doster et al., "Third–Party Authentication in the Institutional File System," Center for Information Technology Integration.

Eastlake III, D., "Physical Link Security Type of Service," Network Working Group RFC 1455 (May, 1993).

Eastlake III et al., "Randomness Recommendations for Security," Network Working Group RFC 1750, Dec. 1994.

Ebersol, Joseph, "Protecting Intellectual Property Rights on the Information Superhighways," Mar. 1994.

Eizenberg, G., "Contribution of Information Technology Security to Intellectual Property Protection," CERT–DERI.

Epstein, J., "A Trusted X Window System Server for Trusted Mach," Usenix Association Proceedings, Mach Workshop, Oct. 4–5, 1990, Burlington, Vermont, pp. 141–155.

Erickson, John S., "A Copyright Management System for Networke Interactive Multimedia", Proceedings of the 1995 Dartmouth Institute for Advanced Graduate Studies, 1995.

Erickson, John S., "Rights Management Through Enhanced Attribution", Presented at INET 96 Proceedings, Jun. 1996.

Everett, David B., "Smart Card Tutorial—Part 1," Sep. 1992.

Feistel, H. "Cryptographic Coding for Data–Bank Privacy," IBM document RC 2827 (Mar. 18, 1970).

Fine, T., et al., "Assuring Distributed Trusted Mach," Secure Computing Corporation, 1993, 13 pages.

Finin et al., "A Language and Protocol to Support Intelligent Agent Interoperability," Proceedings of the CE & CALS, Washington '92 Conference (Apr. 1992).

Fuchsberger et al., "Public–key Cryptography on Smart Cards," Information Security Group.

Frederick, Keith P., "Certification and Accreditation Approach", Air Force Cryptologic Support Center (OL–FP).

Fugini, M.G., et al., "Authorization and Access Control in the Office–Net System," Computer Security in the Age of Information, 1989, pp. 147–162.

Galvin, J., et al., "SNMP Security Protocols," Network Working Group, Jul. 1992, pp. 1–26.

Galvin et al., "Security Protocols for verison 2 of the Simple Network Management Protocol (SNMPv2)," Network Working Group RFC 1446 (Apr. 1993).

Gamble, Todd, "Implementing Execution Controls in Unix," Usenix Association, Proceedings of the Seventh Systems Administration Conference, Nov. 1–5, 1993, Monterey, California, pp. 237–242.

Garfinkel, Simson, et al., *Practical UNIX Security*, O'Reilly & Associates, Inc., 1991.

Gasser, M., et al., "The Digital Distributed System Security Architecture," Reprint from the Proceedings of 1989 National Computer Security Conference, 1989, pp. 1–13.

Gaster, J. L., "Authors' Rights and Neighboring Rights in the Information Society," DG XV/E/4, European Commission.

Gilde, R., "DAT–Heads: Frequently Asked Questions," 1991, Release 3.1 (Sep. 2, 1992).

Gircys, G.R., *Understanding and Using COFF*, O'Reilly & Associates, Inc. (Nov. 1988).

Goodman, Bill, "Compactor Pro."

Gosler, James, "Software Protection: Myth or Reality", *Lecture Notes in Computer Science, Advances in Cryptology*—Crypto '85 Proceedings, 1985.

Gozani et al., "GAFFES: The Design of a Globally Distributed File System," Report No. UCB/CSD 87/361; Computer Science Division (EECS), U.C. Berkley (Jun. 1997).

Greenwald et al., "The Distributed Compartment Model for resource management and Access Control," Technical report No. TR94–035, The University of Florida (Oct. 1994).

Griswold, Gary N., "A Method for Protecting Copyright on Networks", IMA Intellectual Property Proceedings, vol. 1, Issue 1, Jan. 1994.

Guillou, Louis C.; "Smart Cards and Conditional Access", Springer–Verlag, 1988.

Haller, N., "The S/Key One–Time Password System," Network Working Group RFC 1760 (Feb. 1995).

Hardy, N., "The Keykos Architecture," Eighth Edition, Dec. 1990, pp. 1–8.

Harris, J., et al. "Bento Specification," Apple Computer, Inc., Jul. 15, 1993, 106 pages.

Harly, K. et al., "Case Study: The VISA Transaction Processing System," May 30, 1988, pp. 1–23.

Hauser, Ralf, "Control Information Distribution and Access," Dissertation Der Wirtschaftswissenschaftlichen Fakultat Der Universitat Zurich, May 31, 1995.

Hauser, Ralf, et al., "LTTP Protection—A Pragmatic Approach to Licenseing", Institut fur Informatik, Universitat Zurich, Jan. 13, 1994.

Hellman, "Multi–user Cryptographic Techniques".

Herzberg, Amir, et al., "On Software Protection", Proceedings of the 4th Jerusalem Conference on Information Technology (JCIT), IEE Computer Society Proes. Apr. 1984.

Herzberg, Amir, et al., "Public Protection of Software", *ACM Transactions on Computer Systems*, vol. 5, No. 4, Nov. 1987.

Hickman, Kipp, E.B., SSL 2.0 Protocol Specificatoin.

Hill, William et al., "Edit Wear and Read Wear," Computer Graphics and Interactive Media Research Group, ACM; May 3–7, 1992.

Hill, William et al., "History–Enriched Digital Objects," Computer Graphics and Interactive Media Research Group; Bell Communications Research, 1993.

Jones et al., "Credentials for Privacy and Interoperation," University of Illinois at Urbana–Champaign.

Johnson, H.L., et al., "A Secure Distributed Capacity Based System," ACM, 1985, pp. 392–402.

Kahn, Robert, et al., A Framework for Distgributed Digital Object Services, Corporation for National Research Initatives, May 13, 1995.

Kaliski, Jr., et al. "A Layman's Guide to a Subset of ASN.1, BER, and DER", RSA Laborato4ries Technical Note, 1991, Revised Nov. 1, 1993.

Kane, Cem et al., *Testing Computer Software*, Second Edition, Van Nostrand Reinhold, 1988.

Kaplan, M., "IBM Cryptolopes, Super Distribution and Digital Rights Management," viewed at <<http://www.research.ibm.com/people/k/kaplan/cryptolope–docs/crypap.html> on Dec. 30, 1996, pp. 1–10.

Kastenholz, F., "The Definitions of Managed Objects for the Security Protocols of the Point–to–Point Protocol," Network Working Group RFC 1472 (Jun. 1993).

Kelman, Alistair, "Electronic Copyright Management: Possibilities and Problems", Scientists for Labor Presentation, Nov. 14, 1996.

Kent, S., "U.S. Department of Defense Security Options for the Internet Protocol," Network Working Group RFC 1108 (Nov. 1991).

Kim, Gene H., et al. "Experiences with Tripwire: Using Integrity Checkers for Intrusion Detection," Purdue Technical Report CSD–TR–94–012, Feb. 21, 1994.

Kim, G.H., "The Design and Implementation of Tripwire: A File System Integrity Checker," Nov. 19, 1993.

Ketchpel, Steve P., et al. "Shopping Models: A Flexible Architecture for Information Commerce", Stanford University.

Kim, W., et al., "Features of the ORION Object–Oriented Database System," 1989, pp. 251–282.

Koenig, A., "Automatic Software Distribution," Usenix Association Software Tools Users Group, Summer Conference, Salt Lake City, Jun. 12–15, 1984, pp. 312–322.

Kohl et al., "Safeguarding Digital Library Contents and Users," IBM Research Division, D–Lib Magazine (Sep. 1997).

Kohl et al., "Safeguarding Digital Library Contents and Users," IBM research Division, D–Lib magazine, (Sep. 1997).

Kohl, J. et al., "The Kerberos Network Authentication Service (V 5)," Network Working Group Request for Comments RFC–1510, Sep. 1993, 104 pages.

Kohnfelder, Loren M., "Toward a Practical Public–Key Cryptosystem", May 1978.

Lacy, Jack, et al., "Music on the Internet and the Intellectual Property Protection Problem".

Lagoze et al., "A Design for Inter–Operable Secure Object Stores (ISOS)," Cornell University, NCSA, CNRI (Nov. 1995).

Lagoze, Carl, "A Secure Repository Design for Digital Libraries", D–Lib Magazine, Dec. 1995.

Lampson, Butler, et al., "Authentication in Distributed Systems: Theory and Practice", Digital Equipment Corporation, 1992.

Langelaar, G.C., "Overview of Protection Methods in Existing TV and Storage Devices," SMS–TUD–609–1, Final Ver. 1,2, Feb. 26, 1996.

Lesk, M., "Digital Libraries Meet Electronic Commerce: On–Screen Intellectual Property," (Dec. 15, 1998).

Lord et al., "Access Management in Multi–Administration Networks," IEE 2th International Conference on Secure Communication Systems (1986).

Low, S.H., et al., Document Marking and Identification Using Both Line and Word Shifting, Infocom 95, 1994.

Low, S.H., et al., "Document Marking and Identification Using Both Line and Word Shifting," AT&T Bell Laboratories Infocom 95, Jul. 29, 1994.

Mathy, Laurent, "Features of the ACCOPI Multimedia Transport Service", Lecture Notes in Computer Science No. 1045, Proc. of European Workshop IDMS' 96, Mar. 1996.

Maxemchuk, N.F., "Electronic Document Distribution", AT&T Bell Laboratories.

Merkle, Ralph C., "Protocols for Public Key Cryptosystems", IEEE, 1980.

Meyer, Carl H. et al., *Cryptography: A New Dimension in Computer Security*, John Wiley & Sons, New York, 1982.

Meyer, Carl H., et al., *Cryptography: A New Dimension in Computer Data Security*, John Wiley & Sons, Inc., 1982.

McCloghrie, K., et al., "Definitions of Managed Objects for Administration of SNMP Parties," Network Working Group, Jul. 1992, pp. 1–17.

McClogbrie et al., "Management Information Base for Network Management of TCP/IP–based Internets," Network Working Group, RFC 1156 (May 1990).

McCollum, C.J., et al., "Beyond the Pale of MAC and DAC–Defining New Forms of Access Control,", Unisys Defense Systems, 1990, pp. 190–200.

Millen, J.K., et al., "Security for Object–Oriented Database Systems," Proceedings of the 1992 IEREE Computer Society Symposium on Research in Security and Privacy, May 4–6, 1992, Oakland, California, pp. 260–272.

Moens, Jan, "Case of Application of the Generic CITED Model to the CITEDisation of a Directory Database on CD–ROM, Ver. 2.0," ESPIRIT II, Project 5469, The CITED Consortium, Nov. 30, 1992.

Moens, Jan, "Report on the Users Requirements, Ver. 1.0," ESPIRIT II, Project 5469, The CITED Consortium, Nov. 27, 1991.

Moffett, J. D., "Delegation of Authority Using Domain–Based Access Rules," thesis Imperial College of Science, Technology & Medicine, University of London (Jul. 1990).

Mori, R. et al., "Superdistribution: The Concept and the Architecture," THE TRANSACTIONS OF THE EIEICE, V, E73, No. 7, Tokyo, Japan, Jul. 1990, pp. 1133–1146.

Muftic, Sead, *Security Mechanisms for Computer Networks*, Ellis Horwood Limited, 1989.

Neuman, B.C., "Proxy–Based Authorization and Accounting for Distributed Systems," Information Sciences Institute, University of South California, 1993, pp. 283–291.

Neuman et al. "Kerberos: An Authentication Service for Computer Networks," *IEEE Communications magazine* (Sep. 1994).

Nguyen, Thanh et al., "Guidelines for Validation of a CITED System," CITED 5469, SA–21–40–003, Jul. 4, 1994.

O'Connor, MaryAnn, "New Distribution Option for Electronic Publishers," Information Access Co., Mar. 1994, pp. 1–6.

Olivier, M.S. et al., "A Taxonomy for Secure Object–oriented Databases," ACM Transactions on Database Systems, vol. 19, No. 1, Mar. 1994, pp. 3–46.

Olivier, M.S. et al., "Building a Secure Database using Self–protecting Objects," Computers & Security, vol. 11, No. 3, 1992, 14 pages.

Olivier, M.S. et al., "DISCO: A Discretionary Security Model for Object–oriented Databases," in GG Gable and WJ Caelii, Eds., IT Security: The Need for International Cooperation, pp. 345–357, Elsevier Science Publishers B.V. (North Holland), 1992, 14 pages.

Olivier, M.S. et al., "Secure Object–oriented Databases," Ph.D. Thesis, Rand Afrikaans University, Johannesburg, Dec. 1991, pp. I to xiv to 1–183.

Organick, E.I., *The Multics System: An Examination of Its Structure*, MIT Press, 1972.

Paepcke, Andreas, "Summary of Stanford's Digital Library Testbed and Status," Stanford University, D–Lib Magazine (Jul. 1996).

Paradinas, Pierre et al., "New Directions for Integrated Circuit Cards Operating Systems.".

Pijenborg, Mari, F.J., "Auteursrecht En De Digitale Bibliotheek," 195 Open, Jan. 1995.

Pijnenborg, Mari, F.J., "CITED Final Report," Elsevier Science B.V., Apr. 1994.

Perlman, Bill, "A Working Anti–Taping System for Cable Pay–Per View," IEEE Trans. On Consumer Electronics, vol. 35, No. 3 (Aug. 1989).

Pethia et al., "Guidelines for the Secure Operation of the Internet," Network Working Group, RFC 1281 (Nov. 1991).

Pietreck, M., *Windows Internals: The Implementation of the Windows Operation Environment*, Addison–Wesley (1993).

Popek, Gerald, J., et al., "Encryption and Secure Computer Networks," Computing Surveys, vol. 11, No. 4, Dec. 1979, pp. 331–356.

Press, Jim et al, "A New Approach to Crytographic Facility Design", ICL Mid–Range Systems Division Reading, Berks, UK.

Privacy and the NII: Safeguarding Telecommunications—Related Personal Infrmation, U.S> Dept. of Commerce, Oct. 1995.

Reali, Patti, "Copy Protection: The answer to pay per view's Prayers?", TVRO Dealer, Dec. 1994.

Reiher et al. "Truffles—Secure File Sharing With minimal system Administrator Intervention," UCLA, Trusted Information Systems.

Reiher et al., "Truffles—A Secure Service for Widespread File Sharing," UCLA, Trusted Information Systems.

Richardson, D.W., *Electronic Money: Evolution of an Electronic Funds–Transfer System*, The MIT Press (1970).

Rindfrey J., "Security in the World Wide Web," Fraunhofer Institute for Computer Graphics (Dec. 1996).

Rindfrey, Jochen, "Towards an Equitable System for Access Control and Copyright Protection in Broadcast Image Services; The Equicrypt Approach," Fraunhofer Institute for Computer Graphics.

Robinson et al., "Encoding Header Field for Internet Messages," Network Working Group RPC 1154 (Apr. 1990).

Rose et al., "Structure and Identification of management Information for TCP/IP–based Internets," Network Working Group RFC 1155 (May 1990).

Rosenbilt, Moshe, "Secure Software Distribution", IEEE 0–7803–1811–0/94, 1994.

Rosenthal, Doug, "EINet: A secure, Open Network for Electronic Commerce", IEEE, 1994.

Ross, P.E., "Cops versus robbers in cyberspace," Forbes (Sep. 9, 1996).

Rouaiz, F., "A Web Navigator with Applets in Caml," INRIA.

Rivest, Ronald L., et al., "SDSI—A Simple Distributed Security Infrastructure", MIT and Microsoft Corporation, Apr. 30, 1996.

Rubin et al., "Long Running Jobs in an Authenticated Environment," CITI Technical Report 93–1, Center for Information Technology Integration (Mar. 1993).

Rubin et al., "Formal Methods for he Analysis of Authentication Protocols CITI Technical Report 93–7," Center for Information Technology Integration (Nov. 8, 1993).

Sahuguet, A. "Piracy: the Dark Side of Electronic Commerce: CIS–700/2," Univ. of Pennsylvania (May 5, 1998).

Sandhu, Ravi, S., et al., "Implementation Considerations for the Typed Access Matrix Model in a Distributed Environment," Proceedings of the 15th NIST–SCSC National Computer Security Conference, Baltimore, Maryland, Oct. 1992, pp. 221–235.

Sammer et al., "New Tools for the Internet," Jeanneum Research, Graz University of Technology.

Schneier, Bruce, *Applied Cryptography: Protocols, Algorithms, and Source Code in C*, John Wiley & Sons, Inc., 1994.

Schulze, Dr. J., "Case of Application of the Generic CITED Model to the CITEDisation in the Software Distribution Process," ESPIRIT II, Project, Jan. 12, 1993.

Schutzer, D., "A Need for a Common Infrastructure: Digital Libraries and Electronic Commerce," Citibank, D–Lib Magazine (Apr. 1996).

Shear, Victor, "Solutions for CD–ROM Pricing and Data Security Problems".

Shneier, B., "Description of New Variable–Length Key, 64–bit block cipher (Blowfish)," Fast Software Encryption, Cambridge Security Workshop Proceedings (1994).

Sibert, O. et al., "DigiBox: A Self–Protecting Container for Information Commerce," Proceedings of the First USENIX Workshop on Electronic Commerce, New York, NY, Jul. 1995, 13 pages.

Simon et al., "Digital Images Protection Management in a Broadcast Framework: Overview/TALISMAN Solution," Thomson–CSF, RTBF, ART3000, UCL.

Sirbu et al., "NetBill: An Internet Commerce System Optimized for Network Delivered Services," Carnegie Mellon University.

Smith, Mary Grace, et al., "A New Set of Rules for Information Commerce: Rights–Protection Technologies and Personalized–Information Commerce Will Affect All Knowledge Workers", CommunicationsWeek, Nov. 6, 1995.

Solomon, A., *PC Viruses: Detection, Analysis and Cure*, Springer–Verlag, (undated).

St. Johns, M., "Draft Revised IP Security Option", Network Working Group, RFC, 1038, Jan. 1998.

Stefik, M., "Letting Loose the Light. Igniting Commerce in Electronic Publication," Internet Dreams: Archetypes, Myths, and Metaphors. Massachusetts Institute of Technology, 1996, pp. 219–53.

Stepney et al., "Formal specification of an Access Control System," Software–Practice and Experience, vol. 17, No. 9 (1987).

Strohm et al., "ABYSS: Tokens," IBM Research Report Number RC 12402 (Dec. 18, 1986).

Swedlow, Tracy, "2000: Interactive Enhanced Television: A Historical and Critical Perspective," Interactive TV Today.

Tanenbaum et al., "Amoeba System," Communications of the ACM, vol. 33, No. 12 (Dec. 1990).

Tanenbaum et al., "Experiences with the Amoeba Distributed Operating System," Vrije Universiteit and Centrum voor Wiskunde en Informatica.

Tanenbaum et al., "Using Sparse Capabilities in a Distributed Operating System," Vrije Universiteit and Centre for Mathematics and Computer Science.

Tardo et al., "Mobile Agent Security and Telescript," General Magic, Inc.

Thompson, Victoria P., et al., "A Concept for Certification of an Army MLS Management Information System", Proceedings of the 16th National Computer Security Conference, Sep. 20–23, 1993.

Thor, "A Distributed Object–Oriented Database System", MIT.

Thuraisingham, M.B., "Mandatory Security in Object–Oriented Database Systems," OOPSLA '89 Proceedings, Oct. 1–6, 1989, pp. 203–210.

Tuck, Bill, "Electronic Copyright Management Systems: Final Report of a Scoping Study for Elib," (Jul. 1996).

Tygar, J.D. et al., "Cryptography: It's Not Just for Electronic Mail Anymore," CMU–CS–93–107, School of Computer Science Carnegie Mellon University, Pittsburgh, PA, Mar. 1, 1993, 21 pages.

Tygar, J.D. et al. "Dyad: A System for Using Physically Secure Coprocessors," School of Computer Science, Carnegie Mellon University, Pittsburgh, PA, May 1991, 43 pages.

Tygar, J.D. et al., "Strongbox: A System for Self Securing Programs," CMU Computer Science: 25th Anniversary Commemorative, R. Rashid (ed.) Addison–Welsey, 1991, pp. 163–197.

Van Slype, Georges, "Draft CITED Interchage Formats, Ver. 1.0", ESPIRIT II, Project 5469, the CITED Consortium, Jan. 28, 1994.

Van Slype, Georges, "Knowledge Economy; Future Trends," CITED 5469.

Van Slype, Georges et al., "Natural Language Version of the Generic CITED Model, Ver. 4.2, vol. I: Presentation of the Generic Model," ESPIRIT II, Project 5469, The CITED Consortium, May 8, 1995.

Van Slype, Georges, "Natural Language Version of the Generic CITED Model, Ver. 2.1, vol. II ECMS (Electric Copyright Management System) Design for Computer Based Applications," ESPIRIT II, Project 5469, The CITED Consortium, May 8, 1995.

Van Slype, Georges, "Natural Language Version of the generic CITED model vol. I: Presentation of the generic model, ver. 3.0", and "vol. II: Citedf usage monitoring system design for computer based applications, ver. 1.0" Project 54659, The CITED Consortium, Sep. 6, 1993.

Van Slype, Georges, "PL4 RACE/ACCOPI Workshop on Conditional Access and Copyright Protection," ESPIRIT II, Project 5469, Presentation of the CITED, Nov. 9, 1994.

Van Slype, Georges, "PL4 RACE/ACCOPI Workshop on Conditional Access and Copyright Protection," ESPIRIT II, Project 5469, The CITED Consortium, Nov. 9, 1994.

Van Slype, Georges, "The CITED Approach, Ver. 4.0," ESPIRIT II, Project 5469, The Cited Consortium, Apr. 20, 1994.

Van Slype, Georges et al, "The Future of CITED; a Feasibility Study," ESPIRIT II, Project 5469, The CITED Consortium, Nov. 15, 1993.

Van Slype, Georges, "The Future of CITED: A Feasibility Study, Ver. 1.0, vol. I: Summary Report and and Recommendations," ESPIRIT II, Project 5469, The CITED Consoritum, Feb. 28, 1994.

Van Slype, Georges et al., "The Future of CITED: A Feasibility Study, Ver. 1.0, vol. II: Full Report," ESPIRIT II, Project 5469, The CITED Consortium, Feb. 28, 1994.

Van Slype, Georges, "The Future of CITED: A Feasibility Study, Ver. 1.1, vol. III: Draft CITED Interchange Formats," ESPIRIT II, Project 5469, The CITED Consortium, Feb. 28, 1994.

Van Slype, Georges, "The Future of CITED: A Feasibility Study, Ver. 1.1, vol. I: Summary Report and Recommendations," ESPIRIT II, Project 5469, The CITED Consortium, Mar. 28, 1994.

Van Slype, Georges, "The Future of CITED: A Feasibility Study, Ver. 1.1, vol. III: Draft CITED Interchange Formats," ESPIRIT II, Project 5469, The CITED Consortium, Mar. 28, 1994.

Wagner, N. "Fingerprinting," Drexel University, IEEE Symp. On Info. and Privacy (Apr. 1993).

Walker, S., "Notes from RSA Data Security Conference," Jan. 18, 1994, pp. 1–3.

Wayner, Peter *Digital Copyright Protection*, Academic Press, 1997.

Wayner, Peter, "Digital Copyright Protection", Academic Press 1997.

Winslet et al., "Formal Query Languages for Secure Relational Databases," ACM Transactions on Database Systems, vol. 19, No. 4 (Dec. 1994).

Weber, Robert, "Digital Rights Management Technologies—A Report to the International Federation of Reproduction Rights Organizations", Northeast Consulting Resources, Inc., Oct. 1995.

Weber, Robert; "Metering Technologies for Digital Intellectual Property—A Report to the International Federation of Reproduction Rights Organisations", International Federation of Reproduction on Rights Organisations, Northeast Consulting Resources, Inc., Oct. 1994.

Weber, Robert; "Digital Rights Management Technologies—A Report to the International Federation of Reproduction Rights Organisations", Northeast Consulting Resources, Inc., Oct. 1995.

Wells, Rob, *Odyssey of Plastic Purchase: 20–Second Round Trip*, Associated Press, Dec. 1993.

Weingart, S.H., "Physical Security for the uABYSS System", IEEE, 1987.

White Steve R.; Comeford, Liam; "ABYSS: An Architecture for Software Protection", IEEE Transactions on Software Engineering, vol. 16, No. 6, Jun. 1990.

White, James E., "Telescript: The Foundation for the Electronic Marketplace", Ver. 5.0, General Magic, Inc., Nov. 30, 1993.

Willett, S., "Metered PCs: Is Your System Watching You?, Wave Systems Beta Tests New Technology," IDG Communications, Inc., May 2, 1994, pp. 1–6.

Williams, Tony, "Microsoft Object Strategy", Microsoft PowerPoint Presentation, 1990.

Wobber, Edward, et al., "Authentication in the Taos Operating System", Digital Equipment Corporation, Dec. 10, 1993.

Woo, Thomas, Y.C., et al., "A Framework for Distributed Authorization," Proceedings of the $1^{st}$ Conference Computer and Communication Security, Nov. 1993, pp. 112–118.

Yee, B., "Using Secure Coprocessors," CMU–CS–94–149, School of Computer Science, Carnegie Mellon University, Pittsburgh, PA 1994, 94 pages.

"Access Control and Copyright Protection for Images Security Technology for Graphics and Communications Systems—RACE M1005; ACCOPI", webpage, Security Projects at Fraunhofer 1GD, 2002.

ACCOPI RACE Project M1005 Warning of ACCOPI web pages removal, UCL Laboratoire de telecommunications et teledetection.

A2b's Recent Press Coverage (1998).

"Achievements Archive," www.imprimatur.net/ web pages.

"American National Standard: Specification for Financial Message Exchange Between Card Acceptor and Acquire, X9.15,", American Banker's Association, 1990.

"An Introduction to Safety and Security in Telescript," (undated), 8 pages.

Automation of Securities Markets and Regulatory Implications, Financial Market Trends, No. 50, p.20–33, Oct. 1991. [File 148, Gale Group Trade & Industry DB, Dialog(R) commercial database].

AT&T PersonaLink, Before Feb. 13, 1995.

"AT&T Smart Card Systems & Solutions," AT&T (1993).

Bureau Van Dijk Management Report for Task 4.5: Feasibility Study of the Cited Agency, 1992–1993.

Bureau Van Dijk: Gestion Des Contrats; 497C.C.C.E: CITED (SUITE), Feb. 1993.

Central Point Anti–Virus, Central Point Software, 1993.

"CITED: Copyright in Transmitted Electronic Documents, Special Interest Group," CITED Meeting, Heathrow, Sep. 22, 1993.

"CITED Final Report: A Guide to CITED Documentation," ESPIRIT, Project 5469, ISBN 0–7123–2115–2, The CITED Consortium, Sep. 1994.

"CITED Preparation of the CITED Model Functional Requirements Specifications; Discussion Paper (Revision 1)," Bureau Van Dijk, Jan. 16, 1991.

"CITED: Preparation of the CITED Model Functional Requirements Specifications; Reports of the Interviews with Five CITED Partners," (Partners: Sagem, Telesystemes, NTE, Elsevier, Oxford University Press), Bureau Van Dijk, Apr. 5, 1991.

Competitive Analysis AT&T/a2b music (Jun. 16, 1998).

"Copyright Ownership Projection in Computer–Assisted Training", COPICAT—8195, ESPRIT, Dec. 1993.

COPYSMART—20517: "CITED Based Multi–media IPR Management on Cost Effective Smart Device," European Information Technology for Information Science, start date Dec. 1, 1995.

"CopySmart (CSM) suit," European Information technology for Information Science.

"CREANET—Creative Rights European Agency NETwork—Project Profile," Information Society Technologies (Feb. 18, 2000).

"Cryptolope Containers Technology: A White Paper", IBM InfoMarket Business Development Group.

"Crytographic API Specification," Version 0.6, Microsoft, Mar. 1995.

CUPID, "Protocols and Services: An Architectural Overview", IP Workshop, Ver. 1, Last updated Nov. 20, 1997.

"Data Network and Open System Communications, Directory: Information Technology—Open Systems Interconnection—The Directory: Overview of Concepts, Models, and Services," ITU–T Recommendation X.500, International Telecommunication Union (Nov. 1993).

"Deliverable D3: Specification of the Infrastructure and Explanation of Trust and Confidence Building Solutions," Ver. 0.1, Telenet (Jul. 18, 2000).

"Digital Broadband Delivery System, Phase 1.0, System Overview," Revision 1.0, Scientific Atlanta, 1997.

"Digital Rights Enforcement and Management: SuperDistribution of Cryptolopes", IBM.

DOD Rainbow Series.

Dynamic linking of SunOS.

"EFT Network Data Book; 1993 Edition," Bank Network News, vol. 11, No. 13, Nov. 1992.

"Electronic Reverse Copyright Management System (ERCOMS)," International Institute for Electronic Library Research, website updated by Ramsden, Anne (Jul. 22, 1996).

Email from Chris Drost–Hansen re press release: "AT&T Launches A2B Music Trial for Delivering Songs Over the Internet," Business Wire (Nov. 3, 1997).

Email from Edmond Kouka to Jean–Francois Boisson re TELENET TELEtraining platform—Bogdan Lutkiewicz, Poland, Gdansk (Mar. 4, 2001).

ESPIRIT Project: 5469: Contract Amendment Number 2; Commission of the European Communities, Sep. 16, 1993.

"ESPIRIT Project 20676—IMPRIMATUR—Intellectual Multimedia Property Rights Model and Terminology for Universal Reference," IMPRIMATUR Consortium (Oct. 1988).

"ESPIRIT Project 22226—MUSE—Developing Standardized Digital media Management, Signaling and encryption Systems for the European Music Sector," International Federation of the Phonographic Industry (Oct. 1998).

"ESPIRIT Project 24378—MENHIR European Multimedia Network of High Quality Image Registration," Museums On Line (Feb. 1, 1997).

"Europe and The Global Information Society Recommendations to the European Council," Bamgemann Report, www.medicif.org web pages, Global Information Society (May 1994).

"Formun on Risks to the Public in Computers and Related Systems," The Risks Digest, vol. 15; Issue 39; Jan. 21, 1994, pp. 1–12.

"Forum on Technology–Based Intellectual Property Management—Electronic Commerce for Content", IMA Intellectual Property Proceedings, vol. 2, Jun. 1996.

FreeBSD System Manager's Manual "LDCONFIG", Oct. 3, 1993.

"Gemplus. MCOS: Multi Application Chip Operating System—Introduction," Gemplus Card International (1990).

Handwritten note re: GVS and AJL, Mar. 2, 1994.

"iOpener," Registered Trademark of National Semiconductor Corporation, Registration date Oct. 4, 1994.

"Imprimatur News,"iMPRIMATUR (Dec. 1998).

"Interchange Message Specification for Debit and Credit Card Message Exchange Among Financial Institutions," American National Standard, Accredited Standards Committee X9–Financial Services Committee, ANSI X9.2–1988, American Bankers Association, May 16, 1988.

International Infrastructure Standards Panel, "IISP Need #31–Containers or Secure Packaging," Electronic Publishing Research, Sep. 18, 1995, pp. 1–3.

International Infrastructure Standards Panel, "IISP Need #32–Authentication of Content," Electronic Publishing Research, Sep. 18, 1995, pp. 1–3.

International Infrastructure Standards Panel, "IISP Need #33–Control Enforcement," Electronic Publishing Research, Sep. 18, 1995, pp. 1–3.

International Infrastructure Standards Panel, "IISP Need #34–Billing and Payment," Electronic Publishing Research, Sep. 18, 1995, pp. 1–3.

International Infrastructure Standards Panel, "IISP Need #35–Reporting," Electronic Publishing Research, Sep. 18, 1995, pp. 1–3.

Introduction to Smart Cards v. 1.0, Gemplus Card International, Mar. 21, 1991.

"ISO 7813–1987 Identification Cards–Financial Transaction Cards," ISO, 1987.

ISO 7498/1: Open Systems Interconnection: Security Architecture (1988).

ISO 7498/2: Open Systems Interconnection: Security Architecture (1988).

ISO 8583–2: "Financial Transaction Card Originated Messages—Interchange Message Specifications—Part 2: Application and registration Procedures for Institition Identification Codes (IIC)," ISO (Jul. 1, 1998).

ISO 8583–3: "Financial Transaction Card Originated Messages—Interchange Message Specifications—Part 3: Maintenance Procedures for Codes," ISO (Jul. 1, 1998).

ISO 9564–1 & –2: "Personal Identification Number (PIN) management and security—Part 1: Basic Principles and Requirements for online PIN Handling in ATM and POS Systems; & –2 Approved Algorithm(s) for PIN Encipherment," ISO (Apr. 15, 2002 & Dec. 15, 1991).

ISO 9807: "Banking and related Financial Services—Requirements for Message Authenthication (retail)," ISO (Dec. 15, 1991).

ISO 11568–1 and –2, "Key Management (retail)—Part I: Introduction to Key Management; Part II: Key Management Techniques for Symmetric Ciphers," ISO (Dec. 1, 1994).

ISO 13491–1: "Secure Crytographic Devices (retail)—Part I: Concepts, Requirements and Evaluation Methods," ISO (Jun. 15, 1998).

"JUKEBOX—Music Across Borders," LIB–JUKEBOX/4–1049.

"Key Management Using ANSI X9.17," Federal Information Processing Standards Publication 171, U.S. Department of Commerce (Apr. 1992).

"KeyKOS Principles of Operation," Key Logic document KL002–04, 1985, Fourth Edition (Jan. 1987).

Letter re: ESPIRIT III–Project 5469 (CITED) from A. Stajano at Commission of the European Communities, Oct. 7, 1993.

Microsoft Internet Explorer v 2.0.

Miscellaneous letter from Georges Van Slype at Bureau Van Dijik, Feb. 28, 1994.

Miscellaneous Letter from Georges Van Slype at Bureau Van Dijik, Mar. 30, 1995.

Miscellaneous Letter from Georges Van Slype at Bureau Van Dijik, Feb. 13, 1995 and Nov. 2, 1994.

Miscellaneous Letter from Georges Van Slype at Bureau Van Dijik, Sep. 12, 1994, May 11, 1994, May 10, 1994, May 6, 1994, May 4, 1994, Apr. 21, 1994, Apr. 20, 1994.

Miscellaneous Letter from Georges Van Slype at Bureau Van Dijik, Apr. 19, 1994, Apr. 18, 1994, Apr. 11, 1994, Apr. 6, 1994.

Miscellaneous Letter from Georges Van Slype at Bureau Van Dijik, Mar. 30, 1994, Mar. 24, 1994, Feb. 10, 1994.

Miscellaneous Letter from Georges Van Slype at Bureau Van Dijik, Feb. 9, 1994, Jan. 27, 1994, Jan. 19, 1994, Jan. 12, 1994, Dec. 22, 1993, Nov. 30, 1993, Nov. 22, 1993, Dec. 6, 1993, Nov. 16, 1993, Oct. 15, 1993, Oct. 7, 1993, Oct. 4, 1993, Sep. 20, 1993, Sep. 7, 1993, May 19, 1993, Oct. 19, 1993.

"MSDN–INF: LAN Manager 2.1 Server Autotuning (Part2)," PSS ID No. 080078, Microsoft (Feb. 1993).

"MSDN–Licence Service Application Programming Interface," API Specification v.1.02, Microsoft (Jan. 1993).

Multimedia Mixed Object Envelopes Supporting a Graduated Fee Scheme via Encrytion; IBM Technical Disclosure BUlletin, vol. 37, No. 3, Mar. 1994.

"Multimedia System Services Ver. 1.0", Hewitt–POackard, IBM, & SunSoft, 1993.

OLE 2.0 Draft Content: Object Linking & embedding, Microsoft, Jun. 5, 1991.

"Payment Systems: Strategic Choices for the Future," Hitachi Research Institute; Instititute of Advanced Business Systems, Hitachi, Ltd., 1993.
"PKCS #1:RSA Encryption Standard," RSA Laboratories Technical Note, Ver. 1.5, revised Nov. 1, 1993.
"PKCS #3: Duffe–Hellman Key–Agreement Standard," RSA Laboratories Technical Note, Ver. 1.4, revised Nov. 1, 1993.
"PKCS #6: Extended–Certification Syntax Standard," RSA Laboratories Techincal Note, Ver. 1.5, revised Nov. 1, 1993.
"PKCS #9: Selected Attribute Types," RSA Laboratories Technical Note, Ver. 1.1, revised Nov. 1, 1993.
"PKCS #11: Cryptographic Token Interface Standard", An RSA Laboratories Technical Note, Ver. 2.0, Apr. 15, 1997.
"PKCS 12 v 1.0: Personal Information Exchange Syntax", RSA Laboratories, Jun. 24, 1999.
"PKCS #13: Elliptic Curve Crytography Standard", RSA Security, Jan. 12, 1998.
"PKCS #15 v 1.0: Cryptographic Token Information Format Standard", RSA Laboratories, Apr. 23, 1999.
"PKCS #5: Password–Based Encryption Standard," An RSA Laboratories Technical Note, Ver. 1.5, 1991–1993, Revised Nov. 1, 1993.
"PKCS #8: Private–Key Information Syntax Standard," An RSA Laboratories Technical Note, Ver. 1.2, 1991–1993, Revised Nov. 1, 1993.
"PKCS #10: Certification Request Syntax Stanard," An RSA Laboratories Technical Note, Ver. 1.0, Nov. 1, 1993.
PowerAgent Introduces First Internet 'Infomediary' to Empower and Protect Consumers (Tech Talk Aug. 4, 1997).
PowerAgent Introduces First Internet 'Infomediary' to Empower and Protect Consumers (Techmail.com Aug. 4, 1997).
"Request for Technology: Multimedia System Services", Draft, Ver. 1.1, Interactive Multimedia Association Compatibility Project, Oct. 16, 1992.
"Request for Technology: Multimedia System Services", Ver. 2.0, Interactive Multimedia Association Compatibility Project, Nov. 9, 1992.
"Requirements for the Software License Management System", System Management Work Group, Rev. 3, Unix International, Jul. 23, 1992.
Secure Electronic Transactions; Mastercard and Visa+ C345.
"Security in KeyKOS.".
"S/PAY: RSA's Developer's Suite for Secure Electronic transactions (SET)," RSA Data Security, Inc. (1997).
"STARFISH State of the Art Financial Services for the In Habitants of Isolated Areas—Project Profile," Information Society technologies, time schedule (Jan. 21, 2000–Jun. 30, 2002).
Stuffit Delux v 1.5, v 3.0, v. 3.5, Alladin Systems, 1988–1994.
Summaries of Project (FP III/IV)—Part I: "ESPIRIT Project 20517—COPYSMART CITED based multi–media IPR management on cost effective smart device," European Information technology for Information Science (Oct. 1998).
Symantec Anti–Virus for Macintosh (a.k.a. SAM), Symantec, 1993.
Symantec Corporation, "THINK Pascal: The Fastest Way to Finished Software," Symantec Corporation, 1990, pp. 93–123.
"TALISMAN—Tracing Authors' Rights by Labeling Image Services and Monitoring Access Network," ACTS Project No. AC019, Doc Reference AC019–THO–RGS–FR–P 001–b1 (Sep. 25, 1998).
"TALISMAN: Tracing Authors' Rights by Labeling Image Services and Monitoring Access Network," ACTS, Swiss Participation in European Research Programs (Sep. 1, 1995, Aug. 31, 1998).
"Technical Description: Pay–Per–View Copy Protection," Macrovision, Jun. 1994.
Technical Strategies for Protecting Intellectual Property in the Networked Multimedia Environment, IMA Intellectual Property Proceedings, vol. 1, Issue 1, Jan. 1994.
"TELENET TELEtraining Platform (on NETworks)—Project Profile," Information Society Technologies, time schedule (Mar. 6, 2000–Mar. 30, 2000).
"Telescript Security," BYTE.com (Oct. 1994).
"The Armide Products", web page.
"The Future of Cited: A Feasibility Study," ESPIRIT II, Project 5469, CITED Project Review, Apr. 15, 1994.
"The Future of Cited: A Feasibility Study," ESPIRIT II, Project 5469, The CITED Consortium, Apr. 15, 1994.
"The PowerTV White Paper", powertv.com website, Oct. 11, 1996.
"The Standard Business: Time for Change," European Commision DG111 Espirit Project $5^{th}$ Consensus Formum (Nov. 3–4, 1998).
*Think C: Object–Oriented Programming Manual*, Symantec Corporation, 1989.
TULIP Final Report, ISBN 0–444–82540–1, 1991, revised Sep. 18, 1996.
*UniverCD: The InterActive, Online Library of Product Information From Cisco Systems*, Cisco Systems 1993.
*Unix System v. Release 3.2, Programmer's Guide, Vol. II*, AT&T, Prentice Hall (1989).
U.S. Patent and Trademark Prosecution History for National Semiconductor Corporation "iOpener" Trademark, Registration date Oct. 4, 1994, 27 pages. TULIP Final Report.
VirusCheck and VirusScan, McAfee, 1993.
"A Brief History of the Green Project," viewed on Mar. 12, 2002 at <http://java.sun.com/people/jag/green/index.hmtl> pp. 1–2.
Anderson, R., "Why Cryptosystems Fail," University Computer Laboratory, Cambridge, Massachusetts, (undated), pp. 1–34.
Aucsmith, D., et al., "Common Data Security Architecture," Intel Architecture Lab, Presentation Materail, Jan. 22, 1996, pp. 1–16.
Baker, R.H., The Computer Security Handbook, Tab Books, Inc., 1985.
Balbanovic, et al., Content–based, Collaborative Recommendation, Communications of the ACM, Mar. 1997, pp. 66–72.
Barlock, P.F., et al., "Guide to Securing Microsoft Windows NT Networks," National Security Agency, Sep. 18, 2001, pp. 1–132.
Bellare, M., "iKP–A Family of Secure Electronic Payment Protocols," Apr. 16, 1995, pp. 1–19.
Bell–Labs Secure Technologies, "Information Vending Encryption System (IVES)™," Lucent Technologies, May 31, 2002, pp. 1–16.

Bellovin, S.M., "Encrypted Key Exchange: Password-Based Protocols Secure Against Dictionary Attacks," Proceedings of the IEEE Symposium on Research in Security and Privacy, Oakland, California, May 1992, 13 pages.

Bellovin, S.M., "There Be Dragons," AT&T Bell Laboratories, Aug. 15, 1992, 16 pages.

Berkovitz, S. et al., "Authentication of Mobile Agents," Mobile Agents and Security, Springer–Verlag, Giovanni Vigna, Ed., 1998, pp. 114–136.

Berners–Lee, T.J., et al., "Networked Information Services: The World–Wide Web," Computer Networks and ISDN Systems, 1992, pp. 454–459.

Bertino, Elisa, "Data Hiding and Security in Object–Oriented Databases," Dipartimento di Matematica, Universita di Genova, IEEE, 1992, pp.338–347.

Bickel, R., et al., "Guide to Securing Microsoft Windows XP," National Security Agency, Oct. 30, 2002, pp. 1–129.

Birrell, Andrew, D., et al., "A Global Authentication Service Without Global Trust," Proceedings of the IEEE Symposium on Security and Privacy, Oakland, California, Apr. 1986, pp. 1–11.

Boly, J.P., et al., "The ESPRIT Project CAFÉ: High Security Digital Payment Systems," ESCORICS 94, European Symposium on Research Computer Security, Springer–Verlas Berlin, 1994, pp. 217–230.

Boone, J.V., et al., "The Start of Digital Revolution: SIGSALY Secure Digital Voice Communications in World War II," Dec. 10, 2002.

Borenstein, N., "MIME Extensions for Mail–Enabled Applications: Application/Safe–Tel and Multipart/Enabled–Mail," Nov. 1993, 24 pages.

Born, E., et al., "Discretionary Access Control by Means of Usage Conditions," Computers & Security, vol. 13, No. 5, 1994, pp. 437–450.

Brands, S., "Untraceable Off–line Cash in Wallets with Observers," CWI, (undated), 17 pages.

Breon, R., et al., "Microsoft Office 97 Executable Content Security Risks and Countermeasures," National Security Agency, Dec. 20, 1999, pp. 1–44.

Brickell, E.F., et al., "The SKIPJACK Algorithm," Jul. 28, 1993, pp. 1–7.

Brockschmidt, K., "A Primer on Designing Custom Controls," Microsoft Systems Journal, Mar./Apr. 1992, pp. 87–101.

Brockschmidt, K., "Implementing OLE 2.0, Part III: Uniform Data Transfer with Data Objects," Microsoft Systems Journal, Dec. 1993, pp. 47–77.

Brockschmidt, K., "Introducing OLE 2.0, Part 1: Windows Objects and the Component Object Model," Microsoft Systems Journal, Aug. 1993, pp. 15–23.

Brockschmidt, K., "OLE 2.0 Part II: Implementing a Simple Windows Object Using Either C or C++," Microsoft Systems Journal, Oct. 1993, pp. 45–62.

Brockschmidt, Kraig, Inside OLE 2, Microsoft Press Programming Series, 1994.

Brown, C.W., "Security for Minicomputers and Microcomputers," (undated), pp. 285–298.

Brown, Patrick W., "Digital Signatures: Can They Be Accepted as Legal Signatures in EDI?," 1st Conference on Computer and Communication Security, Nov. 1993, pp. 86–92.

Brumm, P., et al., 80386/80486 Assembly Language Programming, Windcrest/McGraw–Hill, 1993.

Brunnstein et al., "Intellectual Property Rights and new Technologies," Proceedings of the KnowRight '95 Conference, Aug. 1995.

Byte.com, "Speaking the Same Language," May 1994, pp. 1–2.

Cabell, D., et al., "Software Protection," May 1985, pp. 35–37.

Calas, C., "Distributed File System Over a Multilevel Secure Architecture Problems and Solutions," Computer Security, ESCORICS 94, Brighton, United Kingdom, Nov. 7–9, 1994, pp. 281–297.

CardTech/SecurTech 94 Conference Proceedings, "Building Foundations for Innovation," CardTech/SecurTech, Inc., Apr. 1994, 1,301 pages.

Carnegie Mellon University, "Internet Billing Server," Prototype Scope Document, INI Tech Report, Oct. 14, 1993, pp. 1–29.

Champine, G., MIT Project Athena: A Model for Distributed Campus Computing, Digital Equipment Corporation, 1991, 22 introductory pages, Chapter 1 (pp. 3–18); Chapter 2 (pp. 19–33); Chapter 3, (pp. 37–68); Chapter 4 (pp. 69–75); Chapter 5 (pp. 79–107); C.

Chase, Chevy, M.D., "DiscStore", Electronic Publishing Resources, 1991.

Chaum, D.L., et al., "Implementing Capability–Based Protection Using Encryption," College of Engineering, University of California, Berkeley, Jul. 17, 1978, 12 pages.

Chess, D., "Security Issues in Mobile Code Systems," Mobile Agents and Security, Springer–Verlag, Giovanni Vigna, Ed., 1998, 14 pages.

Clark, Paul C., et al., "BITS: A Smartcard Protected Operating System," Communications of the ACM, vol. 37, No. 11, Nov. 1994, pp. 66–70 & 94.

Coad, Peter, "Object–Oriented Patterns," Communications of the ACM, vol. 35, No. 9, Sep. 1992, pp. 152–159.

Cohen, F.B., Protection and Security on the Information Superhighway, John Wiley & Sons, Inc., 1995.

Competitive Analysis AT&T/a2b music, Jun. 16, 1998.

Cook, S., "Net Results," PC World, Dec. 1985, pp. 270–238.

Corbato, F.J., et al., "Introduction and Overview of the Multics System," viewed on Nov. 13, 2001 at <http://www.multicians.org/fjcc1.html> pp. 1–18.

CUPID Protocols and Services (Version 1): "An Architectural Overview," Nov. 1992, available at <http://www.cni.org/projects/CUPID>, 25 pages.

Curry, David A., "Improving the Security of Your Unix System," Final Report Apr. 1990, pp. 1–74.

Custer, H., Inside the Windows NT File System, Microsoft Press, 1994.

Cybenko, G, et al., "Cognitive Hacking: A Battle for the Mind," Computer, Aug. 2002, 0018–9162/02ã2002 IEEE, pp. 50–56.

Data Network and Open System Communications, Directory: Information Technology—Open Systems Interconnection—The Directory: Overview of Concepts, Models, and Services, ITU–T Recommedation X.500, International Telecommunication Union, Nov. 1993.

Date, C.J., "An Introduction to Database Systems," 4th. Ed., vol. 1, Addison–Wesley Publishing Company, 1987.

Davis, D., et al., "Network Security via Private–Key Certificates," MIT Project Athena, (undated), pp. 1–4.

"DCE Technology at Work," Distribution Computing Environment, http://www.opengroup.org/tech/dca/tech/tech.htm, Nov. 7, 2000, pp. 1–3.

Dempsey, Lorcan, et al., The Warwick Metadata Workshop; A Framework for the Deployment of Resource Description, Jul./Aug. 96.

Denning, A., OLE Controls Inside Out, Microsoft Press, 1995.

Denning, D. E., et al., "Data Security," 11 Computing Surveys, No. 3, Sep. 1979, pp. 227–249.

Denning, D., Crytography and Data Security, Addison–Wesley Publishing Company, Inc., 1982.

Denning, P.J., Computer Under Attack: Intruders, Worms, and Viruses, ACM Press, 1990.

Department of Defense Computer Security Center, "Department of Defense Password Management Guideline," Department of Defense Computer Security Center, Apr. 12, 1985, pp. 1–34.

Department of Defense Standard, "Department of Defense Trusted Computer System Evaluation Criteria," Dec. 1985, pp. 1–72.

Deutsch, P., "GZIP File Format Specification Version 4.3," Network Working Group, May 1996, pp. 12.

Diffie, et al., Privacy on the Line: The Politics of Wiretapping and Encryption, Massachusetts Institute of Technology, 1998.

DiLascia, Paul, "OLE Made Almost Easy: Creating Containers and Servers Using MFC 2.5," Microsoft Systems Journal, Apr. 1994, pp. 13–33.

Dougherty, D., et al., The Mosaic Handbook for the X Window System, O'Reilly & Associates, 1994.

Downs, D.D., et al., "Issues in Discretionary Access Control," Proceedings of the 1985 Symposium on Security and Privacy, Apr. 22–24, 1985, Oakland, California, pp. 208–218.

Dukach, S., "SNPP: A Simple Network Payment Protocol," MIT Laboratory for Computer Science, (undated), 7 pages.

EFFector Online, vol. 6, No. 6, "A Publication of the Electronic Frontier Foundation," 8 pages, Dec. 6, 1993.

Ellison, C. et al., "SPKI Certificate Theory," Internet Engineering Task Force (IETF) RFC 2693, Sep. 1999, 38 pages, available at http://www.ietf.org/rfc/rfc26939.txt?number=2693.

Farmer, D., "The COPS Security Checker System," Jul. 10, 1992.

Ferraiolo, D., et al., "Role–Based Access Control," Reprinted from the Proceedings of the 15th National Computer Security Conference, 1992, pp. 1–11.

Forcht, K.A., Computer Security Management, Boyd & Fraser Publishing Company, 1994.

Franklin, M., et al., "An Overview of Secure Distribution Computing," Mar. 24, 1992, pp. 1–46.

Franz, M., "Technological Steps Toward a Software Component Industry," Institut fur Computersysteme, Zurich, Switzerland, (undated), 23 pages.

Fugini, M., et al., "Security Management in Office Information Systems," Computer Security: A Global Challenge, 1984, pp. 487–498.

Gifford, D., et al., "The Cirrus Banking Network," Communications of the ACM, vol. 28, No. 4, Aug. 1985, pp. 798–807.

Gifford, D.K., "Cryptographic Sealing for Information Secrecy and Authentication," Communications of the ACM, vol. 25, No. 4, Apr. 1982, pp. 274–286.

Glatzer, H., "The Promise of LANs MIS Back in Control," Software News, Mar. 1985, pp. 51–58.

Gligor, V.D., et al., "Object Migration and Authentication," IEEE Transactions on Software Engineering, vol. SE–5, No. 6, Nov. 1979, pp. 607–611.

Global Projects Group, "Smart Card Technology International: The Global Journal of Advanced Card Technology," undated, pp. 1–151.

Gong, L. et al., "Signing, Sealing and Guarding Java Objects," Mobile Agents and Security, G. Vigna, editor, Springer–Verlag, 1998, vol. 1419 of LNCS, pp. 206–216.

Gong, Li, "A Secure Identity–Based Capability System," University of Cambridge Computer Laboratory, Jan. 1989, pp. 1–15.

Gosling, J., "Oak Intermediate Bytecodes," 1995, 5 pages.

Gruber, R., et al., "Disconnected Operation in the Thor Object–Oriented Database System," Laboratory of Computer Science, Massachusetts Institute of Technology, (undated), pp. 1–6.

Guide to the Secure Configuration and Administration of Microsoft Exchange 5.x®, National Security Agency, Jun. 20, 2002, pp. 1–58.

Halfhill, T.R., et al., "Agents on the Loose," Byte.com, Feb. 1994, pp. 1–2.

Halfhill, Tom, R., et al., "Just Like Magic?," Byte.com, Feb. 12, 1994, pp. 1–5.

Haller, N., "The S/KEY One–Time Password System," Network Working Group RFC 1760, Feb. 1995.

Hansen, S.E., et al., "Automated System Monitoring and Notification with Swatch," Proceedings of the 1993 LISA, Monterey, California, Nov. 1–5, 1993, pp. 101–108.

Hardjono, Thomas, "Record Encryption in Distributed Databases," Department of Computer Science, University of New South Wales, Jan. 1990, pp. 386–395.

Harn, Lein, et al., "A Software Authentication System for the Prevention of Computer Viruses," ACM, 1992, pp. 447–450.

Hauser, Ralf, C., "Does Licensing Require New Access Control Techniques?," Institut fur Informatik, University Zurich, Aug. 12, 1993, 9 pages.

Hawk, H.S., "RSA & General Magic," email to Good Guys, Jan. 6, 1994, 1 page.

Hewlett Packard Co., "Manager's Guide to MPE/iX Security," Hewlett–Packard Company, Apr. 1994.

Hoffman, L.J., Modern Methods for Computer Security and Privacy, Prentice–Hall, Inc., 1977.

Hohl, F., "Time Limited Blackbox Security: Protecting Mobile Agents from Malicious Hosts," Lecture Notes in Computer Science, vol. 1419: Mobile Agents and Security, Springer–Verlag, 1998, G. Vigna Ed., pp. 90–111.

Holsinger, E., How Music and Computers Works, Ziff–Davis Press, 1994.

Holzner, S., Heavy Metal OLE 2.0 Programming IDG Books Worldwide, Inc., 1994.

Honeyman, P., "Digest of the First UNSENIX Workshop on Electronic Commerce (EC 95)," Jul. 1995.

Horster, P., Communications and Multimedia Security II, Chapman & Hall, 1996.

Hsiao, D., et al., Computer Security, Academic Press, Inc., 1979.

Hutt, A.E., et al., Computer Security Handbook Second Edition, Macmillian Publishing Company, 1988, pp. 201–217.

IBM, "IBM Cryptolope Technology–Executive Summary," viewed on Mar. 13, 2002 at <http://www3.ibm.com/software/security/cryptolope.about.html> pp. 1–3.

IBM, "OpenDoc vs. OLE 2.0: Superior by Design," IBM, Jan. 1994, pp. 1–4.

Information Systems Audit and Control Association–Montreal Chapter, "Authentification dans les environments de traitement distributes," viewed on Mar. 25, 2002 at <http://www.apvcismontreal.ca/en/publications/contact133.html> pp. 1–15.

Ioannidis, J. et al., "The Architecture and Implementation of Network–Layer Security Under Unix," Fourth USENIX Security Symposium Proceedings (Oct.), USENIX, Berkeley, Calif. 1993, 11 pages.

Jaeger, T, et al., "Support for the File System Security Requirements of Computational E–Mail Systems," Nov. 1994, ACM 0–89791–732–4/94/0011, 9 pages.

Johnson, R., "Info on Telescript," Software Agents List Archieve, Dec. 6, 1994, pp. 1–4.

Kahn, D., The Codebreakers: The Story of Secret Writing, The Macmillan Company, 1967.

Kamens, J.I., "Retrofitting Network Security to Third–Party Applications–The SecureBase Experience," Symposium Proceedings, Unix Security IV, Oct. 4–6, 1993, Santa Clara, California, pp. 41–57.

Karger, P.A., et al., "A VMM Security Kernel for the VAX Architecture," CH2884–5/90/0000/0002, IEEE 1990, pp. 2–19.

Karger, P.A., et al., "Multics Security Evaluation: Vulnerability Analysis," HQ Electronic Systems Division, Hanscom AFB, Technical Report 19, Jun. 1974, 14 pages.

Kastenholz, F., "The Definitions of Managed Objects for the Security Protocols of the Point–to–Point Protocol," Network Working Group RFC 1472, Jun. 1993.

Katzan, Harry, Jr. Computer Data Security, Litton Educational Publishing Company, 1973.

Keefe, T.F., et al., "Prototyping the SODA Security Model," Department of Computer Science, University of Minnesota, 1990, pp. 211–235.

Kelter, U., "Discretionary Access Controls in a High–Performance Object Management System," 1991 IEEE Computer Society Symposium on Research in Security and Privacy, May 20–22, 1991, Oakland, California, pp. 288–299.

Kelter, U., et al., "Type Level Access Controls for Distributed Structurally Object–Oriented Database Systems," Computer Security, ESCORICS 92, Second European Symposium on Research in Computer Security, Toulouse, France, Nov. 23–25, 1992, pp. 21–40.

Kent, S., et al., "Privacy Enhancement for Internet Electronic Mail: Part II—Certificate–Based Key Management," Network Working Group, Aug. 1989, pp. 1–22.

Kim, L., et al., "Novell Cuisine," Proceedings of the ACM SIGUCCS User Services Conference XIX, Nov. 3–6, 1991, Seattle, Washington, pp. 183–184.

Klemond, P., "Investigating Object Linking and Embedding, Part II: Adding Server Support," Microsoft Systems Journal, May/Jun. 1992, pp. 87–94.

Klemond, P., "Taking the Bull by the Horns: Investigating Object Linking and Embedding, Part I," Microsoft Systems Journal, Mar./Apr. 1992, pp. 19–38.

Kluepfel, H.M., "Securing a Global Village and its Resources: Baseline Security for Interconnected Signaling System #7 Telecommunications Networks," 1993, pp. 195–212.

Kohl, J.T., et al., "The Evolution of the Kerberos Authentication Service," Digital Equipment Corporation, 1991, pp. 1–15.

Krajewski, Jr., M., "Applicability of Smart Cards to Network User Authentication," Computing Systems, vol. 7, No. 1, Winter 1994, pp. 75–89.

Krajewski, Jr., M., "Smart Card Augmentation of Kerberos,". The Mitre Corporation, (undated), 6 pages.

Krajewski, Jr., M., et al., "Concept for a Smart Card Kerberos," The Mitre Corporation, (undated), 7 pages.

Kramer, M., "Strength in Numbers," PC Week, Jul. 22, 1986, pp. 57–58.

Kreutzer, A.N., "An On–Line System for Controlling and Monitoring Software Usage in a Microcomputer Laboratory," SIGUCCS Newsletter, vol. 18, No. 2, 1988, pp. 29–32.

Krol, E., The Whole Internet User's Guide and Catalog, 2nd. Ed., O'Reilly & Associates, Inc., 1992.

Kurak, C., et al., "A Cautionary Note On Image Downgrading," Proceedings of the 1992 Computer Security Applications Conference, San Antonio, TX, Dec. 1992, 7 pages.

LaLonde Wilf, R., et al., Inside Smalltalk: Volume 1, Prentice–Hall, Inc., 1990.

Lampson, B., "Computer Security," Digital Equipment Corporation, 1991, pp. 1–54.

Lampson, B.W., "A Note on the Confinement Problem," Communications of the ACM, Oct. 1973, pp. 1–5.

Lampson, Butler, et al., "Authentication in Distributed Systems: Theory and Practice," ACM Trans. Computer Systems, vol. 10, No. 4, Nov. 1992, 46 pages.

Landwehr, C.E., et al., "A Taxonomy of Computer Program Security Flaws," ACM Computer Surveys, vol. 26, No. 3, Sep. 1994, pp. 211–254.

Landwehr, C.E., "Formal Models for Computer Security," Computer Surveys, vol. 13, No. 3, Sep. 1981, pp. 247–278.

Leary, P., "Are There Ciphers in Shakespeare?," 1995, pp. 1–18.

Lehman, B., "Intellectual Property and the National Information Infrastructure, A Preliminary Draft of the Report of the Working Group on Intellectual Property Rights," Jul. 1994, 4 introductory pages and pp. 1–141.

Leiss, E., "On Authorization Systems with Grantor–Controlled Propagation on Privileges," Compcon 83, Feb. 28–Mar. 3, 1983, San Francisco, California, pp. 499–502.

Levine, P.H., et al., "Network License Server," Apollo, Oct. 1987, pp. 1–19.

Lewontin, S., et al., "The DCE Web Project: Providing Authorization and Other Distributed Services to the World Wide Web," Feb. 22, 2002.

Lin, P., "The Encapsulated Security Services Interface (ESSI)," Computer Security (A–37), 1993, pp. 119–135.

Linn, J., "Privacy Enhancement for Internet Electronic Mail: Part I—Message Encipherment and Authentication Procedures," Network Working Group, Aug. 1989, pp. 1–30.

Lipson, S., "Little Black Box 'Blocks' Illicit Software Copying," Stamford Advocate, Sep. 14, 1986, pp. E1–E2.

"List of Articles," <www.chaum.com/articles/list–of–articles.htm>, as on Aug. 23, 2002, 4 pages.

Lockhart, Jr., H.W., OSF DCE Guide to Developing Distributed Applications, McGraw–Hill, Inc., 1994.

Lunt, Teresa, "Multilevel Security for Object–Oriented Database Systems," SRI International Computer Science Laboratory, 1990, pp. 199–209.

"Mach Books," viewed on Feb. 6, 2002 at http://www2.cs.cmu.edu/afs/cs/project/mach/public/www/doc/books.html., pp. 1–3.

Mann, C.C., "Homeland Insecurity," Sep. 2002.

Maude, T., et al., "Hardware Protection Against Software Piracy," Communications of the ACM, vol. 27, No. 9, Sep. 1984, pp. 951–959.

McGraw, G., et al., Java Security, John Wiley & Sons, Inc., 1997.

Medvinsky, G., et al., "NetCash: A Design for Practical Electronic Currency on the Internet," 1st Conference on Computer and Communication Security, Nov. 1993, pp. 102–106.

"Microsoft Authenticode Technology," Microsoft Corporation, Oct. 1996.

Microsoft Press, OLE 2 Programmer's Reference; Volume 1, "Working with Windows Objects," 1994.

Miller, S.P., et al., "Kerberos Authentication and Authorization System," Massachusetts Institute of Technology, Oct. 27, 1998, pp. 1–36.

Minear, S.E., "Providing Policy Control Over Object Operations in a Mach Based System," Secure Computing Corporation, Apr. 28, 1995, 15 pages.

Moffett, J.D., "Delegation of Authority Using Domain–Based Access Rules," thesis Imperial College of Science, Technology & Medicine, University of London, Jul. 1990.

Moffett, J., et al., "Specifying Discretionary Access Control Policy for Distributed Systems," Computer Communications, vol. 13, No. 9, Nov. 1990, pp. 1–17.

Moffett, J.D., "Specification of Management Policies and Discretionary Access Control," Department of Computer Science, University of York, Jun. 28, 1994, pp. 1–28.

Moffett, J.D., et al., "The Representation of Policies as System Objects," Proceedings of the Conference on Organizational Computer Systems (COCS '91), Atlantia, Georgia, Nov. 5–8, 1991, 16 pages.

Moffett, J.D.,et al., "Policy Hierarchies for Distributed Systems Management," IEEE JSAC Special Issue on Network Management, vol. 11, No. 9, Dec. 1993, pp. 1–4.

Moffett, Jonathan, D., et al., "An Introduction to Security Distributed Systems," Department of Computer Science, University of York, England, Aug. 1993, pp. 1–14.

Montini, G, et al., "Access Control Models and Office Structures," Computer Security: A Global Challenge, 1984, pp. 473–485.

Motorola MC68030 Enhanced 32–bit Microprocessor User's Manual, 2nd Ed., Prentice–Hall, 1989.

Mullender, S., Distributed Systems, ACM Press, 1989.

Multics, Home; viewed on Nov. 12, 2001 at <http://www-.multicians.org> pp. 1–3.

Multimedia Mixed Object Envelopes Supporting a Graduated Fee Scheme via Encryption; IBM Technical Disclosure BUlletin, vol. 37, No. 3, Mar. 1994.

National Computer Security Center, "Trusted Unix Working Group (TRUSIX) Rationale for Selecting Access Control List Features for the UNIX (R) System," Aug. 18, 1989.

National Institute of Standards and Technology, "History of Computer Security: Early Computer Security Papers, Part 1," viewed on Sep. 4, 2002 at <http://csrc.nist.gov/publications/history/index.html> pp. 1–27.

National Security Agency, "A Guide to Understanding Security Modeling in Trusted Systems," Oct. 1992, 122 pages.

National Semiconductor "iPower Technology," (undated), 11 pages.

Needham, R.M., "Ading Capability Access to Conventional File Servers," Xerox Palo Alto Research Center, (undated), pp. 3–4.

Netscape, "SSL 2.0 Protocol Specification," viewed at http://home.netscape.com/eng/security/SSL.2html Jan. 23, 2003.

NIST & NSA, "Federal Criteria for Information Technology Security," Vol. II, Version 1.0, National Institute of Standards and Technology and National Security Agency, Dec. 1992, 270 pages.

NSA Korean War 1950–1953 Commemoration, History Papers, National Security Agency, http://www.nsa.gov/korea/papers.htm, pp. 1–2.

Olivier, M.S., "A Multilevel Secure Federated Database," Database Security, VIII (A–60), 1994, pp. 183–198.

Olivier, MS, et al., "Building a Secure Database using Self–protecting Objects," Computers & Security, vol. 11, No. 3, 259–271, 1992.

Olson, M., et al., "Concurrent Access Licensing," vol. 6, No. 9, Unix Review, 1988, pp. 67–74.

OMG Security Working Group, "OMG White Paper on Security," OMG Security Working Group, Apr. 1994, pp. 1–24.

OOPSLA 1993: Addendum to the Proceedings, "Security for Object–Oriented Systems," Sep. 26–Oct. 1, 1993, pp. 77–78.

Open Software Foundation, OSF DCE Administration Guide–Core Components, PTR Prentice Hall, 1993.

Orfali, R., et al., The Essential Distributed Objects Survival Guide, John Wiley & Sons, Inc., 1996.

Park, J.S., AS/400 Security in a Client/Server Environment, John Wiley & Sons, Inc. 1995.

Picciotto, J., et al., "Extended Labeling Policies for Enhanced Application Support," Computers & Security, vol. 13, No. 7, 1994, pp. 587–599.

Polk, T.W., "Approximating Clark–Wilson "Access Triples" with Basic UNIX Controls," Symposium Proceedings, Unix Security IV, Oct. 4–6, 1993, Santa Clara, California, pp. 145–154.

Press, J., "Secure Transfer of Identity and Privilege Attributes in an Open Systems Environment," Computers & Security, vol. 10, No. 2, 1991, pp. 117–127.

"Privacy and the Nill: Safeguarding Telecommunications—Related Personal Infrmation", U.S> Dept. of Commerce, Oct. 1995.

"Proceedings: Technological Strategies for Protecting Intellectual Propertly in the Networked Multimedia Environment," 1994, Coalition for Networked Information, Interactive Multimedia Association, John F. Kennedy School of Government, Journal of the Inte.

Purdy, G.B., et al., "A Software Protection Scheme," Proceedings of the 1982 Symposium on Security and Privacy, Apr. 26–28, 1982, Oakland California, pp. 99–103.

Rashid, R.F., CMU Computer Science: A 25th Anniversity Commermorative, Addison–Welsey Publishing Company, 1991.

Rescorla, E., et al., "The Secure HyperText Transfer Protocol," Enterprise Integration Technologies, Jun. 1994, pp. 1–23.

Rivest, R., "The MD5 Message–Digest Algorithm," Network Working Group, Apr. 1992, pp. 1–21.

Roberts, R., et al., Compute!'s Computer Security, Compute! Publications, Inc., 1989.

Robinson et al., "Encoding Header Field for Internet Messages," Network Working Group RPC 1154, Apr. 1990.

Rosenberry, W., et al., "Distributing Applications Across DCE and Windows NT," 1993.

Rosenberry, W., et al., Understanding DCE, O'Reilly & Associates, Inc., 1992.

Ross, P.E., "Cops versus robbers in cyberspace," Forbes, Sep. 9, 1996.

RSA Security; News; "Enterprise Solutions Announces RSA Mail," <http://rsasecurity.com/news/pr/940112-2.html.>, dated Jan. 12, 1994, pp.1-2.

RSA Security; News; "Hewlett-Packard Chooses RSA," <http://rsasecurity.com/news/pr/940112-5.html>, dated Jan. 12, 1994, pp. 1-2.

RSA Security; News; "Hilgraeve Ships Secure Version of HyperACCESS/5," <http://rsasecurity.com/news/pr/940112-8.html.>, dated Jan. 12, 1994, pp. 1-2.

RSA Security; News; "iPower's Data Security Approach," <http://rsasecurity.com/news/pr/940112-10.html>, dated Jan. 12, 1994.

RSA Security; News; "RSA Enters Wireless Arena," <http://resasecurity.com/news/pr/940112-6.html>, dated Jan. 12, 1994, pp. 1-2.

RSA Security; News; <http://rsasecurity.com/news/pr/9401.html>, dated Jan. 12, 1994, pp. 1-2.

Rubin, A.D., "Trusted Distribution of Software Over the Internet," Bellcore, 1995, pp. 1-9.

Rushby, J.M., "Design and Verification of Secure Systems," ACM, 1981, pp. 12-21.

Russell, D., et al., Computer Security Basics, O'Reilly & Associates, Inc., 1991.

Russell, S., "Paradigms for Verification of Authorization at Source of Electronic Documents in an Integrated Environment," Computers & Security, vol. 12, No. 6, 1993, pp. 542-549.

Russell, S., "Planning for the EDI of Tomorrow Using Electronic Document Authorization," Computer Security (A-37), 1993, pp. 243-251.

Sander, T. et al., "Protecting Mobile Agents Against Malicious Hosts," Mobile Agents and Security: Lecture Notes in Computer Science, Springer-Verlag, G. Vigna, Ed., vol. 1419, Nov. 11, 1997, 16 pages.

Sander, T. et al., "Towards Mobile Cryptography," IEEE Proceedings of Security and Privacy, May 1998, 10 pages.

Sandhu, R.S., et al., "Data and Database Security and Controls," Handbook of Information Security Management, Auerbach Publishers, 1993, pp. 1-37.

Saydjari, O.S., et al., "LOCK Trek: Navigating Unchartered Space," National Computer security Center, 1989, pp. 167-175.

Schaumüller-Bichl, S., "IC-Cards in High-Security Applications," Voest-Alpine AG, (undated), pp. 177-199.

Schill, A., et al., "Mobility Aware Multimedia X. 400 e-mail: A Sample Application Based on a Support Platform for Distributed Mobile Computing," Dresden University of Technology, Faculty of Computer Science, (undated), pp. 1-7.

Schill, A.B., et al., "DC++: Distributed Object-Oriented System Support on top of OSF DCE," 1993.

Schill, A.B., et al., "DCE-The OSF Distributed Computing Environment Client Server Model and Beyond," Oct. 1993.

Sebes, E.J., "Overview of the Architecture of Distributed Trusted Mach," (undated), pp. 1-10.

Sebes, E.J., et al., "The Architecture of Triad: A Distributed, Real-Time, Trusted System," (undated), pp. 1-12.

Sebes, E.J., et al., "The Triad System: The Design of a Distributed, Real-Time, Trusted System," (undated), pp. 1-12.

Secure Computing, "Constructing a High Assurance Mail Guard," 1994, pp. 1-10.

"Security Enhanced LINUX," National Security Agent, http://www.nsa.gov/selinux/, pp. 1-2.

Shaffer, S.L., et al., Network Security, Academic Press, Inc., 1994.

Sheridan Software Systems, Data Widgets 2.0: Programmer's Guide, Sheridan Software Systems, Inc., 1993-1995.

Shirley, J., "Guide to Writing DCE Applications," 1st Ed. 1992.

Shirley, J., et al., "Guide to Writing DCE Applications," 2nd Ed. 1994.

Short, K.L., Microprocessors and Programmed Logic, Prentice-Hall, Inc., 1981.

Sibert, Olin, et al., DigiBox: A Self-Protecting Container for Information Commerce, Proceedings of the First USENIX Workshop on Electronic Commerce, New York, NY, Jul. 1995, 9 pages.

Sibert, Olin, et al., Securing the Content, Not the Wire, for Information Commerce, InterTrust Technologies Corporation, 1996, 12 pages.

Sibert, Olin, et al., "The Intel 80x86 Processor Architecture: Pitfalls for Secure Systems," (undated), 12 pages.

"SIGSALY Secure Digital Voice Communications in World War II," National Security Agency, http://www.nsa.gov/wwii/papers/sigsaly.htm, Oct. 13, 2000, pp. 1-2.

Smart Card 1993 Conference Proceedings, "Day 1: Communications and Marketing Systems & Market Overview," Lowndes Exhibition Organisers, Ltd., 1993, pp. 1-79.

Solomon, Daniel, J., "Processing Multilevel Secure Objects," Proceedings of the 1981 Symposium on Security and Privacy, Apr. 27-29, 1981, Oakland, California, pp. 56-61.

Stallings, W., Cryptography and Network Security: Principles and Practice, Prentice-Hall, Inc., 1999.

Stepney et al., "Formal specification of an Access Control System," Software-Practice and Experience, vol. 17, No. 9, 1987.

Strack, Hermann, "Extended Access Control in UNIX System V-ACLs and Context," Usenix Association, Proceedings of the Unix Security II Workshop, Aug. 27-28, 1990, Portland, Oregon, pp. 87-101.

Stubblebine, S.G., "Security Services for Multimedia Conferencing," Proceedings of the 16th National Computer Security Conference, Baltimore, Maryland, Sep. 20-23, 1993, pp. 1-5.

Tanenbaum, A.S., et al., "Distributed Operating Systems," Computing Surveys, vol. 17, No. 4, Dec. 1985, pp. 419-470.

Tanenbaum, A.S., et al., "The Amoeba Distributed Operating System," 1990.

Tanenbaum, A.S., et al., "The Amoeba Distributed Operating System-A Status Report," 1991.

Tanenbaum, A.S., Modern Operating Systems, Prentice-Hall, Inc. 1992.

Tanenbaum, A.S., Operating Systems: Design and Implementation, Prentice-Hall, Inc. 1987.

"Technical Rationle Behind CSC-STD-003-85: Computer Security Requirements," http://www.radium.ncsc.mil/tpep/library/rainbow/CSC-STD-004-85.html, Jun. 25, 1985, pp. 1-40.

The First USENIX Workshop on Electronic Commerce Proceedings, New York, New York, Jul. 11–12, 1995, Usenix Association.

The Risks Digest, "Forum on Risks to the Public in Computers and Related Systems," vol. 15; Issue 39, Jan. 21, 1994, pp. 1–12.

The Risks Digest, "Forum on Risks to the Public in Computers and Related Systems," vol. 15; Issue 47, Feb. 9, 1994, pp. 1–12.

Thomas, R.K., et al., "Implementing the Message Filter Object–Oriented Security Model without Trusted Subjects," Proceedings of the IFIP Workshop on Database Security, Aug. 19–21, 1992, Vancouver, Canada, 21 pages.

Ting, T.C., et al., "Requirements, Capabilities and Functionalities of User Role Based Security for an Object–Oriented Design Model," Database Security, V: Status and Prospectus, 1992, pp. 275–297.

Tirkel, A.Z., et al., "Electronic Water Mark," (undated), 5 pages.

Toohey, J., Using OLE 2.X in Application Development, Que Corporation, 1994.

Townsend, J.E., "NIST on Internet Security," Mar. 22, 1994, pp. 1–15.

U.S. Department of Commerce (NIST), "Security Requirements for Crytopgraphic Modules," Jan. 11, 1994, pp. 1–53.

Uhler, Stephen A., "PhoneStation, Moving the Telephone onto the Virtual Desktop," 1993 Winter USENIX, San Diego, California, Jan. 25–29, 1993, pp. 131–140.

van Gilluwe, F., The Undocumented PC: A Programmer's Guide to I/O, Cpus, and Fixed Memory Areas, Addison–Wesley Publishing Company, 1994.

van Schyndel, R.G., et al., "A Digital Watermark," (undated), 3 pages.

Vickers Benzel, T.C., et al., "Identification of Subjects and Objects in a Trusted Extensible Client Server Architecture," (undated), pp. 1–17.

Vittal, J., "Active Message Processing: Messages as Messengers," Bolt, Beranek and Newman, Inc., 1980, pp. 175–195.

Voydock, V.L., et al., "Security Mechanisms in High–Level Network Protocols," Computing Surveys, vol. 15, No. 2, Jun. 1983, pp. 135–171.

Walker, Bruce. J., et al., Computer Security and Protection Structures, Dowden, Hutchinson, & Ross, Inc., 1977.

Ware, W., Chairman RAND Corporation "Panel: The Inter-Trust Commerce Architecture," 1997, 6 pages.

Weadon, P.D., "The SIGSALY Story," Dec. 10, 2002.

White, J.E., "Telescript Technology: The Foundation for the Electronic Marketplace," General Magic, 1994.

Williams, S., "An MSJ Interview with Microsoft's Chief Architect of OLE, Tony Williams," Microsoft Systems Journal, Oct. 1993, pp. 56–66.

Wong, R., et al., "The SIDOS System: A Secure Distributed Operating System Prototype," Odyssey Research Associates, Oct. 1989, pp. 172–183.

Wood, P.H., et al., UNIX System Security, Pipline Associates, Inc., 1985.

Yee, B., et al., "Secure Coprocessors in Electronic Commerce Applications," Proceedings of the First Usenix Workshop on Electronic Commerce, New York, New York, Jul. 1995, 16 pages.

Young, W.D., "Verifiable Computer Security and Hardware: Issues," Technical Report, Computational Logic Inc., Sep. 1991, 43 pages.

Zeleznick, M.P., "Security Design in Distributed Computing Applications," Department of Computer Science, University of Utah, Dec. 1993, 16 pages.

Zelnick, Nate, "Keeping Business Safe on the Internet," PC Magazine, Apr. 25, 1995, pp. 1–2.

Zurko, M.E., "Panels at the 1997 IEEE Symposium on Security and Privacy," Oakland, CA, May 1997, 12 pages.

Bancilhon, Francios, et al., "Building an Object–Oriented Database System: The Story of $0_2$," Morgan Kaufmann Publishers, San Mateo, California, 1992, 104 pages.

Goldfarb, Charles F., "The SGML Handbook," Oxford University Press, Inc., New York, New York, 1990, 134 pages.

Hardjono, Thomas, et al., "A New Approach to Database Authentication," Research and Practical Issues in Databases: Proceedings of the $3^{rd}$ Australian Database Conference, Melbourne, Australia, Feb. 3–4, 1992, pp. 334–342.

Kaplan, Marc A., et al., "Digital Signatures for Software: Technical Requirements and a Proposal," IBM Research, T.J. Watson Research Center, Apr. 1996, 7 pages.

Kim, Won, "Object–Oriented Databases: Definition and Research Directions," IEEE Transactions on Knowledge and Data Engineering, vol. 2, No. 3, Sep. 1990, pp. 327–341.

Ledgard, Henry F., "The Little Book of Object–Oriented Programming," Prentice Hall, Upper Saddle River, New Jersey, 1996, 35 pages.

Nyanchama, G. Matunda, et al., "Mandatory Security in an Object–Oriented Database," The University of Western Ontario, London, Ontario, Canada, 1992, 35 pages.

Peterson, Gerald E., et al., "Object–Oriented Computing Volume I: Concepts," Computer Society Press of the IEEE, Washington, D.C. vol. I: Concepts, 1987, 34 pages.

Wade, Andrew E., "The ODBMS Role in 64 bit Distributed Client–Server Computing," Electro International, May 10–12, 1994, 7 pages.

"Information Processing—Text and Office Systems—Standard Generalized Markup Language (SMGL)," International Standard ISO 8879, First Edition, Oct. 15, 1986, 171 pages.

Goldfarb, C., Document from the Internet: "A Brief History of the Development of SGML," 1993, 7 pages.

Kim, W., et al., *Object—Oriented Concepts, Databases, and Applications*, ACM Press, New York, New York, 1989, 63 pages.

Lagoze, C. et al., "The Warwick Framework: A Container Architecture for Aggregating Sets of Metadata," Cornell University Computer Science Technical Report TR96–1593, Jun 28,. 1996, 26 pages.

Laplante, M., "Information Interoperability," May '96 Inform, pp. 16–18.

Lynch, C., "When Technology Leads Policy", ARL Proceedings of the $131^{st}$ Annual Meeting (Preservation of Digital Information), Oct. 15–17, 1997, 6 pages.

McKenzie, M., "Copyright Protection: Understanding Your Options," The Seybold Report on Internet Publishing, vol. 1, No. 4, Dec. 1996, pp. 6–14.

Ward, N., "Networked Information Management," slide-show, DSTC, Canberra, Australia, Jul. 1997, 56 pages.

Weibel S., et al., "An Element Set to Support Resource Discovery," The State of the Dublin Core, Jan. 1997, available at http://www.cs.cornell.edu/lagoze/papers/jodl.hmtl, 15 pages.

*DSTC's 1995/96 Annual Report*, CRC for Distributed Systems Technology, 73 pages.

* cited by examiner

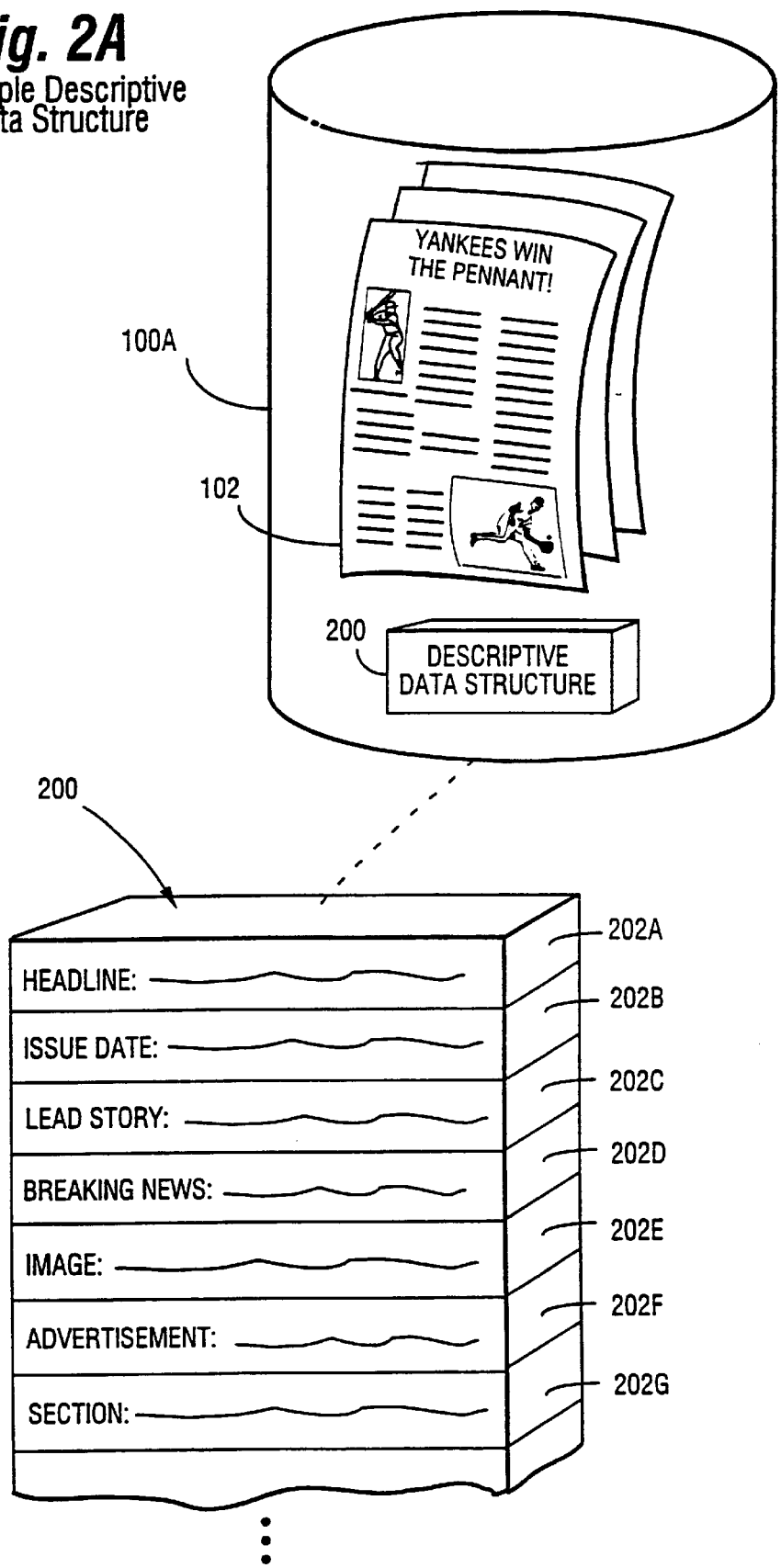

Fig. 2B Example Descriptive Data Structure
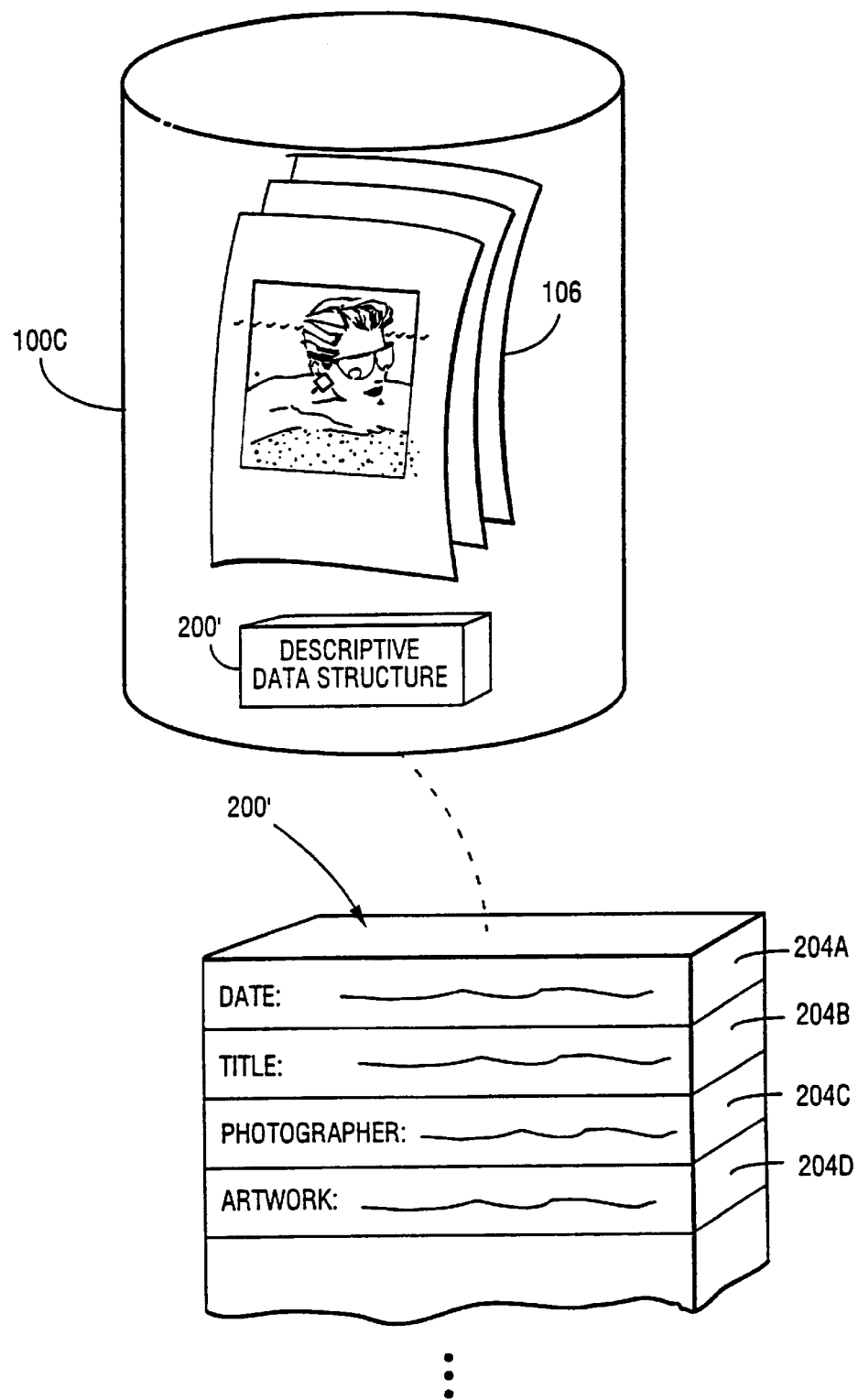

Example Creation Usage And Descriptive Data Structures

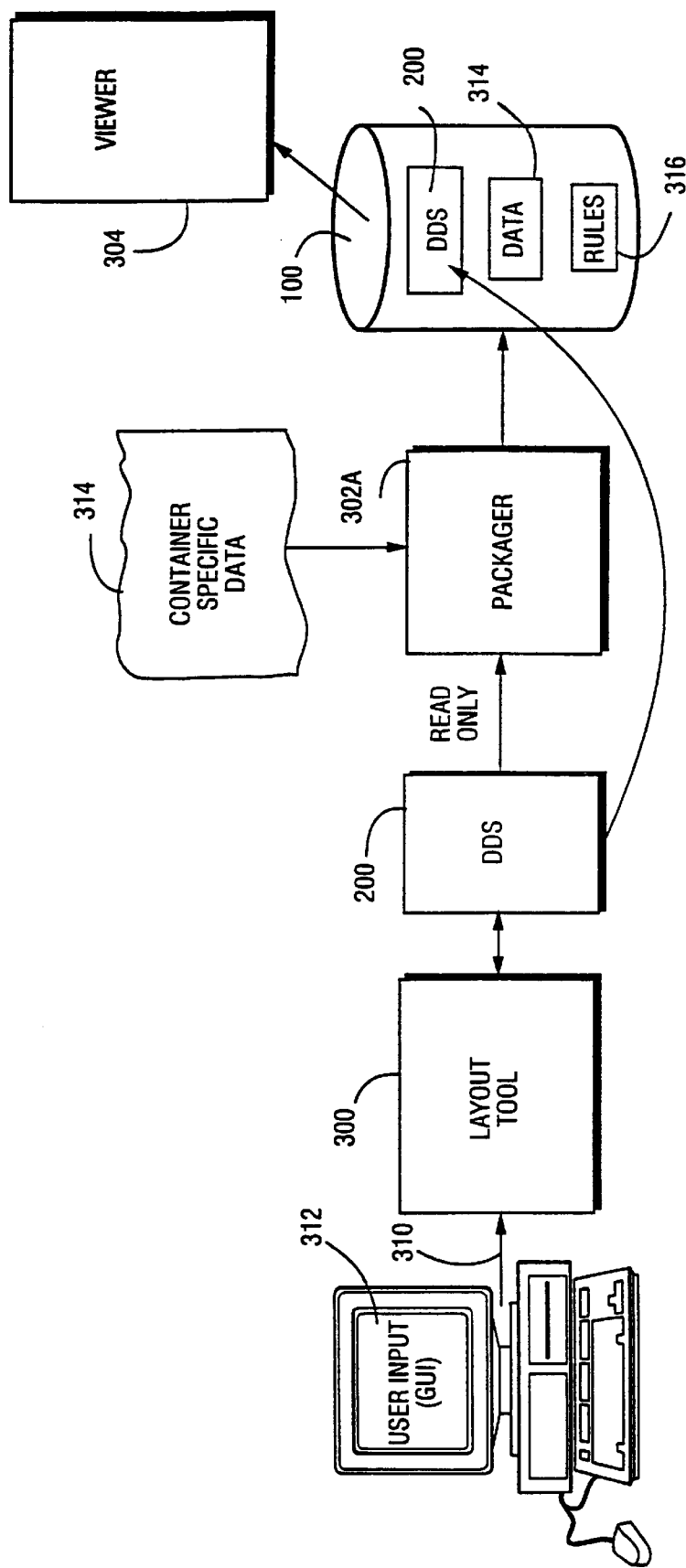
Fig. 4 Example Template Creation And Usage

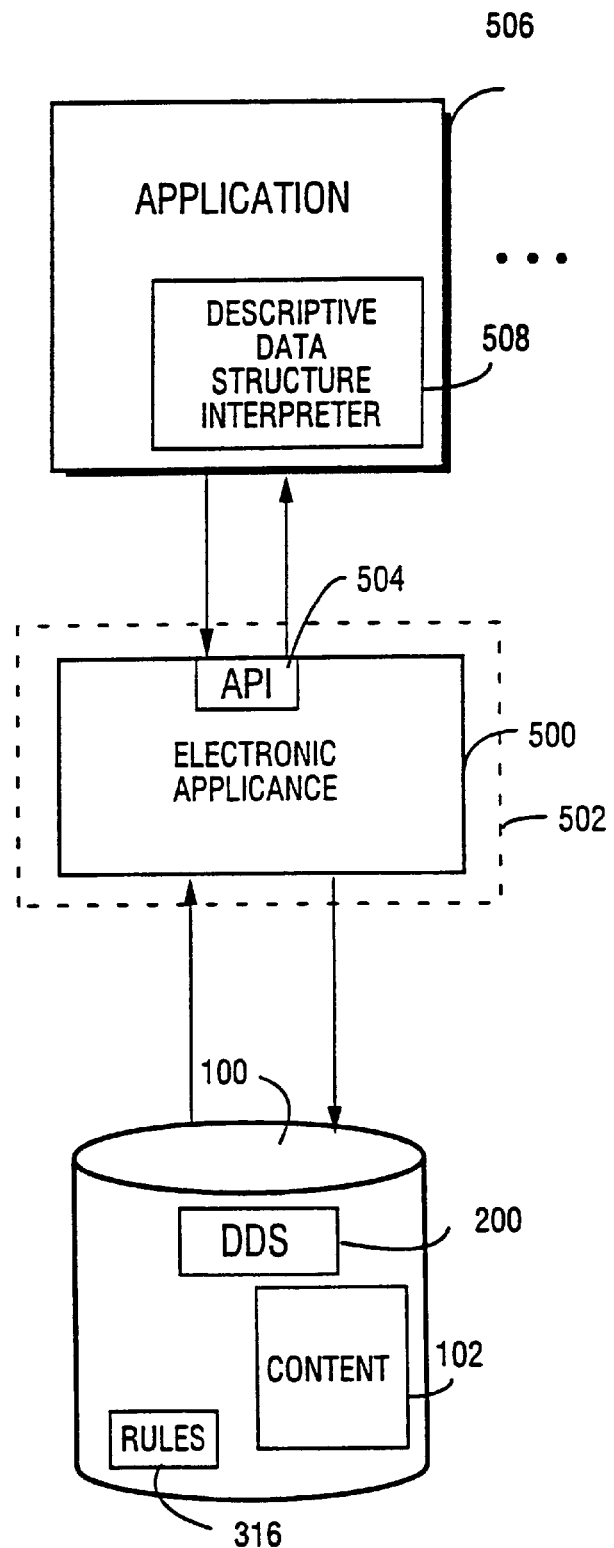
Fig. 5 Example Secure System Architecture

Example Detailed DDS Process

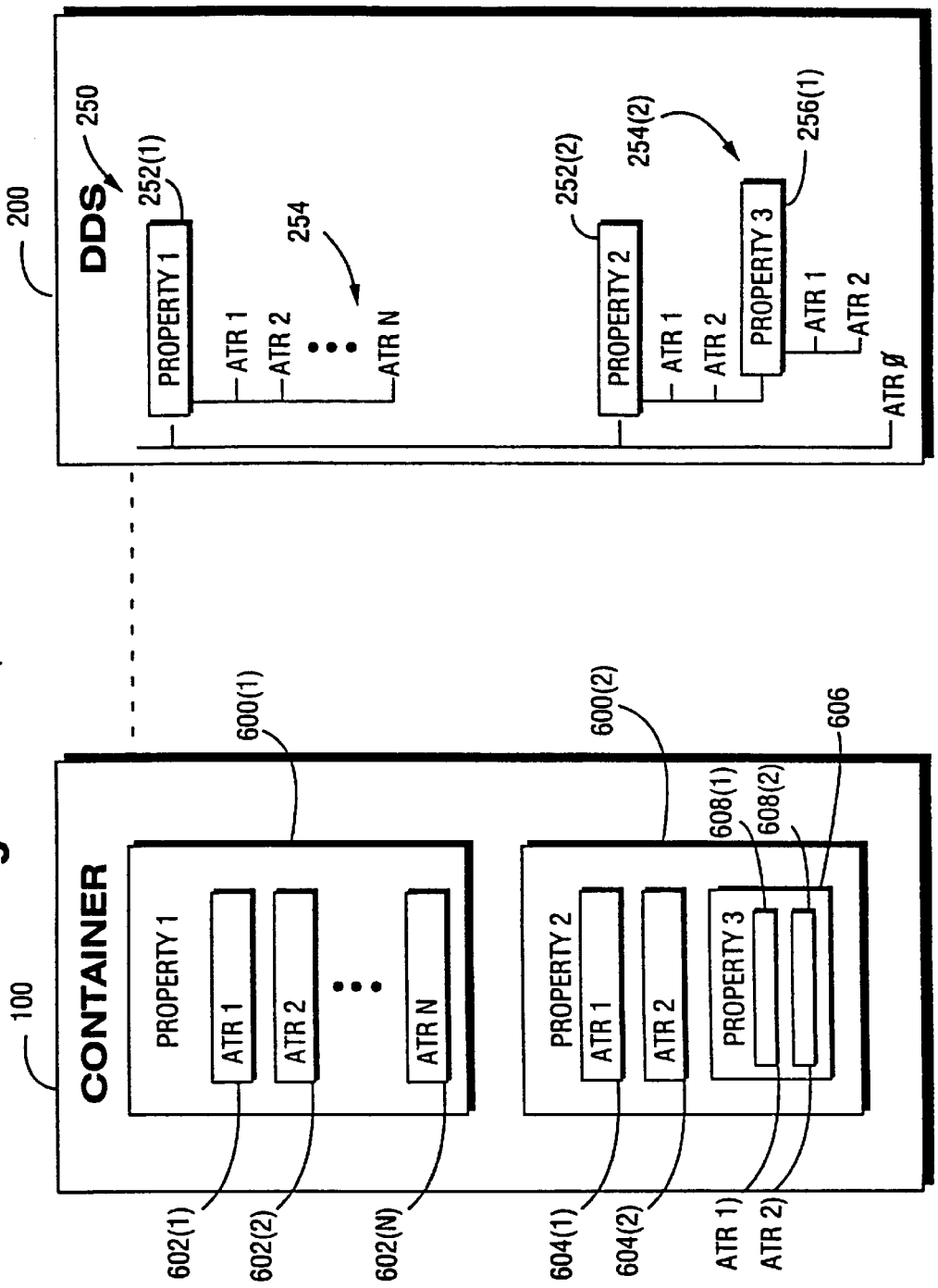
Fig. 6  Example Hierarchial DDS Structure

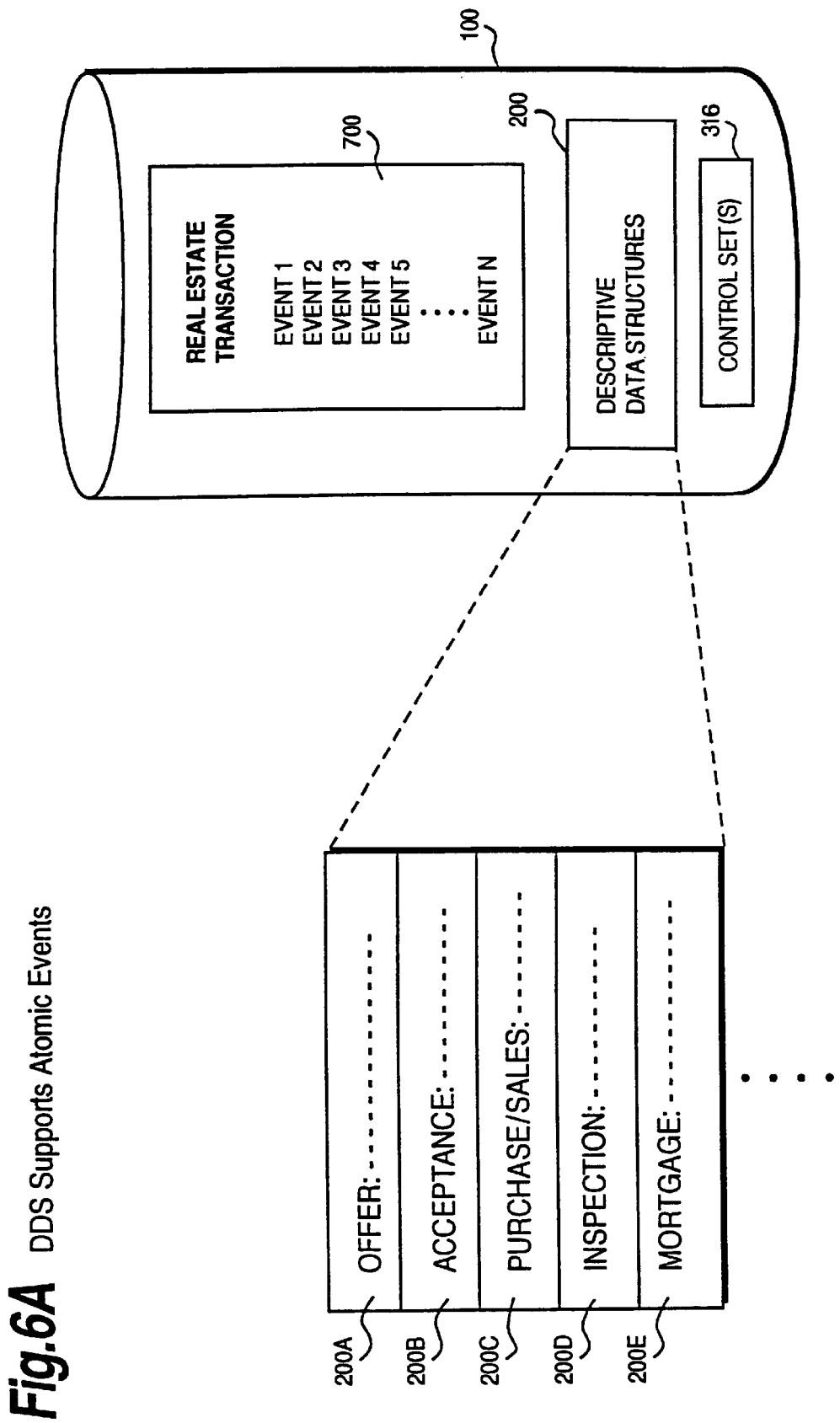
Fig.6A DDS Supports Atomic Events

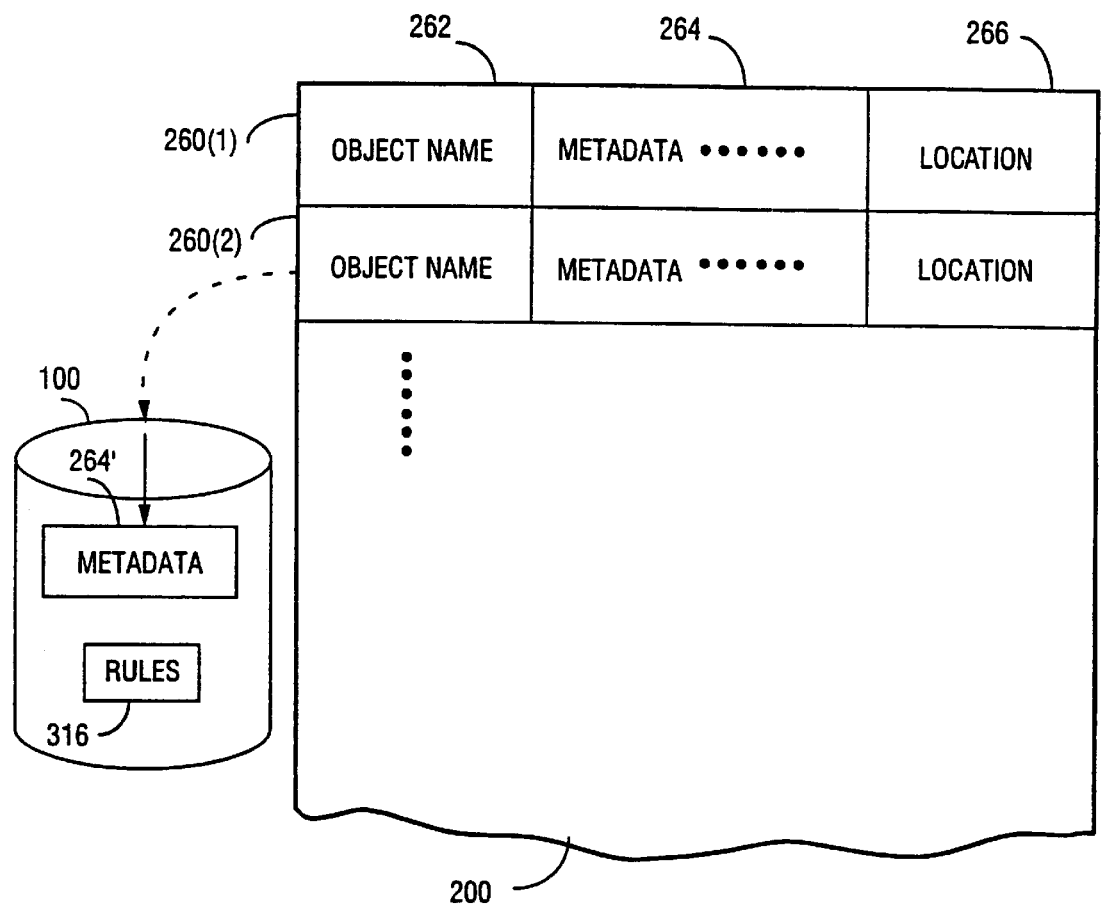
*Fig. 7* Example Descriptive Data Structure Format

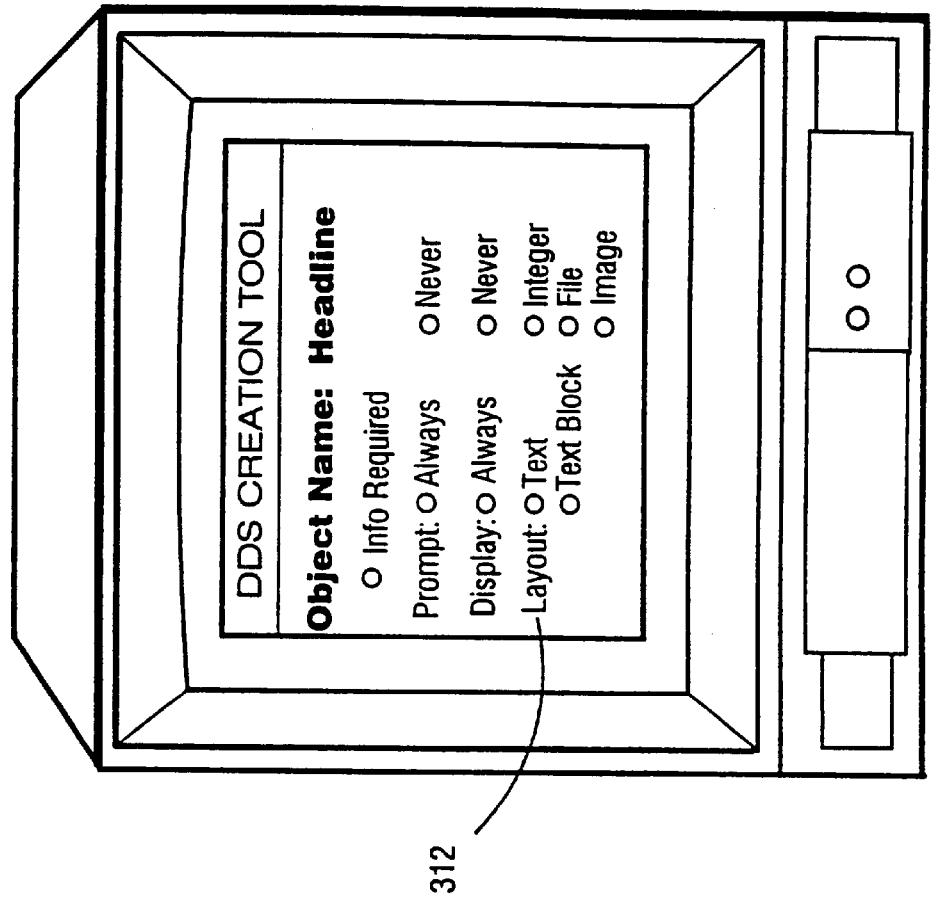
Fig. 8 Example DDS Creation Graphics Interface

TECHNIQUES FOR DEFINING, USING AND MANIPULATING RIGHTS MANAGEMENT DATA STRUCTURES

This application is a continuation of copending application Ser. No. 09/300,778, filed Apr. 27, 1999, which is a continuation of application Ser. No. 08/805,804, filed Feb. 25, 1997, now U.S. Pat. No. 5,920,861—all of which are incorporated herein by reference.

CROSS-REFERENCE TO RELATED APPLICATIONS

This application is related to commonly assigned application Ser. No. 08/388,107 of Ginter et al. entitled "SYSTEMS AND METHODS FOR SECURE TRANSACTION MANAGEMENT AND ELECTRONIC RIGHTS PROTECTION," filed on Feb. 13, 1995; now abandoned and pending application Ser. No. 08/699,712 of GINTER et al. entitled "TRUSTED INFRASTRUCTURE SUPPORT SYSTEMS, METHODS AND TECHNIQUES FOR SECURE ELECTRONIC COMMERCE ELECTRONIC TRANSACTIONS AND RIGHTS MANAGEMENT" filed on Aug. 12, 1999 now abandoned. The entire disclosures, including the drawings, of those prior filed specifications are incorporated by reference into this application.

FIELD OF THE INVENTION

This invention relates to techniques for defining, creating, and manipulating rights management data structures. More specifically, this invention provides systems and processes for defining and/or describing at least some data characteristics within a secure electronic rights management container. The present invention also provides techniques for providing rights management data structure integrity, flexibility, interoperability, user and system transparency, and compatibility.

BACKGROUND AND SUMMARY OF THE INVENTION(S)

People are increasingly using secure digital containers to safely and securely store and transport digital content. One secure digital container model is the "DigiBox™" container developed by InterTrust Technologies Corp. of Sunnyvale Calif. The Ginter et al. patent specification referenced above describes many characteristics of this DigiBox™ container model—a powerful, flexible, general construct that enables protected, efficient and interoperable electronic description and regulation of electronic commerce relationships of all kinds, including the secure transport, storage and rights management interface with objects and digital information within such containers.

Briefly, DigiBox containers are tamper-resistant digital containers that can be used to package any kind of digital information such as, for example, text, graphics, executable software, audio and/or video. The rights management environment in which DigiBox™ containers are used allows commerce participants to associate rules with the digital information (content). The rights management environment also allows rules (herein including rules and parameter data controls) to be securely associated with other rights management information, such as for example, rules, audit records created during use of the digital information, and administrative information associated with keeping the environment working properly, including ensuring rights and any agreements among parties. The DigiBox™ electronic container can be used to store, transport and provide a rights management interface to digital information, related rules and other rights management information, as well as to other objects and/or data within a distributed, rights management environment. This arrangement can be used to provide an electronically enforced chain of handling and control wherein rights management persists as a container moves from one entity to another. This capability helps support a digital rights management architecture that allows content rightsholders (including any parties who have system authorized interests related to such content, such as content republishers or even governmental authorities) to securely control and manage content, events, transactions, rules and usage consequences, including any required payment and/or usage reporting. This secure control and management continues persistently, protecting rights as content is delivered to, used by, and passed among creators, distributors, repurposers, consumers, payment disaggregators, and other value chain participants.

For example, a creator of content can package one or more pieces of digital information with a set of rules in a DigiBox secure container—such rules may be variably located in one or more containers and/or client control nodes—and send the container to a distributor. The distributor can add to and/or modify the rules in the container within the parameters allowed by the creator. The distributor can then distribute the container by any rule allowed (or not prohibited) means—for example, by communicating it over an electronic network such as the Internet. A consumer can download the container, and use the content according to the rules within the container. The container is opened and the rules enforced on the local computer or other InterTrust-aware appliance by software InterTrust calls an InterTrust Commerce Node. The consumer can forward the container (or a copy of it) to other consumers, who can (if the rules allow) use the content according to the same, differing, or other included rules—which rules apply being determined by user available rights, such as the users specific identification, including any class membership(s) (e.g., an automobile club or employment by a certain university). In accordance with such rules, usage and/or payment information can be collected by the node and sent to one or more clearinghouses for payment settlement and to convey usage information to those with rights to receive it.

The node and container model described above and in the Ginter et al. patent specification (along with similar other DigiBox/VDE (Virtual Distribution Environment) models) has nearly limitless flexibility. It can be applied to many different contexts and specific implementations. For example, looking at FIGS. 1A and 1B, a newspaper publisher can distribute a newspaper 102 within a container 100A. A publisher of fashion magazines 106 can distribute the fashion magazines within another container 100C. Similarly, for example, a wholesale banking environment may use yet a further container, an electronic trading system may use a still further container, and so on.

The InterTrust DigiBox container model allows and facilitates these and other different container uses. It facilitates detailed container customization for different uses, classes of use and/or users in order to meet different needs and business models. This customization ability is very important, particularly when used in conjunction with a general purpose, distributed rights management environment such as described in Ginter, et al. Such an environment calls for a practical optimization of customizability, including customizability and transparency for container models. This customization flexibility has a number of advantages, such as allowing optimization (e.g., maximum efficiency, minimum overhead) of the detailed container design for each particular application or circumstance so as to allow many different container designs for many different purposes (e.g., business models) to exist at the same time and be used by the rights control client (node) on a user electronic appliance such as a computer or entertainment device.

While supporting a high degree of flexibility has great advantages, it can produce difficulties for the average user. For example, think of the process of creating a painting. A master painter creates a painting from a blank canvas. Because the canvas was blank at the beginning, the painter was completely unconstrained. The painting could have been a landscape, a portrait, a seascape, or any other image—limited only by the painter's imagination. This flexibility allows a master painter to create a masterpiece such as the "Mona Lisa." However, great skill is required to create a pleasing image starting from a blank canvas. As a result, an inexperienced painter cannot be expected to create a good painting if he or she begins with a blank canvas.

Consider now an amateur painter just starting out. That person does not have the skill to transform a blank canvas to a pleasing image. Instead of spending years trying to acquire that skill, the amateur can go out and buy a "paint by numbers" painting kit. Instead of using a blank canvas, the amateur painter begins with a preprinted canvas that defines the image to be painted. By following instructions ("all areas labeled "12" should be painted with dark red," "all areas labeled with "26" should be painted with light blue"), the amateur can—with relatively little skill—paint a picture that is relatively pleasing to the eye. To do this, the amateur must rigidly adhere to the preprinted instructions on the canvas. Any deviations could cause the final image to come out badly.

Ease of use problems in the computer field can be analogized to the "paint by numbers" situation. If it is important for untrained and/or inexperienced users to use particular software, the system designers can predefine certain constructs and design them into the system. This technique allows inexperienced users to make use of potentially very complicated designs without having to fully understand them—but this normally strictly defines, that is severely limits, the functionality and flexibility available by use of the program. As a result, creative solutions to problems are constrained in order to provide practical value. In addition, even the experienced user can find great advantage in using previously implemented designs. Because a user can program a complex program, for example, does not mean it is appropriate or efficient to create a program for a specific purpose, even if the previously implemented program is not ideal. If the creation of a new program "costs" more to create, that is takes too much time or financial resources, the experienced user will normally use a previously implemented program, if available. Therefore, the greatest total amount of value to be realized, related to customization, is to be able to customize with great ease and efficiency so that the cost of customization will not exceed the benefits.

Uniformity, flexibility, compatibility and interoperability are other considerations that come into play in the computer field, particularly in regards to systems supporting customization. In the painting situation, the human eye can appreciate uniqueness—and the "one of a kind" nature of a masterpiece such as the Mona Lisa is a big part of what makes a painting so valuable. In contrast, it is often desirable to make uniform at least the overall layout and format of things in the computer field. It is much more efficient for a computer to know beforehand how to treat and use objects. If the computer doesn't know beforehand how to read or handle an input object, for example, then the computer and the object are said to be "incompatible", i.e., they cannot work together. Computers are said to be "interoperable" if they can work together. Incompatibility and interoperability problems can prevent one computer from talking to another computer, and can prevent you from using computer data created by someone else.

For example, in the non-computer world, a Frenchman who knows only a little English as a second language, might find it far more meaningful and efficient to describe a complex problem in his native tongue, French. But if he is speaking to a second person, an Englishman, and the Englishman does not understand French, the two are not interoperable in French, and the Frenchman must resort to the far less efficient option of speaking in English to the Englishman. Of course, this is far better than if he was trying to speak to a German who understood neither English nor French. Then the two would be not be "interoperable" in regards to discussing the problem. Similarly, because rights management containers may potentially be exchanged and used for a large number of different purposes by a large number of different users, groups, and organizations, it is very important to provide compatibility and interoperability if these different parties, each participating in one or more different rights management models, are to interoperate efficiently. For example, if a rights management container is used to distribute a newsletter and is optimized for this purpose, each reader of the newsletter must have a computer system or software that "knows" how to read the container and the newsletter it contains. Since commerce, such as distributing newsletters, needs to be as efficient and cost-effective as is feasible, it is important to optimize, that is customize, rights management containers to optimally reflect the requirements of their models and not to have unnecessary features for each respective application or class of application, since unnecessary features will require unnecessary computing overhead and/or storage space.

Different newsletter publishers may use different container formats customized to their own particular newsletters and/or content types and/or formats. A newsletter reader interested in many different newsletters may need to be able to read a large number of different formats. It normally will not efficient (or, due to security issues, may not be appropriate) simply to analyze the different containers upon delivery and "try to figure out" or otherwise discern the particular format in use.

Published standards may help achieve a level of interoperability and standards for given types of applications, but it generally takes a long time for any particular standard to achieve industry-wide acceptance and standards will need to vary widely between categories of applications. Moreover, data structure and other standards are often designed to the lowest common denominator—that is, they will carry fields and requirements not needed by some, and miss others features optimal in certain cases. There will always be applications that cannot be optimized for efficiency and/or operation if forced to use a specific standard.

Trade-offs between flexibility, ease of use and incompatibility and interoperability can be further complicated when security considerations come into play. To be effective in many electronic commerce applications, electronic container designs should be tamper-resistant and secure. One must assume that any tools widely used to create and/or use containers will fall into the hands of those trying to break or crack open the containers or otherwise use digital information without authorization. Therefore, the container creation and usage tools must themselves be secure in the sense that they must protect certain details about the container design. This additional security requirement can make it even more difficult to make containers easy to use and to provide interoperability.

The above-referenced Ginter et al. patent specification describes, by way of non-exhaustive example, "templates" that can act as a set (or collection of sets) of control instructions and/or data for object control software. See, for example, the "Object Creation and Initial Control Structures," "Templates and Classes," and "object definition file," "information" method and "content" methods discussions in the Ginter et al. specification. The described templates are, in at least some examples, capable of creating (and/or modifying) objects in a process that interacts with user instructions and provided content to create an object. Ginter et al. discloses that templates may be represented, for example, as text files defining specific structures and/or component assemblies, and that such templates—with their structures and/or component assemblies—may serve as object authoring and/or object control applications. Ginter et al. says that templates can help to focus the flexible and configurable capabilities inherent within the context of specific industries and/or businesses and/or applications by providing a framework of operation and/or structure to allow existing industries and/or applications and/or businesses to manipulate familiar concepts related to content types, distribution approaches, pricing mechanisms, user interactions with content and/or related administrative activities, budgets, and the like. This is useful in the pursuit of optimized business models and value chains providing the right balance between efficiency, transparency, productivity, etc.

The present invention extends this technology by providing, among other features, a machine readable descriptive data structure for use in association with a rights management related (or other) data structure such as a secure container. In one example, the machine readable descriptive data structure may comprise a shorthand abstract representation of the format of the data within a rights management related data structure. This abstract data representation can be used to describe a single rights management data structure, or it may be generic to a family of data structures all following the format and/or other characteristics the abstract representation defines. The abstract representation may be used to create rights management data structures, allow others (including "other" rights management nodes automatically) to read and understand such data structures, and to manipulate some or all of the data structures.

The descriptive data structure can be used as a "template" to help create, and describe to other nodes, rights management data structures including being used to help understand and manipulate such rights management data structures.

In one particularly advantageous arrangement, the machine readable descriptive data structure may be associated with one or a family of corresponding rights management data structures—and may thus be independent of any specific particular rights management data structure usage. For example, a copy of the descriptive data structure may be kept with such data structures. Alternatively, some or all of the descriptive data structure may be obtained from somewhere else (e.g., a clearinghouse or repository) and independently delivered on as-needed basis.

In accordance with one example, the machine readable descriptive data structure provides a description that reflects and/or defines corresponding structure(s) within the rights management data structure. For example, the descriptive data structure may provide a recursive, hierarchical list that reflects and/or defines a corresponding recursive, hierarchical structure within the rights management data structure. In other examples, the description(s) provided by the descriptive data structure may correspond to complex, multidimensional data structures having 2, 3 or n dimensions. The descriptive data structure may directly and/or indirectly specify where, in an associated rights management data structure, corresponding defined data types may be found. The descriptive data structure may further provide metadata that describes one or more attributes of the corresponding rights management data and/or the processes used to create and/or use it. In one example, the entire descriptive data structure might be viewed as comprising such metadata.

The machine readable descriptive data structure may or may not be, in part or in whole, protected, depending on the particular application. Some machine readable descriptive data structures may be encrypted in whole or in part, while others might be maintained in "clear" form so that they are easily accessible. Some machine readable description data structures, whether encrypted or not, may be in part or wholly protected for integrity using a cryptographic hash algorithm in combination with a secrecy algorithm to form a cryptographic seal, and/or through use of other protection techniques (including hardware, e.g., secure semiconductor and/or hardware packaging protection means). The machine readable descriptive data structures may themselves be packaged within rights management data structures, and rules (e.g., permissions records) controlling their access and use may be associated with them.

In accordance with one aspect of how to advantageously use descriptive data structures in accordance with a preferred embodiment of this invention, a machine readable descriptive data structure may be created by a provider to describe the layout of the provider's particular rights management data structure(s) such as secure containers. These descriptive data structure ("DDS") templates may be used to create containers. A choice among two or more possible DDSs may be based upon one or more classes and/or one or more classes may be based on parameter data. The DDS may be loaded and used as the layout rules for secure containers being created. The provider can keep the DDS private, or publish it so that other providers may create compatible, interoperable containers based on the same DDS.

Descriptive data structures can also be used by a container viewer, browser, reader, or any other end user application designed to work with containers. Truly generic viewers or other applications can be written that can process a container in any format at least in part by making use of descriptive data structures. Thus, a descriptive data structure can be used to at least temporarily convert and/or customize a generic viewer (or other application) into a specialized viewer (or other application) optimized around one or more classes of containers. Additionally, specialized readers may be provided to efficiently process descriptive data structures to locate key media elements (e.g., cover page, table of contents, advertiser's index, glossary, articles, unprotected preview, price, and/or rights information regarding viewing, printing, saving electronically, redistributing, related budgets and/or other parameter information, etc.).

Such specialized readers can then seamlessly, transparently, and automatically process to present the user with an easy-to-use interface (for example, an icon display for each of the key media elements) optimized for the specific application, container, and/or user. Different and/or differently presented, such elements may be displayed or otherwise employed based, for example, on the identity of the user and/or user node, including, for example, taking into account one or more class attributes which can influence such automated processing.

Two or more DDSs may be associated with a container and/or container contents, as well as, for example, one or more user and/or node classes. A choice among two or more possible DDSs for a given container and/or class of containers and/or container contents may therefore be based upon one or more classes and/or one or more classes based on parameter data. Overall, this ability to easily characterize, and/or reuse stored, optimized, custom container models and subsequent transparency of translation from such customized containers (e.g. specific DDSs) to general purpose rights management use is particularly useful. For example, where such customized DDSs can be used as a basis for the creation of customized, optimized display of container content and/or control information to substantially improve the ease of use, efficiency, transparency, and optimization of a distributed, generalized rights management environment. In such an environment, for example, user nodes can interact with different DDSs to automatically adjust to the requirements of the commercial or other rights models associated with such DDSs.

Some providers may spend considerable time designing sophisticated container descriptive data structures that describe the layout of their associated containers. With this type of investment in structure and format, the descriptive data structure will often have significant value in their reuse for the same or similar applications. Entities can use descriptive data structures in-house to ensure consistent and highly efficient creation of containers. Third party providers (i.e., a provider other than the one responsible for descriptive data structure creation) can use these descriptive data structures when they wish to create containers compatible with other entities. One example is where the publisher of a widely circulated newspaper develops a descriptive data structure for reading its newspaper. Other, smaller newspapers may want to leverage any viewers or other tools put in place for use with the widely circulated newspaper by adopting the same container format. Descriptive data structures can be copyrighted and/or otherwise protectable by both law and by the rights management system itself. For example, they may also be protected by their own containers and associated controls to ensure that descriptive data structure creators, and/or distributors and/or other users of such DDSs, receive their fair, rights system managed, return on their descriptive data structure creation and/or use related efforts.

In addition to the foregoing, the following is a list of features and advantages provided in accordance with aspects of this invention:

Integrity Constraints: The descriptive data structure allows the provider to protect the integrity of his or her content, by enabling the specification of integrity constraints. Integrity constraints provide a way to state integrity related rules about the content.

Application Generation: The descriptive data structure can be used to generate one or more portions of software programs that manipulate rights management structures. For example, a descriptive data structure could serve as 'instructions' that drive an automated packaging application for digital content and/or an automated reader of digital content such as display priorities and organization (e.g., order and/or layout).

Dynamic user interfaces for creation applications: Applications can read a descriptive data structure to generate an interface optimized for data creation, editing, and/or composition for a specific model, including models involving, for example, composing complex content from textual, audio, video, and interactive (e.g., querying) elements. The data may take the form of a container, database and/or any other digital information organization as any simple or compound and complex file format. Applications can also read a descriptive data structure to learn how to best display an interface for collection and/or creation of content.

Dynamic user interfaces for display applications: Applications can read a descriptive data structure to and generate an interface appropriate for data display. This data may be a container, database or any other compound complex file format. Applications can also read a descriptive data structure to learn how to best display an interface for the presentation of content. Applications can further read a descriptive data structure to learn how to manage display functions related to interacting—for content creation and/or packaging and/or user display purposes including optimizing any of such interactions—with other one or more other applications, smart agents, computing environments, identity (including any class identities) of user and/or user nodes, etc. For example, a user interface might be differently optimized for interacting with: a member of the U. S. Air Force versus a faculty member in social sciences at a university; or a member of a Kiwanis Club versus a member of a Protestant church club, a citizen of the United States versus a citizen of Saudia Arabia, including an appropriate display of expected class membership symbols and related, appropriate organization or suppression of displayed information.

Ability to automatically identify and locate data fields: Full text search, agents, web spiders, and the like, benefit and are able to interact with information contained within one or more areas of a DDS when areas within a data file are known to contain potentially interesting information and such information is presented in a predefined format.

Ability to extract needed or desired data without firsthand knowledge of data format: Full text search, agents, web spiders, and the like, benefit and are able to interact with information contained within one or more areas of a DDS when large data files of arbitrary complexity and of unknown origin can be processed without special knowledge.

Efficient, machine/human readable data abstract: The descriptive data structures can be optimally small, convenient, and cost-effective to process, transmit, and/or store.

Reusable, salable—independent of actual data: Descriptive data structures may be arbitrarily complex and therefore potentially time consuming to construct and requiring certain expertise. This gives the descriptive data structure resale value.

On-the-fly definition and redefinition of content layout: Working with a layout tool allows quick iterations (including editing and modifications) of a design (layout) which can be more convenient and cost-effective than creating such a layout, which also may be quite difficult or beyond the expertise of many users.

Descriptive data structure attributes allow for meta-characteristics not found in actual data: Because the same descriptive data structure is processed by both the creation and post-creation processes, meta-information can be placed into the descriptive data structure that would otherwise be unavailable in the packaged content. One example of this whether display of certain fields is "Required" or "Hidden".

Enables design automation via descriptive data structure "wizards": Descriptive data structures themselves enable further automation in the way of "wizards". There can, for example, be descriptive data structures that help to define other descriptive data structures. Descriptive data structures defining other descriptive data structures might represent the incomplete descriptive data structure for a book or magazine, for example. The "wizard" can comprise a series of dialog boxes displayed to the user to fill in the missing information to make it a completed descriptive data structure.

Applications outside of a particular rights management architecture: For example, polymorphous applications may use descriptive data structures to determine certain data visualizations attributes and/or requirements, such as what look and feel should be displayed to the user. For example, if a descriptive data structure contains a word processing document reference, the polymorphous application might create an interface appropriate for display and editing of a document. If the descriptive data structure contains references to many executable programs, the polymorphous application might ask the user where the files should be saved.

Enables umbrella applications to process descriptive data structures and delegate unknown file types and processes: Umbrella (or polymorphous) applications can, for example, act substantially as an operation for a particular data file. This umbrella application may extract and process those things in the data file that it cares about, while ignoring or delegating (to, for example, user and/or value chain partner (e.g., distributor) to control display of such items) those things it does not understand.

Runtime interpretation: It is possible to interpret a descriptive data structure at run time, providing materially increased efficiencies and timeliness.

Runtime adaptability: Systems can adapt to dynamic data arriving in real time through use of descriptive data structures.

Automatic conversion capability: Descriptive data structures be used for converting automatically from one format to another.

Simplified system design: The use of descriptive data structures may greatly reduce the need for a secondary "wrapper" application programming interface (API) or other arrangement to securely "contain" the container creation process. Such a "wrapper" API to control and otherwise restrict the container creation process might otherwise be needed to ensure that all created containers are compatible—thereby limiting flexibility and the ability to customize.

Object oriented template programming environment: The use of display related, interaction related, and rights related concept objects which may be selected through high-level user interface choices and prioritizations and specification of related parameter data, this enabling very easy creation of certain categories of templates—such as construction and display hint information.

The use of a template language and interpreter involving supporting programming through use of language elements and interpretation of such language by nodes described in Ginter, et al., where such language includes elements descriptive of display, rights, and program interaction elements, priorities and parameter data.

BRIEF DESCRIPTION OF THE DRAWINGS

These and other features and advantages of presently preferred example embodiments in accordance with the invention may be better and more completely understood by referring to the following detailed description along with the drawings, of which:

FIGS. 2A and 2B show example content containers associated with example descriptive data structures;

FIG. 4 shows another example creation and usage process;

FIG. 5 shows an example system architecture using descriptive data structures;

FIG. 6 shows an hierarchical descriptive data structure organization;

FIG. 6A shows an example of how descriptive data structures can be used with atomic transaction data;

FIG. 7 shows an example descriptive data structure format;

FIG. 8 shows an example descriptive data structure creation graphical interface;

DETAILED DESCRIPTION OF PRESENTLY PREFERRED EXAMPLE EMBODIMENTS

Figure 1A:
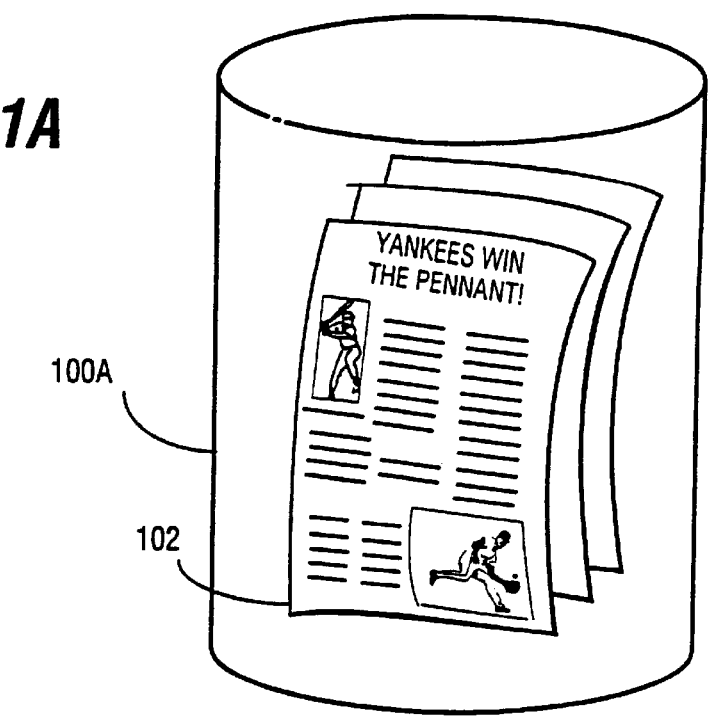
FIGS. 1A and 1B show example content containers.
Figure 1B:
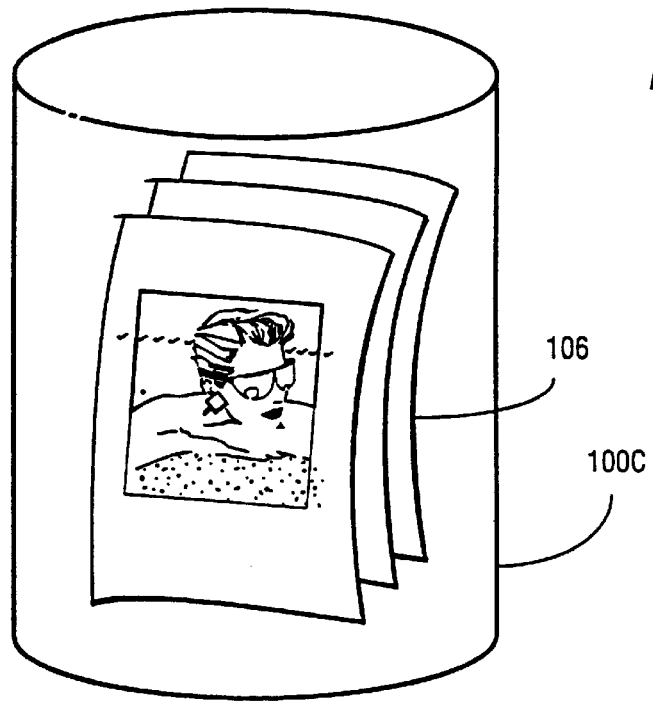

FIGS. 2A and 2B show the example containers 100$a$, 100$c$ of FIGS. 1A, 1B associated with machine readable descriptive data structures 200 and 200'. Referring to FIG. 2A, a descriptive data structure 200 is associated with content container 100$a$. This descriptive data structure 200 may be used to define the content (and certain other characteristics) of container 100$a$. In the example shown, descriptive data structure 200 defines a number of sections of newspaper style content 102 such as, for example, the headline (descriptor 202$a$), the issue date (descriptor 202$b$), the lead story (descriptor 202$c$), breaking news (descriptor 202$d$), image(s) (descriptor 202$e$), advertisement (descriptor 202$f$), and section (descriptor 202$g$).

The descriptive data structure definitions 202 in this example do not contain or specify the particular contents of corresponding portions of the newspaper 102, but instead define more abstractly, a generic format that a newspaper style publication could use. For example, the FIG. 2A example descriptive data structure headline definition 20$a$ does not specify a particular headline (e.g., "Yankees Win the Pennant!"), but instead defines the location (for example, the logical or other offset address) within the container data structure 100$a$ (as well as certain other characteristics) in which such headline information may reside. Because descriptive data structure 200 is generic to a class or family of newspaper style content publications, it can be reused. For example, each daily issue of a newspaper might be created using and/or associated with the same descriptive data structure 200. By abstractly defining the data format and other characteristics of newspaper style content 102, the descriptive data structure 200 allows easy creation, usage and manipulation of newspaper style content 102.

Referring to FIG. 2B, a different descriptive data structure 200' may be used to define another class of content publications 106 such as fashion magazines. The descriptive data structure 200' for this content class reflects a different format (and possibly other characteristics) as compared to the descriptive data structure 200 shown in FIG. 2A. For example, since fashion magazines typically do not include headlines or breaking news, the example descriptive data structure 200' may not define such formatting. Instead, descriptive data structure 200' for defining a class of fashion magazine content may define issue date (descriptor 204a), a magazine title (descriptor 204b), the name of a photographer (descriptor 204c) and associated artwork designation (descriptor 204d).

The FIGS. 2A and 2B examples show descriptive data structures 200, 200' being delivered within content object containers 100a, 100c along with associated content 102, 106. However, other forms of association may be used. For example, descriptive data structure 200 can be independently delivered in its own separate container along with associated rules controlling its access and/or use. Alternatively, descriptive data structures 200 could be stored in a library and delivered on an as needed basis in secure or insecure form depending on particular requirements.

In addition, although FIGS. 2A and 2B are printed publication content examples, the use of descriptive data structures 200 is not so limited. To the contrary, descriptive data structures 200 can be used to define the format and/or other characteristics associated with a wide variety of different types of digital information including for example:

images
sound
video
computer programs
methods
executables
interpretables
currency objects
currency containers for currency objects
rules
any computer input
any computer output
other descriptive data structures
any other information.

Example Process For Creating and Using Descriptive Data Structures

Figure 3:
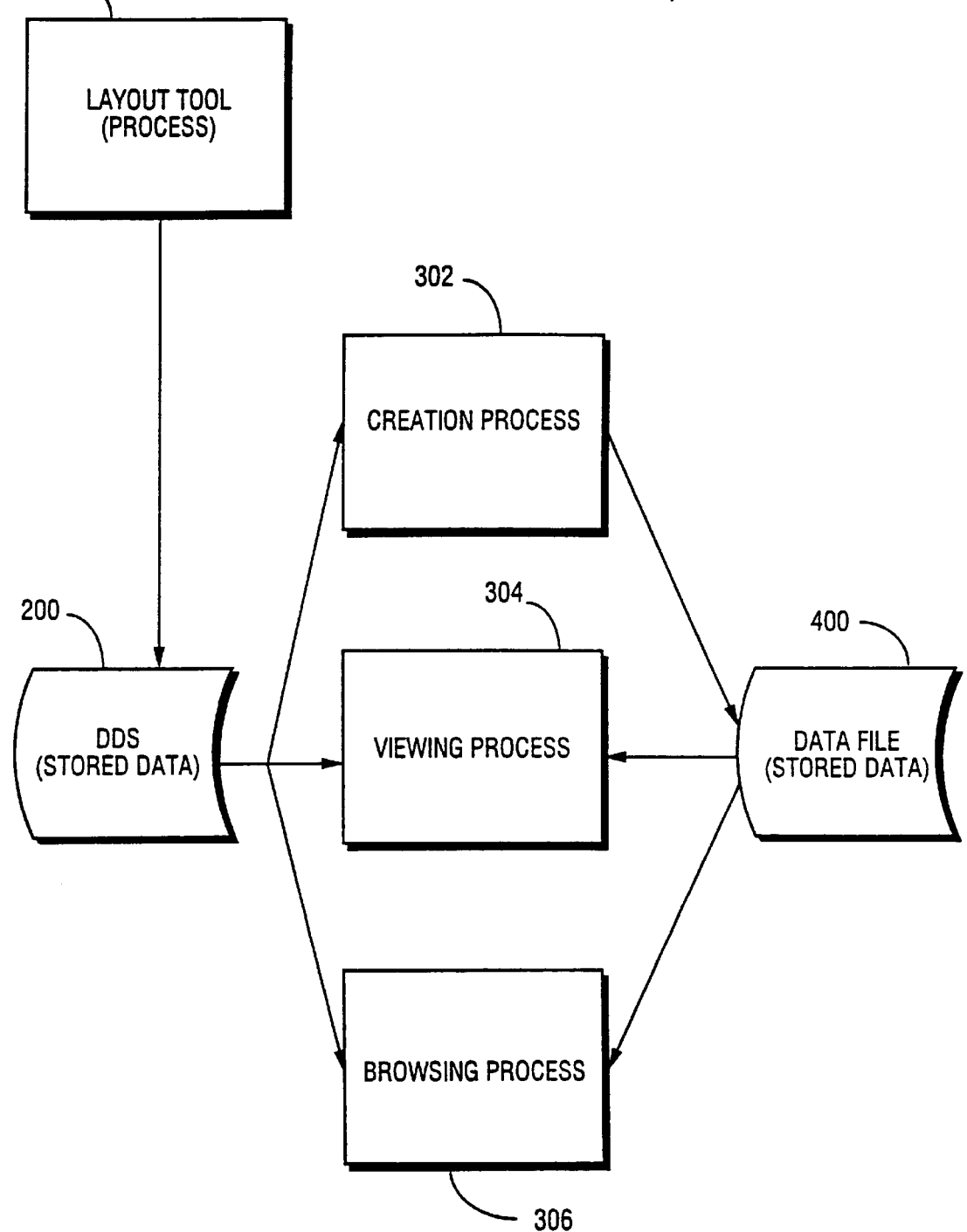
FIG. 3 shows an example descriptive data structures creation and usage process.

FIG. 3 shows an example process for creating and using descriptive data structures 200. In this example, a layout tool 300 is used to create descriptive data structure 200. This layout tool 300 may be, for example, a software-controlled process interacting with a human being via a graphical user interface. The resulting descriptive data structure 200 (which may be stored on a mass storage device or other memory) can then be used to facilitate any number of other processes to create or interpret stored data. For example, the descriptive data structure may be used in a creation process 302. The creation process 302 may read the descriptive data structure and, in response, create an output file 400 with a predefined format such as, for example, a container 100 corresponding to a format described by the descriptive data structure 200. A viewing process 304 may use the descriptive data structure 200 to locate important items in the output file 400 for display. A browsing process 306 may use the descriptive data structure 200 to locate items within the stored output file 400 such as, for example, key words or other searchable text. Descriptive data structure 200 may supply integrity constraints or rules that protect the integrity of corresponding content during use of and/or access to the content.

FIG. 4 shows a more detailed example descriptive data structure creation and usage process. In this example, the layout tool 300 may accept user input 310 provided via a graphical user interface 312. The output of the layout tool 300 may be a descriptive data structure 200 in the form of, for example, a text file. A secure packaging process 302a may accept container specific data as an input, and it may also accept the descriptive data structure 200 as a read only input. The packager 302a could be based on a graphical user interface and/or it could be automated. The packager 302a packages the container specific data 314 into a secure container 100. It may also package descriptive data structure 200 into the same container 100 if desired. A viewer 304 may view data 314 with the assistance of the descriptive data structure 200 and in accordance with rules 316 packaged within the container applying to the data 314 and/or the descriptive data structure 200.

Example Architecture For Using Descriptive Data Structures

FIG. 5 shows an example secure system architecture suitable for use with descriptive data structure 200. In this example, an electronic appliance 500 of the type described in the above-referenced Ginter et al. patent specification may be provided within a tamper resistant barrier 502. Electronic appliance 500 may include an application program interface (API) 504. One or more applications 506 may communicate with electronic appliance 500 via API 504. In some examples, the application 506 may execute on the secure electronic appliance 500. Each application 506 may include a descriptive data structure interpreter 508. In use, electronic appliance 500 may access secure container 100 and—in accordance with rules 316—access the descriptive data structure 200 and content 102 it contains and provide it to application 506. The interpreter 508 within application 506 may, in turn, read and use the descriptive data structure 200. In addition, application 506 may be polymorphic in the sense that it can take on personality or behavior as defined at least in part by descriptive data structure 200.

Figure 5A:
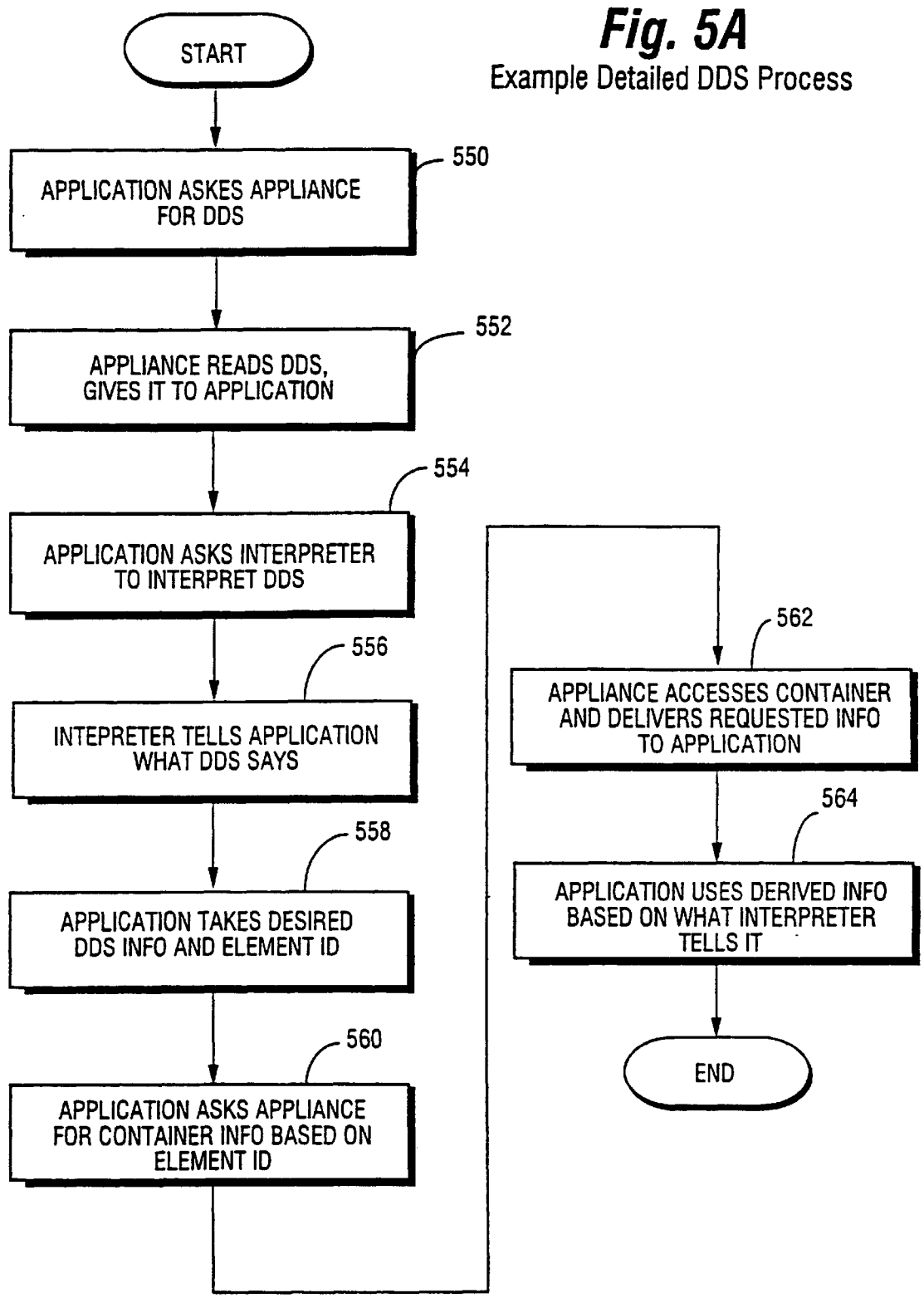
FIG. 5A shows an example process performed by the FIG. 5 system.

FIG. 5A shows an example detailed process performed by the FIG. 5 example secure system architecture. In this example, application 506 asks appliance 500 to retrieve the descriptive data structure 200 from container 100 (block 550). Electronic appliance 500 reads the descriptive data structure 200 and, subject to the conditions specified by associated rules 316, provides the descriptive data structure 200 to the application 506 (block 552). Application 506 then asks its interpreter 508 to interpret the descriptive data structure 200 (block 554). The interpreter 508 tells the application 506 what the descriptive data structure 200 says (block 556). The application 506 extracts or obtains the descriptive data structure information it needs or wants from interpreter 508 (block 558). For example, suppose the application 506 wants to display the "headline" information within newspaper style content shown in FIG. 2A. Application 506 may ask interpreter 508 to provide it with information that will help it to locate, read, format and/or display this "headline" information.

As another example, interpreter 508 may provide application 506 with an element identification (e.g., a hexadecimal value or other identifier) that corresponds to the headline information within the newspaper style content (block 558). Application 506 may then ask electronic appliance 500 to provide it with the Headline (or other) content information 102 within container 100 by providing appropriate content information to electronic appliance 500 via API 504 (block 560). For example, application 506 may pass the electronic appliance 500 the element ID that interpreter 508 provided to the application. Even though application 506 may have no direct knowledge of what is inside container 100 (and may only be able to access the container 100 through a secure VDE node provided by appliance 500), interpreter 508 (by looking at descriptive data structure 200) can tell application 506 enough information so that the application knows how to request the information it wants from the electronic appliance 500.

The electronic appliance may then access information 102 within container 100, and deliver (in accordance with the rules 316 within the container) the requested information to the application 506 (block 562). The application 506 may then use the information electronic appliance 500 provides to it, based at least in part on what interpreter 508 has told it about the content information (block 564). For example, the descriptive data structure 200 may provide characteristics about the way application 506 should handle the information 102. Descriptive data structure 200 can, for example, tell application 506 to always display a certain field (e.g., the author or copyright field) and to never display other information (e.g., information that should be hidden from most users). DDS 200 can also provide complete presentation or "visualization" information so that an information provider can, for example, control the look and feel of the information when it is displayed or otherwise rendered. Descriptive data structure 200 may provide encodings of other characteristics in the form of metadata that can also be used by application 506 during a process of creating, using or manipulating container 100. The DDS 200 can be used to generate a software program to manipulate rights management structures. For example, a DDS 200 could serve as the 'instructions' that drive an automated packaging application for digital content or an automated reader of digital content.

Example Description(s) Provided by Descriptive Data Structure

FIG. 6 shows one example of how a descriptive data structure 200 may describe and define an arbitrarily complex, information structure such as, for example, an hierarchical container 100. In this particular example, container 100 includes properties 600(1), 600(2). Property 600 (1) may include n attributes 602(1), 602(2) . . . 602(n). Property 600(2) may include any number of attributes 604(1), 604(2), and it may also include an additional property 606. Property 606 may, in turn, include its own attributes 608(1), 608(2) . . . . Associated descriptive data structure 200 may be organized as a tree structure list 250 providing a recursive structure to reflect the recursive structure of the contents of container 100. For example, list 250 may include "branches" in the form of "property" descriptors 252(1), 252(2) corresponding to properties 600(1), 600(2). Each property descriptor 252 may, in turn, include a list 254 of attributes and may include additional property descriptors 256 in the same recursive, hierarchical arrangement as is reflective of the example content container structure. DDS 200 may be used to describe arbitrarily complex, hierarchical or non-hierarchical data structures of any dimension (1 to n).

FIG. 6A shows that descriptive data structure 200 can be used in conjunction with any kind of information such as, for example, events or methods defining an "atomic transaction" such as a real estate transaction. In this FIG. 6A example, a container 100 includes one or more descriptive data structures 200 and associated control set(s) 316 relating to a sequence of "events" 700 that define a real estate transaction. The DDS 200 may, for example, include a number of different entries 200A–200N pertaining to each different "event" within the transaction (e.g., "offer", "acceptance", "purchase/sales", "inspection", "mortgage", etc.). These entries 200A–N may, for example, define where in container 100 the event can be found. The entries 200A–200N may also include metadata that provides additional characteristics corresponding to the event (for example, how certain information related to the event should be displayed).

Example Descriptive Data Structure Formatting

FIG. 7 shows an example of how descriptive data structure 200 may be formatted. As mentioned above, descriptive data structure 200 may comprise a list such as a linked list. Each list entry 260(1), 260(2), . . . may include a number of data fields including, for example:

an object name field 262,
one or more metadata fields 264 (which may be part of and/or referenced by the descriptive data structure); and
location information 266 (which may be used to help identify the corresponding information within the container data structure 100).

The object name field 262 may include a constant that may corresponds to or describes a type of information. For example, object name field 262 may act as a "handle" to the content or data; it may be an indirect reference to the content or data; and/or it may be used to look up the content or data The following are examples of object names:

General Purpose Object Names
NUMBER
STRING
DATE
TITLE
DESCRIPTION
AUTHOR
PROVIDER
MIME_TYPE
VERSION
URL
EMAIL
NEWGROUP
FILE_NAME
KEYWORDS
CREATION_DATE
MODIFICATION_DATE
LAST_ACCESS_DATE
NATIVE_PLATFORM
SIZE
CONTENT
PREVIEW
THUMBNAIL
TEXT
ARTWORK ILLUSTRATION
UNKNOWN
TEMPLATE
BILLING_NAME
CONTAINER
Book-style Object Names
  DEADLINE_DATE
  TITLE_PAGE
  PROLOGUE
  INTRODUCTION
  ABSTRACT
  TABLE_OF_CONTENTS
  CHAPTER
  CHAPTER_NUMBER
  INDEX
Electronic Mail-style Object Names
  FROM
  TO
  CC
  SUBJECT
  MESSAGE_BODY
  ENCLOSURE
Newspaper-style Object Names
  ISSUE_DATE
  ARTICLE
  COLUMN
  COVER_STORY
  LEAD_STORY
  BREAKING_NEWS
  ADVERTISEMENT
  SECTION
  EDITORIAL The DDS 200 may include or reference any type of data or metadata. In one example, the DDS 200 uses the object name field 262 to points or refers to metadata. This metadata can define certain characteristics associated with the object name. For example, such metadata may impose integrity or other constraints during the creation and/or usage process (e.g., "when you create an object, you must provide this information", or "when you display the object, you must display this information"). The metadata 264 may also further describe or otherwise qualify the associated object name.

In one preferred example, the DDS 200 uses object name 262 to refer to metadata stored elsewhere—such as in a container 100. This referencing technique provides several advantages. For example, one situation where it may be useful to store the metadata in a secure container 100 separately from DDS 200 is in situations where it is desirable to make the DDS readily accessible to an outside application but to protect the associated metadata. For example, consider the case of handling web spider queries. A web spider may query the DDS 200 for a particular object name 262. If the object name is found, then the web spider may request the corresponding metadata. The web spider may have ready access to the metadata, but may only be able to access the associated metadata from the container 100 under appropriate conditions as controlled by a corresponding secure electronic appliance 500 based on associated rules 316. As another example, storing metadata separately from the DDS 200 may allow the same DDS to be used with different metadata in different contexts. Suppose for example that a DDS 200 contains an Object Name, for example KEYWORDS. When DDS 200 is associated with container 100A, then the DDS Object Name KEYWORDS refers to container 100A's KEYWORDS metadata. Conversely, if later this same DDS 200 is associated (e.g., packaged with) a different container 100C, then the DDS Object Name KEYWORDS refers to container 100B's KEYWORDS data.

Although it is preferred to use object name 262 to refer to metadata stored elsewhere, there may be other instances where there is a need or desire to explicitly include metadata within the DDS 200. For purposes of illustration, FIG. 7 shows an example DDS 200 that includes metadata field 264 and also refers to metadata within a container 100 using the object name 262. Either or both techniques may be used.

The DDS 200 thus allows value chain participants to protect the integrity of content, by enabling the specification of integrity constraints. DDS 200 integrity constraints provide a way to state rules about the content. For example, DDS 200 can specify that an article of a newspaper cannot be viewed without its headline being viewed. The corresponding integrity constraint can indicate the rule "if there is an article, there must also be a headline". Another example is a photograph that is part of a magazine and the credit that goes with it. The integrity constraint rule provided by DDS 200 might be 'do not present this photograph without its associated credit'.

DDS integrity constraints give value chain participants a tool for protecting the use of the DDS 200, ensuring that content represented by a particular DDS contains all the essential components—that it is representative of the DDS. This gives providers a way to set up conventions and enforce standards of use. There are many possible integrity constraints. The following are a few examples:

Required: a is required as part of the content
Optional: a is an optional component of the content
Required relationship: if a is present, then b must be present, or if a is present b, c and d must be present. Conversely, if b is not present, then a is not allowed to be present. Relationships in this category are 1:m where m>0.
Optional relationship: If a is present b may or may not be present. If b is present, then a is guaranteed to be present. Relationships in this category are 1:n, where n>=0.
Repetition: a must occur n times where n>1. This could be specified with ranges of values, etc.
Other rules and/or requirements.
Metadata 264

Example Graphical Interface For Creating Descriptive Data Structures

FIG. 8 shows an example descriptive data structure creation graphical user interface 312. In this example, the graphical user interface 312 may prompt the user for the object name. In addition, the graphical user interface 312 may provide options for specifying the associated metadata 264. The options shown in FIG. 8 may, for example, include:)

"construction type" metadata (upon object construction, the information is required; upon object construction, the object creation tool is to always or never prompt for the information);
display metadata (e.g., always display the associated information (e.g., for copyright notices, author names and the like) or always or never make the information visible; and/or
layout "hints" and field definitions (e.g., text, text block, integer, file, image or other data type).

The above metadata descriptions are non-limiting examples. Other metadata characteristics and attributes may be used.

Example Process Using Descriptive Data Structures

Figure 9:
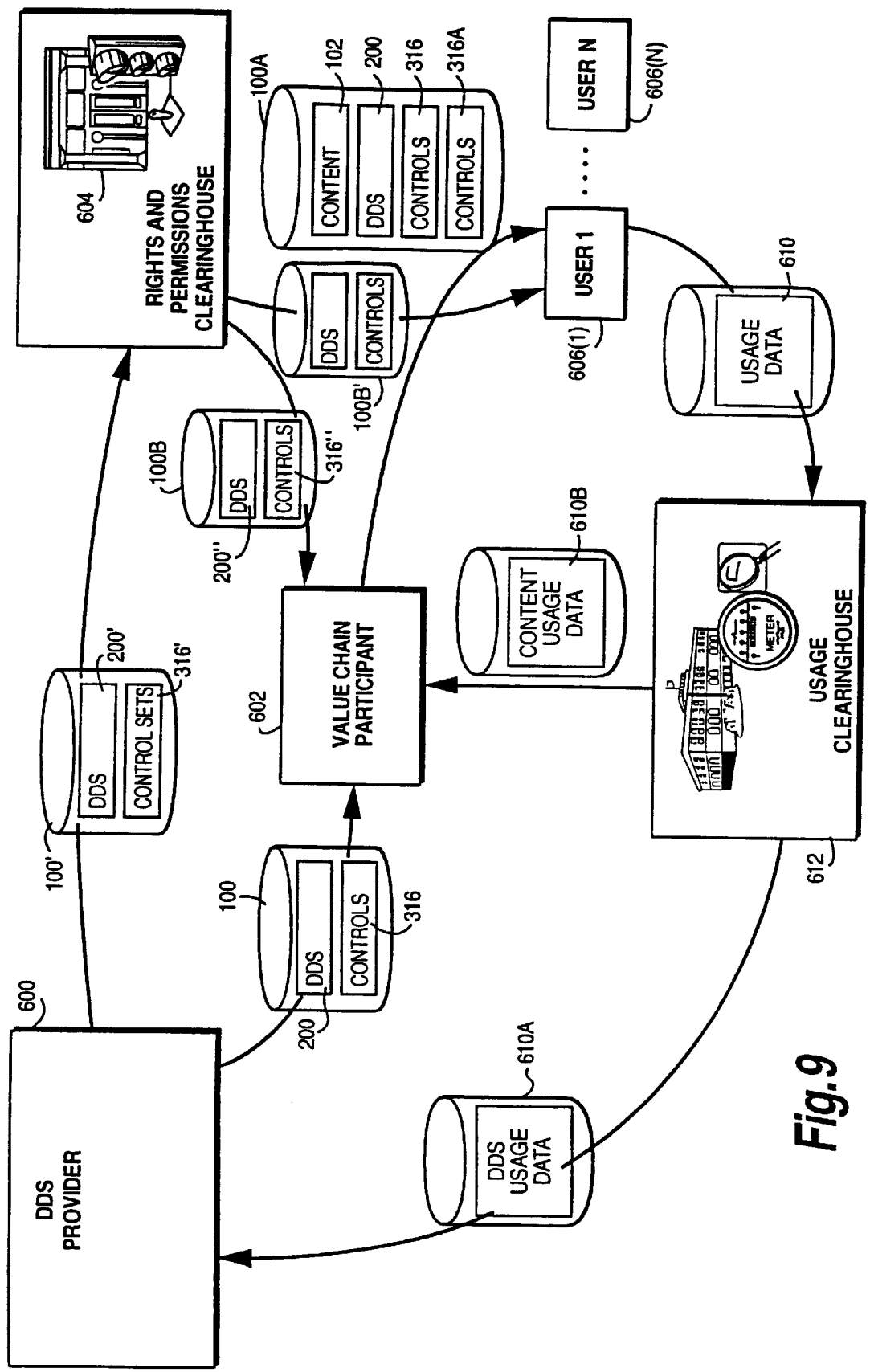
FIG. 9 shows an example process for tracking descriptive data structure rights management related data.

FIG. 9 shows one example arrangement for using the infrastructure described in co-pending related U.S. patent application Ser. No. 08/699,712 (referenced above) for descriptive data structures 200. The arrangement shown in FIG. 9 may be useful in a number of different contexts. For example, a provider 600 of descriptive data structures 200 may want to know which descriptive data structures 200 are the best liked by his customers so he or she can improve the quality of his products. Or, a provider 600 may charge customers for using descriptive data structures 200 on a per use or other basis. In still another example, some descriptive data structures 200 or classes of DDS 200 may be restricted to use only by authorized users or classes of authorized users.

FIG. 9 shows a DDS provider 600 who delivers a DDS 200 and an associated control set 316 to a value chain participant 602. Controls 316 may provide rules and associated consequences for controlling or otherwise affecting the use or other aspects of what value chain participant 602 can do with DDS 200. The controls 316 and DDS 200 may be packaged within a container 100. Value chain participant 602 may get the container 100 containing DDS 200 directly from DDS provider 600; alternatively, the provider can provide it a rights and permissions clearinghouse 604 and participant 602 and get it from the clearinghouse (or elsewhere) (see container 100B).

Value chain participant 602 can use DDS 200 to author content 102. Participant 602 can package content 102 with associated controls 316A in a container 100A. Participant 600 may, if he desires, include DDS 200 and associated controls 316a, 316b with content 102 in the same container—or depend on the provider 600 and/or rights and permissions clearinghouse 604 to independently deliver the DDS and its controls to end users 606 in another container 100c for example:

End users 606(1), . . . , 606(n) use DDS 200 (in accordance with controls 316) in conjunction with content 102 (for example, to read, browse or otherwise access the container content). Controls 316, 316A may require user appliances to provide usage data 610 to a usage clearinghouse 612. The usage clearinghouse 612 can provide usage data 610A related to access and/or usage of DDS 200 to DDS provider 600, and may independently provide usage data 610B related to access and/or usage of content 102 to value chain participant 602.

Descriptive Data Structures Can Be Used to Achieve A Degree of Interoperability Between Rights Management Environments Descriptive data structures 200 provided in accordance with the present invention can provide a degree of interoperability between source and target rights management environments, and/or to provide a bridge to achieve at least some degree of interoperatibility between a rights management environment and the outside world.

Different rights management environments may have substantially incompatible mechanisms for defining rights pertaining to an object. Descriptive data structures 200 can provide at least a partial bridge to achieve a degree of compatibility and interoperability. For example, a provider that defines an object within a source rights management environment may create a descriptive data structure for use by processes within one or more target rights management environments. For example, an object creator or other provider can specify, within a descriptive data structure 200, certain rules, integrity constraints and/or other characteristics that can or should be applied to the object after it has been imported into a target rights management environment. The target rights management environment can choose to selectively enforce such rules, constraints and/or other characteristics depending on the degree to which it can trust the source environment. For example, objects imported from an EDI system employing X.12 security may be more trustworthy than objects presented from environments with lesser (or no) security.

In another example, a provider that creates an object outside of any rights management environment can create a descriptive data structure 200 for use if and when the object is imported into one or more rights management environments. The target rights management environment(s) can use such descriptive data structure(s) to help efficiently understand and handle the object. Further, a descriptive data structure created within a rights management environment can be exported to one or more applications outside of the rights management environment and used to assist the application(s) in interpreting exported content or other information.

Figure 10A:
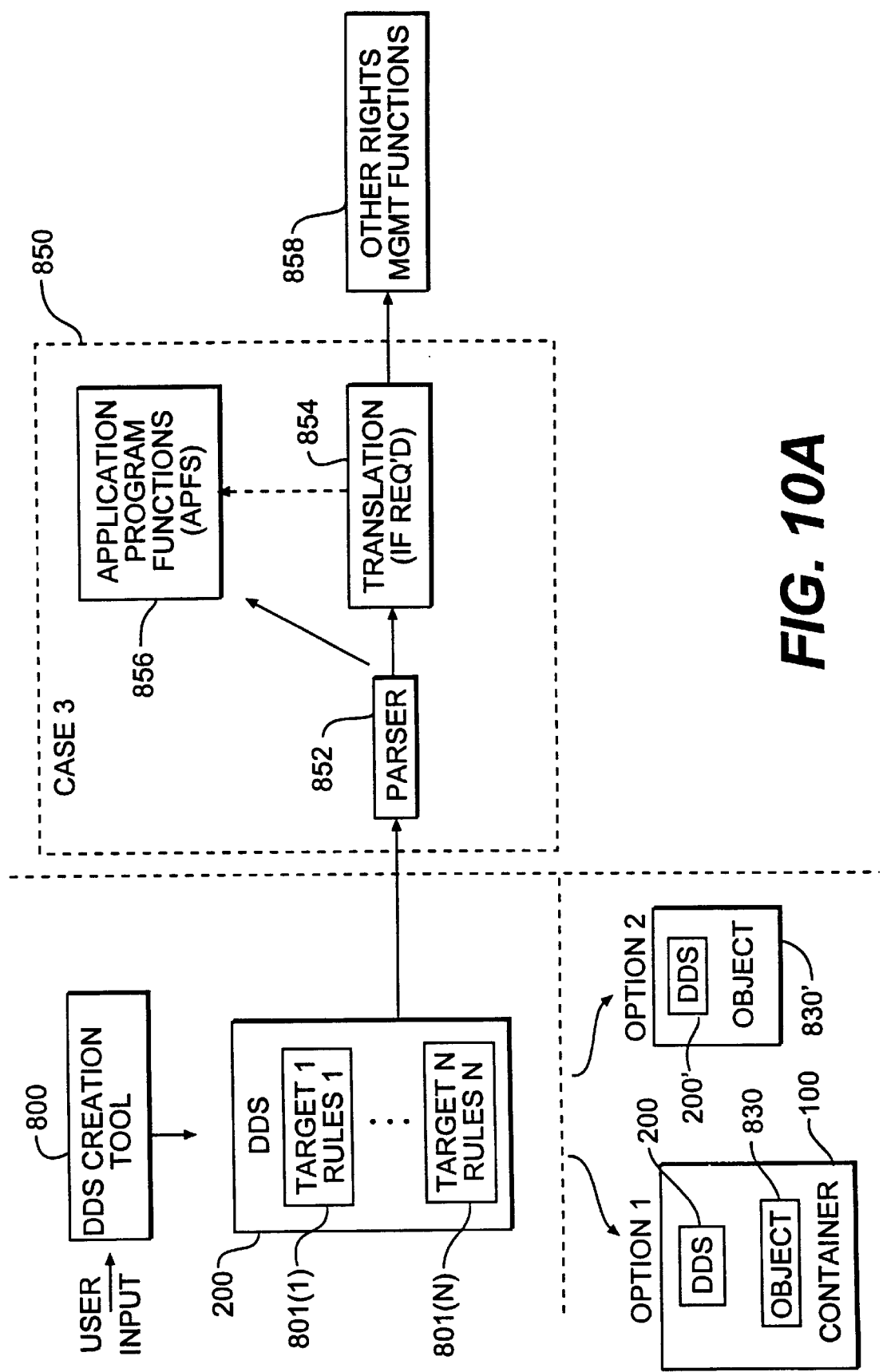
FIG. 10A shows an example use of descriptive data structures to provide interoperability between environments.

FIG. 10A shows an example of how descriptive data structures 200 may be used to provide interoperability. In the FIG. 10A example, a DDS creation tool 800 creates a DDS 200 that includes one or more target data blocks 801. In one example, the DDS creation tool 800 may be based on, and/or incorporate some or all of the capabilities of layout tool 300 and provide interoperability capabilities in addition to features associated with layout tool 300. In another example, DDS creation tool 800 may not incorporate any of the capabilities of layout tool 300, and may create DDS 200 solely for interoperability purposes. DDS creation tool 800 may, for example, be an application program with a graphical user interface, a background process that only displays a user interface when being configured by a user, a portion of an operating system, a portion of a computer's firmware, a server process that may act independently or as part or all of a "gateway" between one system and another (e.g., a public network and a private network, two or more private networks, a local area network and a wide area network, etc.), or any other desirable implementation or integration.

Target data block 801 may provide information used to provide interoperability with a particular target environment 850. A single DDS 200 can, in one example, provide interoperability with N different target environments 850 by including N target data blocks 801(1), . . . 801(N) each corresponding to a different target environment 850(1), . . . 850(N).

In this example, each target data block 801 includes rule (control) information. Different target data blocks 801 can provide different rule information for different target environments 850. The rule information may, for example, relate to operations (events) and/or consequences of application program functions 856 within the associated target environment 850 such as specifying:

- permitted and/or required operations;
- nature and/or extent of operations permitted and/or required operations; and/or
- consequences of performing permitted and/or required operations.

The target data block 801 may also include additional information if desired that gives directions to a DDS parser 852 and/or a translator 854 within a corresponding target environment 850.

Figure 10B:
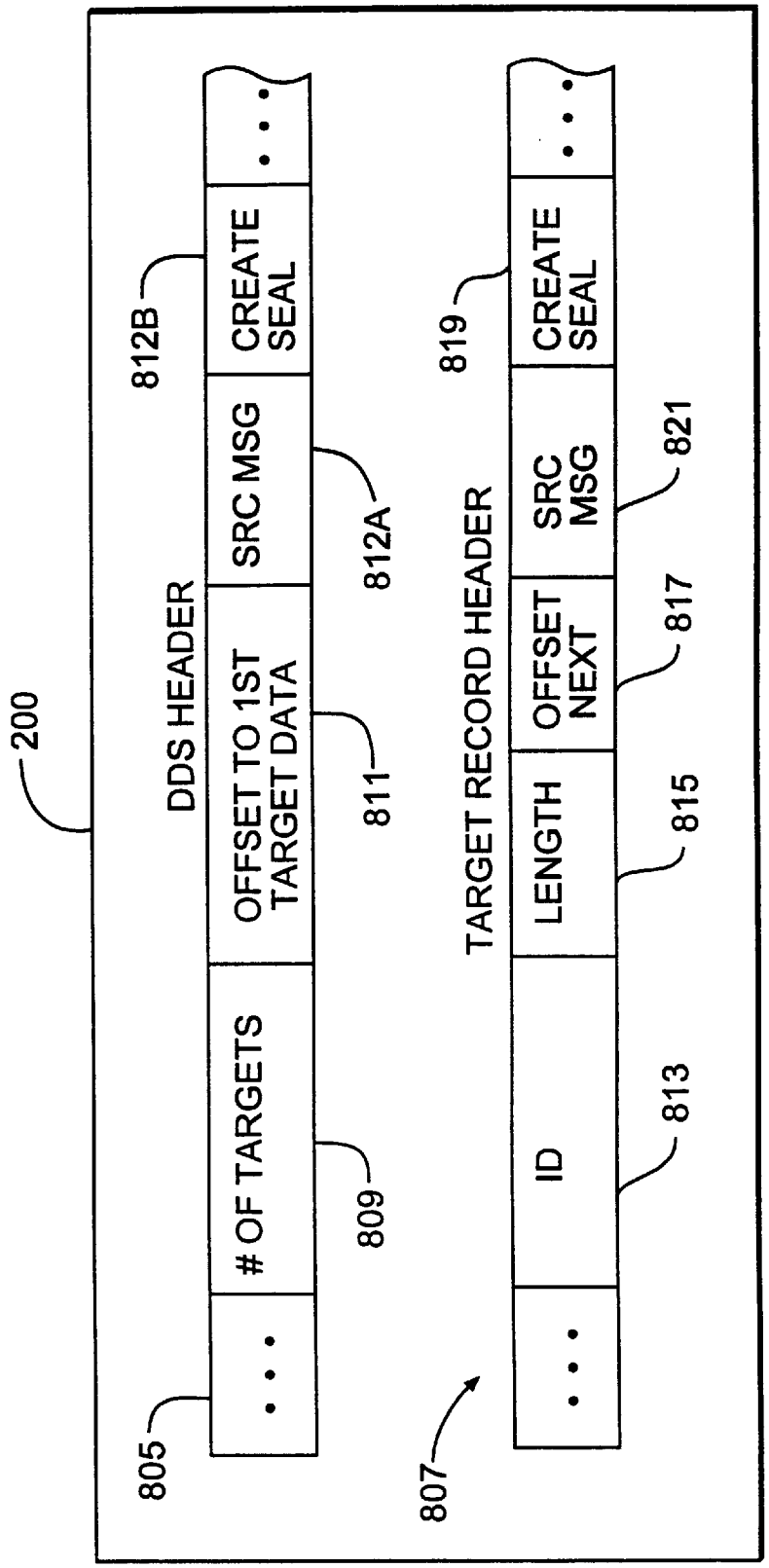
FIG. 10B provides more detail about how the FIG. 10A example descriptive data structure may be organized.

FIG. 10B shows one detailed example of how target information may be organized within DDS 200. In this example, DDS creation tool 800 creates a DDS header 805 that references one or more target record headers 807. DDS header 805 may, for example, include a "number of targets" field 809 indicating the number of target data blocks 801 within the DDS 200, a "offset to first target data portion" field 811 that provides the location of the first target data block 801(1) within the DDS 200, a source message field 812A that identifies the source environment, and an optional creator seal 812B that may be used to verify the integrity and authenticity of the DDS 200. Source message field 812A (which can be optional) may include a source ID that may be used to help verify the source environment of DDS 200, and an optional source seal (that may or may not be present in the source message). Each target data block 801 within DDS 200 may begin with a target record header 807 including a "target ID" field 813, a "length" field 815, a "offset to next target data portion" field 817, an optional creator seal 819, and an optional source message 821. The "target ID" field 813 may specify a unique identification number or value corresponding to the associated target data block 801 and/or identifying the intended target environment(s), the "length" field 815 may specify the length of the target data block 801, and the "offset" field 817 may specify the location (relative or absolute) of the next target data block 801 within the DDS 200 (and may take on a null value for the last target data block).

The optional creator seals 812B, 819 (and source seals) may be cryptographic seals that help to ensure that the DDS 200 and target records 801, respectively, have not be altered since they were created, and also the identity of the DDS 200's creator and/or source. The optional source messages 812C and 821 may be information that helps to ensure that a target environment knows which source environment created DDS 200.

Referring again to FIG. 10A, DDS creation tool 800 may, upon creating the DDS 200, cryptographically seal it and each target data block 801 for integrity using appropriate cryptographic processes, for example by first running a cryptographic hash function (e.g., SHA, MD5, etc.) on the data and then encrypting the resulting hash value using a private key of the DDS creator associated with an asymmetric cryptosystem (e.g., RSA, El Gamal, etc.). If sealing is used, the DDS creator preferably should ensure that the public key associated with the encrypting private key is certified (e.g., encrypted with a private key of a certifying authority) and available for use by target environments to validate the seal (e.g., by including a certificate in DDS 200, publishing the certificate on a public network, etc.)

If source messages 812C, 821 are used, they should preferably represent information provided by the source environment that may help a target environment identify the source environment, and further may also help to ensure that the DDS 200 was actually created by the source environment (and therefore may, for example, be trusted to the extent that the source environment is trusted). For example, a source environment may have a protected processing environment (PPE) of the form described in the above referenced Ginter, et al. patent application. Certain of such PPEs may have cryptographic keys (e.g., a private key of a public key/private key pair) available that may be used to encrypt a cryptographic hash taken of the DDS header 805 or target block header 807, as appropriate. In such an example, a target environment would need to acquire a corresponding cryptographic key (e.g., a public key of a public key/private key pair) using trusted techniques (e.g., delivery in a certificate signed by a trusted certifying authority) in order to evaluate such a source message. In another example, DDS creation tool 800 may have been equipped with cryptographic keys when it was manufactured, and may use these cryptographic keys instead of keys from a PPE, although generally this technique would be more susceptible to tampering by an experienced computer hacker and might therefore be somewhat less trusted by target environments.

In addition, or alternatively (for example, if cryptographic techniques are not appropriate or desired), the source message may contain a unique identifier that corresponds to the source environment.

The DDS creation tool 800 (see FIG. 10A) may then package the resulting DDS 200 into a secure container 100 along with an associated object 830. In another example, DDS creation tool 800 may embed DDS 200 within, or otherwise associate the DDS with, an object 830' that provides a method for releasing the DDS to the target environment parser 852. The DDS 200 and its associated object 830 may then be delivered to one or more target environments 850 for processing.

Target environment parser 852 (and/or translator 854) may, for example, be part of an application program, part of an operating system, or part of a utility program used by, or in conjunction with, an application program and/or an operating system. The target environment parser 852 receives the DDS 200 and parses it to locate the target data block 801(k) corresponding to the target environment 850(k). Parser 852 may then determine, from the corresponding target data block 801, the rules the target data block contains. Parser 852 preferably understands enough about the structure of DDS 200 to find (e.g., using the header information shown in FIG. 10B) the appropriate target data block 801 corresponding to it, and also to understand the rules within the target data block. The target environment parser 852 doesn't need to understand any additional rules 316 that may be packaged within container 100 or otherwise delivered with object 830, but it may use any such additional rules if desired (e.g., when it finds no target data block 801 within DDS 200 for the particular target environment 850 (for example, if it is capable of understanding some other target data block 801 whose rules are based on a published specification and/or standard)).

The target environment parser 852 may obtain applicable target rules from target data block 801 and provide these rules to application program functions 856. Application program functions 856 may define any operation pertaining to object 830 such as for example:

cut
copy
print
paste
save
change
delete
any other operation.

The target rules provided by parser 852 may be used, for example, to permit, require and/or prevent certain operations; to define the extent to which certain operations can be performed (e.g., limit number of copies, define extent of cut, the rules that should be applied to cut information in subsequent use, etc.); and/or to define the consequences of performing a particular operation (e.g., charge the user for printing or otherwise using and/or accessing all or part of object 830, maintain records of the time and/or number of such operations performed, etc.).

Parser 852 may also, or alternatively, provide some or all of the rules it obtains from target data block 801 to other arrangements for applying the rules such as, for example, the "other rights management functions" block 858. Block 858 may provide any kind of rights management functions. Translator 854 may be used if needed to allow the application program functions 856 and/or the "other rights management" block 858 to understand the rules. As one example, translator 854 may be used to further elaborate, parameterize and/or secure the rule information obtained from target data block 801 so they are more or fully compatible with the "other rights management functions" block 858.

A useful data structure definitional method and arrangement has been described in connection with its most practical and presently preferred example embodiments. The present invention is not to be limited to those embodiments, but on the contrary, is intended to encompass variations and equivalents as defined within the spirit and scope of the claims.

We claim:

1. A data structure embodied on a computer-readable medium, the data structure comprising:
   information that identifies, at least in part, a first digital object;
   a first target data block, the first target data block specifying rights pertaining to the first digital object, the first target data block being written in a first format; and
   a second target data block, the second target data block specifying rights pertaining to the first digital object, the second target data block being written in a second format, the second format being different from the first format.

2. A data structure as in claim 1, further comprising:
   a first cryptographic seal, the first cryptographic seal having been created using a key associated with a creator of the data structure.

3. A data structure as in claim 2, further comprising:
   a second cryptographic seal, the second cryptographic seal being associated with the first target data block; and
   a third cryptographic seal, the third cryptographic seal being associated with the second target data block.

4. A data structure as in claim 3, in which the second cryptographic seal and the third cryptographic seal are created using the key associated with the creator of the data structure.

5. A data structure as in claim 4, in which the key comprises a private key of an asymmetric key pair.

6. A data structure as in claim 5, further comprising:
   a public key of the asymmetric key pair.

7. A data structure as in claim 6, in which the public key is certified by a certifying authority.

8. A data structure as in claim 5, in which the first cryptographic seal comprises an encrypted hash of at least part of the data structure, the hash being encrypted with the key.

9. A data structure as in claim 8, in which the data structure further comprises a header, and the hash comprises a hash of at least part of the header.

10. A data structure as in claim 4, in which the second cryptographic seal is created by encrypting a hash of at least part of the first target data block using the key associated with the creator of the data structure, and in which the third cryptographic seal is created by encrypting a hash of at least part of the second target data block using the key associated with the creator of the data structure.

11. A data structure as in claim 10, in which the first target data block includes a header, and in which the hash of at least part of the first target data block comprises a hash of at least part of the first target data block's header.

12. A data structure as in claim 11, in which the second target data block includes a header, and in which the hash of at least part of the second target data block comprises a hash of at least part of the second target data block's header.

13. A data structure as in claim 1, further comprising:
    a data structure identification number.

14. A data structure as in claim 13, further comprising:
    a first target data block identification number; and
    a second target data block identification number.

15. A data structure as in claim 14, in which the first data structure identification number, the first target data block identification number, and the second target data block identification number each comprise a unique identification number.

16. A data structure as in claim 1, further comprising:
    a third target block, the third target block specifying rights pertaining to the first digital object, the third target block being written in a third format, the third format being different from the first format and the second format.

17. A data structure as in claim 1, in which the first target block and the second target block express at least some of the same rights.

18. A data structure as in claim 1, in which the first target block is understandable by a first rights management environment, and the second target block is understandable by a second rights management environment that is unable to understand the first target block.

19. A data structure as in claim 1, in which the first digital object comprises executable code.

20. A data structure as in claim 1, in which the first digital object comprises at least one of: textual electronic content, audio electronic content, video electronic content, and graphical electronic content.

21. A data structure as in claim 1, in which the data structure is machine readable.

22. A data structure as in claim 17, in which the rights specify one or more permitted operations on the first digital object.

23. A data structure as in claim 22, in which the rights further specify an authorized extent of the one or more permitted operations.

24. A data structure as in claim 23, in which the rights specify a number of copies that may be made of the first digital object.

25. A data structure as in claim 22, in which the rights further specify at least one consequence of performing the one or more permitted operations.

26. A data structure as in claim 17, in which the rigths specify one or more required operations on the first digital object.

27. A data structure as in claim 1, further comprising:
    information that identifies, at least in part, a second digital object.

28. A data structure as in claim 27, further comprising:
    a third target data block, the third target data block specifying rights pertaining to the second digital object.

29. A data structure as in claim 27, in which the first target data block specifies rights pertaining to the second digital object, and in which the second target data block specifies rights pertaining to the second digital object.

30. A computer program product embodied on a computer-readable medium, the computer program product including instructions which, when executed by a computer system in a first rights management environment, cause the system to perform actions comprising:

receiving a digital object;

receiving a data structure associated with the digital object, the data structure containing a first target data block and a second target data block, the first target data block being adapted for use in the first rights management environment, and the second target data block being adapted for use in a second rights management environment; and enforcing at least one rule located within, or referenced by, the first target data block to control at least one use of said digital object.

31. A computer program product as in claim 30, further including instructions which, when executed by a computer system in a first rights management environment, cause the system to perform actions comprising:

calculating a hash of at least part of the first target data block;

decrypting an encrypted hash value received in said data structure; and comparing the calculated hash with the decrypted hash.

32. A computer program product as in claim 30, further including instructions which, when executed by a computer system in a first rights management environment, cause the system to perform actions comprising:

evaluating a measure of trust associated with a source of said data structure, wherein said action of enforcing at least one rule is selectively performed based at least in part on a result of said evaluating step.

33. A rights management method comprising:

receiving a digital object in a first rights management environment;

receiving a data structure associated with the digital object, the data structure containing a first target data block and a second target data block, the first target data block being designed for use in the first rights management environment, and the second target data block being designed for use in a second rights management environment; and enforcing at least one rule located within, or referenced by, the first target data block to control at least one use of said digital object, wherein the first rights management environment defines rules pertaining to the use of objects in a manner that is substantially incompatible with the manner by which the second rights management environment defines rules pertaining to the use of objects.

34. A method as in claim 33, further comprising:

calculating a hash of at least part of the first target data block;

decrypting an encrypted hash value received in said data structure; and comparing the calculated hash with the decrypted hash.

35. A method as in claim 33, in which the digital object and the data structure are received together.

36. A method as in claim 33, further comprising:

evaluating a measure of trust associated with a source of said data structure, wherein said enforcing step is selectively performed based at least in part on a result of said evaluating step.

37. A method as in claim 33, in which the first rights management environment comprises a computer running a first rights management system, and in which the second rights management environment comprises a computer running a second rights management system.

* * * * *

UNITED STATES PATENT AND TRADEMARK OFFICE
CERTIFICATE OF CORRECTION

PATENT NO. : 7,062,500 B1 Page 1 of 1
APPLICATION NO. : 09/819063
DATED : June 13, 2006
INVENTOR(S) : Edwin J. Hall et al.

It is certified that error appears in the above-identified patent and that said Letters Patent is hereby corrected as shown below:

On the Title page, Item (63), in the "Related U.S. Application Data", lines 1-2, Mar. 27, 1999," should read --Apr. 27, 1999,--; and lines 3, "08/805,805," should read --08/805,804,--.

In claim 26, column 22, line 52, "rigths" should read --rights--.

Signed and Sealed this

Fifth Day of September, 2006

JON W. DUDAS
*Director of the United States Patent and Trademark Office*